United States Patent
Noh et al.

(10) Patent No.: US 10,236,957 B2
(45) Date of Patent: *Mar. 19, 2019

(54) METHOD AND APPARATUS FOR TRANSMITTING UPLINK SIGNALS USING MULTI-ANTENNA

(71) Applicant: LG ELECTRONICS INC., Seoul (KR)

(72) Inventors: Yu Jin Noh, Anyang-si (KR); Ki Jun Kim, Anyang-si (KR); Dong Wook Roh, Anyang-si (KR); Byeong Woo Kang, Anyang-si (KR); Dae Won Lee, Anyang-si (KR); Bong Hoe Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,321

(22) Filed: Sep. 19, 2017

(65) Prior Publication Data

US 2018/0006692 A1    Jan. 4, 2018

Related U.S. Application Data

(63) Continuation of application No. 14/991,284, filed on Jan. 8, 2016, now Pat. No. 9,800,309, which is a
(Continued)

(30) Foreign Application Priority Data

Dec. 24, 2008 (KR) .................. 10-2008-0132994
Aug. 11, 2009 (KR) .................. 10-2009-0073606

(51) Int. Cl.
*H04B 7/04*     (2017.01)
*H04B 7/0456*   (2017.01)
(Continued)

(52) U.S. Cl.
CPC ......... *H04B 7/0486* (2013.01); *H04B 7/0456* (2013.01); *H04B 7/0617* (2013.01);
(Continued)

(58) Field of Classification Search
CPC combination set(s) only.
See application file for complete search history.

(56) References Cited

U.S. PATENT DOCUMENTS 9,800,309 B2 * 10/2017 Noh .................. H04B 7/0486
2005/0041750 A1  2/2005 Lau
(Continued)

FOREIGN PATENT DOCUMENTS

CN    101043298    9/2007
CN    101170317    4/2008
(Continued)

OTHER PUBLICATIONS

Qualcomm Europe, "Precoding Design for LTE-A Uplink MIMO Operation," 3GPP TSG-RAN WG1 #56bis, R1-091465, Mar. 2009, 15 pages.
(Continued)

*Primary Examiner* — Jackie Zuniga Abad
(74) *Attorney, Agent, or Firm* — Lee Hong Degerman Kang & Waimey

(57) ABSTRACT

A method and apparatus for allowing a UE to transmit uplink signals using a MIMO scheme are disclosed. In order to maintain good Peak power to Average Power Ratio (PAPR) or Cubic Metric (CM) properties when the UE transmits uplink signals using the MIMO scheme, the UE uses a precoding scheme based on a precoding matrix established in a manner that one layer is transmitted to each antenna in specific rank transmission.

6 Claims, 11 Drawing Sheets

Related U.S. Application Data continuation of application No. 14/627,414, filed on Feb. 20, 2015, now Pat. No. 9,281,886, which is a continuation of application No. 12/539,420, filed on Aug. 11, 2009, now Pat. No. 9,001,802.

(60) Provisional application No. 61/087,990, filed on Aug. 11, 2008, provisional application No. 61/160,711, filed on Mar. 17, 2009, provisional application No. 61/169,726, filed on Apr. 16, 2009, provisional application No. 61/170,106, filed on Apr. 17, 2009, provisional application No. 61/173,585, filed on Apr. 28, 2009.

(51) Int. Cl.
  *H04B 7/06* (2006.01)
  *H04L 25/03* (2006.01)
  *H04L 27/26* (2006.01)
  *H04J 11/00* (2006.01)
  *H04W 72/04* (2009.01)

(52) U.S. Cl.
  CPC .... *H04J 11/0023* (2013.01); *H04L 25/03923* (2013.01); *H04L 25/03929* (2013.01); *H04L 27/2614* (2013.01); *H04L 27/2615* (2013.01); *H04L 27/2636* (2013.01); *H04W 72/04* (2013.01)

(56) References Cited

U.S. PATENT DOCUMENTS

| | | | |
|---|---|---|---|
| 2008/0170523 A1 | 7/2008 | Han et al. | |
| 2008/0192849 A1 | 8/2008 | Kim et al. | |
| 2009/0059844 A1* | 3/2009 | Ko | H04B 7/0413 370/328 |
| 2010/0039928 A1 | 2/2010 | Noh et al. | |
| 2016/0127022 A1 | 5/2016 | Noh et al. | |

FOREIGN PATENT DOCUMENTS

| | | |
|---|---|---|
| CN | 101170386 | 4/2008 |
| KR | 10-0584090 | 5/2006 |
| KR | 1020070080402 | 8/2007 |
| KR | 1020080066628 | 7/2008 |
| WO | 2003084097 | 10/2003 |
| WO | 2007-024913 | 3/2007 |
| WO | 2007/041086 | 4/2007 |
| WO | 2007/075044 | 7/2007 |
| WO | 2007139325 | 12/2007 |
| WO | 2008021396 | 2/2008 |
| WO | 2008-056928 | 5/2008 |
| WO | 2008058143 | 5/2008 |
| WO | 2008/085107 | 7/2008 |
| WO | 2008/086239 | 7/2008 |
| WO | 2009-134082 | 11/2009 |

OTHER PUBLICATIONS

Hyung G. Myung et al., "Peak Power Characteristics of Single Carrier FDMA MIMO Precoding System", Vehicular Technology Conference, Sep. 2007, 6 pages, XP31147449.
European Patent Office Application Serial No. 12008017.1, Search Report dated Jan. 30, 2013, 6 pages.
The State Intellectual Property Office of the People's Republic of China Application Serial No. 200980131273.7, Office Action dated Jun. 12, 2014, 7 pages.
Mujtaba, et al., "Standardization of MIMO-OFDM Technology," Globecom 2007 Tutorial, Nov. 2007, pp. 1-2, 27, 42.
Samsung, "Precoding for Polarized 4Tx Configurations," 3GPP TSG RAN WG1 #48bis, R1-071622, Mar. 2007, 8 pages.
Icera Semiconductor, "Performance of Frequency Selective PMI Compression for E-UTRA: Results for Rank-2 Precoding," 3GPP TSG RAN WG1 #53, R1-082000, May 2008, 5 pages.
Ericsson, "Precoding Considerations in LTE MIMO Downlink," TSG-RAN WG1 #48, R1-071044, Feb. 2007, XP-050105041.
Texas Instruments, "Uplink SU-MIMO for E-UTRA," 3GPP TSG RAN WG1 53bis, R1-082496, Jun. 2008, XP-050110765.
Ericsson, "Uplink SU-MIMO in LTE-Advanced," 3GPP TSG-RAN WG1 #57bis, R1-092027, May 2009, XP-050339495.
3GPP, "3rd Generation Partnership Project; Technical Specification Group Radio Access Network; Physical Channels and Modulation (Release 8)," 3GPP TS 36.211 v1.2.0, Jun. 2007, XP-050088053.
State Intellectual Property Office of the People's Republic of China Application Serial No. 201510593436.0, Office Action dated Nov. 1, 2017, 10 pages.

* cited by examiner (a)

(b)

METHOD AND APPARATUS FOR TRANSMITTING UPLINK SIGNALS USING MULTI-ANTENNA

CROSS REFERENCE TO RELATED APPLICATIONS

This application is a continuation application of U.S. patent application Ser. No. 14/991,284, filed on Jan. 8, 2016, now U.S. Pat. No. 9,800,309, which is a continuation application of U.S. patent application Ser. No. 14/627,414, filed on Feb. 20, 2015, now U.S. Pat. No. 9,281,886, which is a continuation application of U.S. patent application Ser. No. 12/539,420, filed on Aug. 11, 2009, now U.S. Pat. No. 9,001,802, which claims the benefit of earlier filing date and right of priority to Korean Patent Application Nos. 10-2008-0132994, filed on Dec. 24, 2008 and 10-2009-0073606, filed on Aug. 11, 2009, and also claims the benefit of U.S. Provisional Application No(s). 61/087,990, filed on Aug. 11, 2008, 61/160,711, filed on Mar. 17, 2009, 61/169,726, filed on Apr. 16, 2009, 61/170,106, filed on Apr. 17, 2009 and 61/173,585, filed on Apr. 28, 2009, the contents of which are all hereby incorporated by reference herein in their entirety.

BACKGROUND OF THE INVENTION

Field of the Invention

The present invention relates to a wireless mobile communication system, and more particularly to a communication system based on a Multiple Input Multiple Output (MIMO) scheme.

Discussion of the Related Art

MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as a multi-antenna), so that the capacity or performance can be improved. For convenience of description, the term "MIMO" can also be considered to be a multi-antenna technology.

In more detail, MIMO technology is not dependent on a single antenna path to receive a single total message. Instead, the MIMO technology collects a plurality of data fragments received via several antennas, merges the collected data fragments, and completes total data. As a result, MIMO technology can increase a data transfer rate within a predetermined-sized cell region, or can increase system coverage while guaranteeing a specific data transfer rate. Under this situation, MIMO technology can be widely applied to mobile communication terminals, repeaters, or the like. MIMO technology can extend the range of data communication, so that it can overcome the limited amount of transmission (Tx) data of mobile communication systems.

FIG. 1 is a block diagram illustrating a general MIMO communication system.

Referring to FIG. 1, the number of transmission (Tx) antennas in a transmitter is $N_T$, and the number of reception (Rx) antennas in a receiver is $N_R$. In this way, theoretical channel transmission capacity of the MIMO communication system when both the transmitter and the receiver use a plurality of antennas is greater than that of another case in which only the transmitter or the receiver uses several antennas. The theoretical channel transmission capacity of the MIMO communication system increases in proportion to the number of antennas. Therefore, data transfer rate and frequency efficiency are greatly increased. Provided that a maximum data transfer rate acquired when a single antenna is used is set to $R_o$, a data transfer rate acquired when multiple antennas are used can theoretically increase by a predetermined amount that corresponds to the maximum data transfer rate ($R_o$) multiplied by a rate of increase $R_i$. The rate of increase ($R_i$) can be represented by the following equation 1.

$$R_i = \min(N_T, N_R) \qquad \text{[Equation 1]}$$

For example, provided that a MIMO system uses four transmission (Tx) antennas and four reception (Rx) antennas, the MIMO system can theoretically acquire a high data transfer rate which is four times higher than that of a single antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

The above-mentioned MIMO technology can be classified into a spatial diversity scheme (also called a Transmit Diversity scheme) and a spatial multiplexing scheme. The spatial diversity scheme increases transmission reliability using symbols passing various channel paths. The spatial multiplexing scheme simultaneously transmits a plurality of data symbols via a plurality of transmission (Tx) antennas, so that it increases a transfer rate of data. In addition, the combination of the spatial diversity scheme and the spatial multiplexing scheme has also been recently developed to properly acquire unique advantages of the two schemes.

In association with the MIMO technology, a variety of MIMO-associated technologies have been intensively researched by many companies or developers, for example, research into an information theory associated with a MIMO communication capacity calculation under various channel environments or multiple access environments, research into radio frequency (RF) channel measurement and modeling of the MIMO system, and research into a space-time signal processing technology for increasing transmission reliability and data transfer rate.

In a $3^{rd}$ Generation Partnership Project Long Term Evolution (3GPP LTE) system, the above-mentioned MIMO scheme is applied to only downlink signal transmission of the 3GPP LTE system. The MIMO technology may also be applied to uplink signal transmission. In this case, a transmitter structure is changed to implement the MIMO technology, so that a Peak power to Average Power Ratio (PAPR) or Cubic Metric (CM) characteristics may be deteriorated. Therefore, there is needed a new technology capable of effectively applying the MIMO scheme to uplink signal transmission.

SUMMARY OF THE INVENTION

Accordingly, the present invention is directed to a method and apparatus for transmitting uplink signals via multiple antennas that substantially obviate one or more problems due to limitations and disadvantages of the related art.

An object of the present invention is to provide a technology for effectively carrying out uplink signal transmission according to a MIMO scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for enabling a user equipment (UE) to transmit uplink signals via multiple antennas includes mapping the uplink signals to a predetermined number of layers, performing Discrete Fourier Transform (DFT) spreading upon each of the predetermined number of layer signals, precoding the DFT-spread layer signals by selecting a specific precoding matrix established in a manner that one layer signal is transmitted to each of the multiple antennas from among a prestored codebook, and performing a predetermined process for constructing a Single Carrier-Frequency Division Multiple Access (SC-FDMA) symbol upon the precoded signals, and transmitting the processed signals to a base station (BS) via the multiple antennas.

The specific precoding matrix may be a precoding matrix established in a manner that the multiple antennas have uniform transmission power therebetween. The specific precoding matrix may be a precoding matrix established in a manner that the predetermined number of layers have uniform transmission power therebetween The codebook may include a first type precoding matrix, wherein the first type precoding matrix may be configured in a form of $$\begin{bmatrix} 1 & 0 \\ X & 0 \\ 0 & 1 \\ 0 & Y \end{bmatrix},$$

as a Rank 2 precoding matrix utilized when the number of the multiple antennas is 4 and a rank is set to 2, and may satisfy a condition of $$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}.$$

The Rank 2 precoding matrix may further include a precoding matrix generated when positions of individual rows of the first type precoding matrix are changed.

The Rank 2 precoding matrix may further include a second type precoding matrix configured in a form of $$\begin{bmatrix} 1 & 0 \\ 0 & 1 \\ X & 0 \\ 0 & Y \end{bmatrix},$$

and a third type precoding matrix configured in a form of $$\begin{bmatrix} 1 & 0 \\ 0 & 1 \\ 0 & Y \\ X & 0 \end{bmatrix},$$

where individual rows of the precoding matrix may respectively correspond to four antennas of the multiple antennas, and individual columns may respectively correspond to layers.

The Rank 2 precoding matrix may further include a precoding matrix generated when positions of individual columns of the first type precoding matrix are changed.

The codebook may include a first type precoding matrix, wherein the first type precoding matrix, serving as a Rank 3 precoding matrix utilized when the number of the multiple antennas is 4 and a rank is set to 3, is configured in a form of $$\begin{bmatrix} 1 & 0 & 0 \\ 0 & 1 & 0 \\ 0 & 0 & 1 \\ X & 0 & 0 \end{bmatrix},$$

and satisfies a condition of $$X \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}.$$

The Rank 3 precoding matrix may further include a precoding matrix generated when positions of individual rows of the first type precoding matrix are changed. The Rank 3 precoding matrix may further include a precoding matrix generated when positions of individual columns of the first type precoding matrix are changed. That is, the codebook may includes a precoding matrix configured to alternatively map a first layer to first and second antennas and second and third layers to third and fourth antennas, respectively, as the precoding matrix used for the case when the number of antennas is 4 and the rank is 3.

When the number of antennas is 4, the Rank is 3, and the number of codewords is 2, one of the codeword is mapped to a single layer, and the other codeword is mapped to two layers. The precoding matrix can be configured so that the total transmission power from the layer perspective may be different in order to enforce uniform transmission power between multiple antennas. In such a case the precoding matrix column which has larger effective transmission power is mapped to the layer which is solely mapped to a single codeword. Thus in case of precoding matrix in the form of $$\begin{bmatrix} 1 & 0 & 0 \\ 0 & 1 & 0 \\ 0 & 0 & 1 \\ X & 0 & 0 \end{bmatrix},$$

the first column is mapped to the layer which his solely mapped to a single codeword, and the second and third column is mapped to layers which is mapped to the other codeword.

The codebook may include a different number of precoding matrices for each rank.

Each of the uplink signals may be entered in units of a codeword, and the mapping step of the uplink signals to the predetermined number of layers may periodically change a layer mapped to a specific codeword to another layer. One example of this periodicity can be 1 SC-FDMA symbol.

In another aspect of the present invention, a user equipment (UE) for transmitting uplink signals via multiple antennas includes multiple antennas for transmitting and receiving signals, a memory for storing a codebook having a precoding matrix established in a manner that one layer signal is transmitted to the multiple antennas, and a processor connected to the multiple antennas and the memory so as to process the uplink signal transmission. The processor includes a layer mapper for mapping the uplink signals to a predetermined number of layers corresponding to a specific rank, a Discrete Fourier Transform (DFT) module for performing DFT spreading upon each of the predetermined number of layer signals, a precoder for precoding each of the DFT-spread layer signals received from the DFT module by selecting a specific precoding matrix established in a manner that one layer signal is transmitted to each of the multiple antennas from among a codebook stored in the memory, and a transmission module for performing a predetermined process for constructing a Single Carrier-Frequency Division Multiple Access (SC-FDMA) symbol upon the precoded signals, and transmitting the processed signals to a base station (BS) via the multiple antennas.

In this case, the memory may store the codebook. The processor may perform the antenna shift and/or the layer shift either in a different way from the precoding of a precoder or through row permutation and/or column permutation of a precoding matrix.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. Also, wherever possible, the same reference numbers will be used throughout the drawings to refer to the same or like parts.

Peak power to Average Power Ratio (PAPR) is a parameter indicating characteristics of a waveform. PAPR is a specific value acquired when a peak amplitude of the waveform is divided by a time-averaged Root Mean Square (RMS) value of the waveform. PAPR is a dimensionless value. In general, a PAPR of a single carrier signal is better than that of a multi-carrier signal.

An LTE-Advanced scheme can implement MIMO technology using Single Carrier-Frequency Division Multiple Access (SC-FDMA) so as to maintain a superior CM property. When using general precoding, a signal including information corresponding to several layers is multiplexed and transmitted via a single antenna, so that the signal transmitted via this antenna may be considered to be a kind of multi-carrier signal. PAPR is associated with a dynamic range that must be supported by a power amplifier of a transmitter, and a CM value is another value capable of being used as a substitute for the PAPR.

Figure 1:
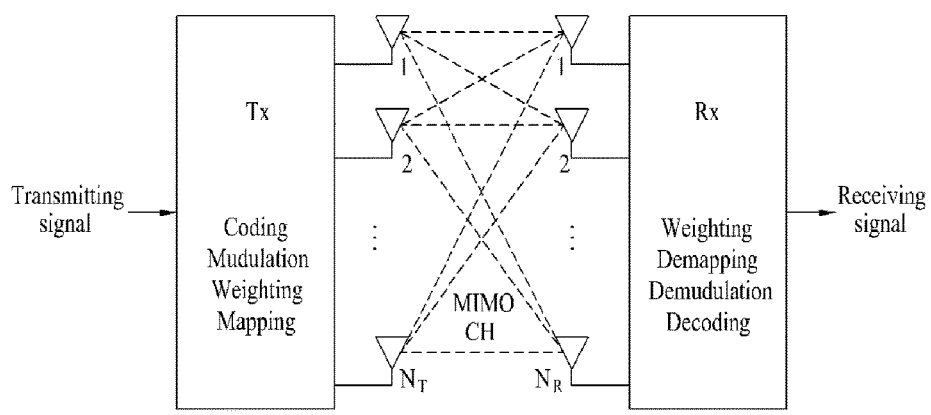
FIG. 1 is a conceptual diagram illustrating a general MIMO communication system.
Figure 2:
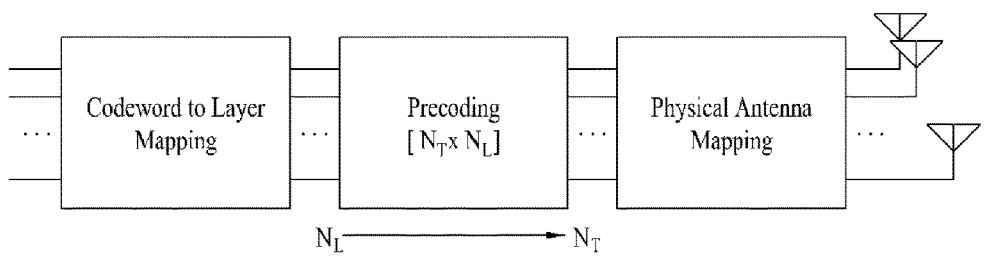
FIGS. 2 and 3 illustrate a general structure of a transmitter based on a MIMO technology.

FIG. 2 shows a general structure of a transmitter based on a MIMO technology.

In FIG. 2, one or more codewords are mapped to a plurality of layers. In this case, mapping information is mapped to each physical antenna by a precoding process, and is then transmitted via each physical antenna.

Figure 3:
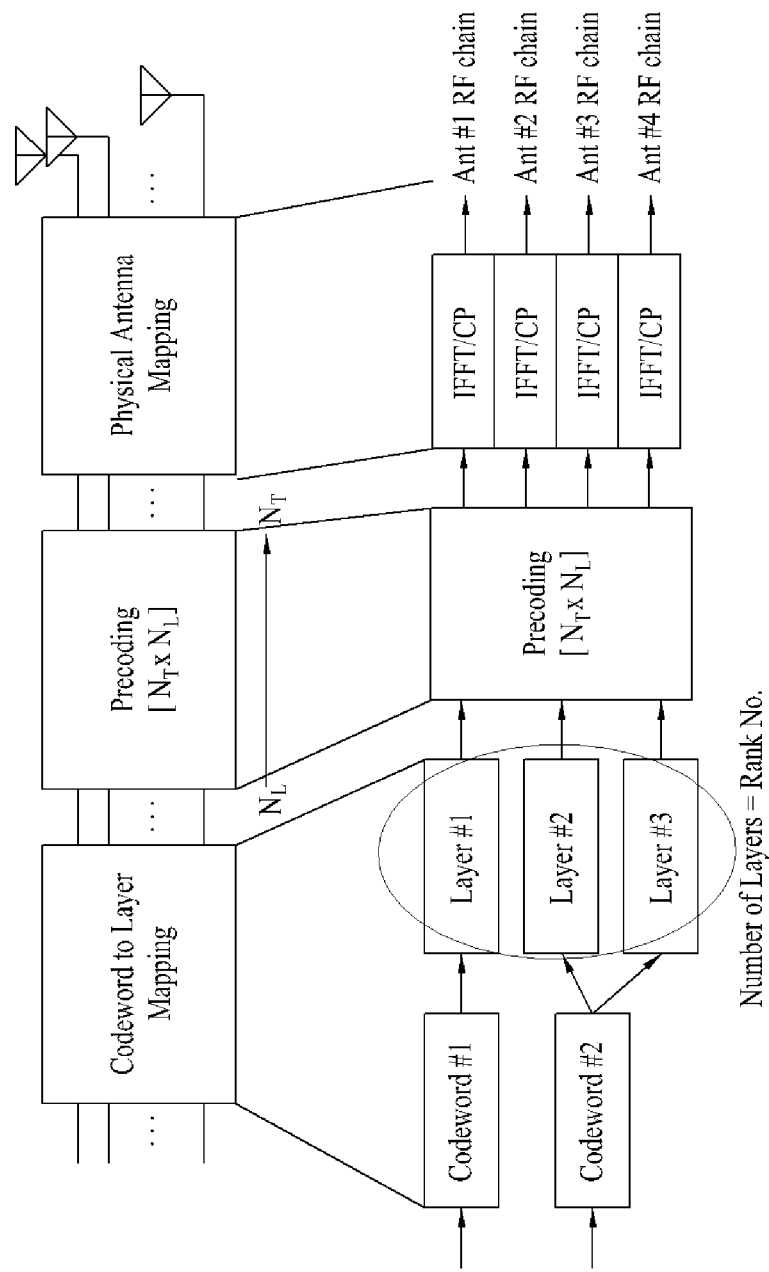

FIG. 3 is a detailed block diagram illustrating the MIMO-based transmitter shown in FIG. 2.

The term 'codeword' indicates that Cyclic Redundancy Check (CRC) bits are attached to data information and are then encoded by a specific coding method. There are a variety of coding methods, for example, a turbo code, a tail biting convolution code, and the like. Each codeword is mapped to one or more layers (i.e., one or more virtual layers), and a total number of mapped layers is equal to a rank value. In other words, if a transmission rank is 3, a total number of transmission layers is also set to 3. Information mapped to each layer is precoded. In this case, data information mapped to each layer is mapped to a physical layer through a precoding process (where, the term 'layer' means a virtual layer as far as it especially designates a physical layer). Information is transmitted to each antenna via each physical layer. Under the condition that no specified explanation is shown in FIG. 3, the precoding is carried out in a frequency domain, and an OFDM information transmission scheme is used for information mapped to the physical layer. The information mapped to the physical layer is mapped to a specific frequency domain, and is then IFFT-processed. After that, a cyclic prefix (CP) is attached to the IFFT result. Thereafter, information is transmitted to each antenna via a radio frequency (RF) chain.

The precoding process may be carried out by matrix multiplication. In each of the matrices, the number of rows is equal to the number of physical layers (i.e., the number of antennas), and the number of columns is equal to a rank value. The rank value is equal to the number of layers, so that the number of columns is equal to the number of layers. Referring to the following equation 2, information mapped to a layer (i.e., a virtual layer) is $x_1$ and $x_2$, each element $p_{ij}$ of a (4×2) matrix is a weight used for precoding. $y_1$, $y_2$, $y_3$, and $y_4$ are information mapped to physical layers, and are transmitted via respective antennas using individual OFDM transmission schemes.

$$\begin{bmatrix} y_1 \\ y_2 \\ y_3 \\ y_4 \end{bmatrix} = \begin{bmatrix} p_{11} & p_{21} \\ p_{12} & p_{22} \\ p_{13} & p_{23} \\ p_{14} & p_{24} \end{bmatrix} \cdot \begin{bmatrix} x_1 \\ x_2 \end{bmatrix}$$ [Equation 2]

In the following description, a virtual layer will hereinafter be referred to as a layer so long as such use will not lead to confusion. An operation for mapping a virtual layer signal to a physical layer will hereinafter be considered to be an operation for directly mapping a layer to an antenna.

The precoding method can be mainly classified into two methods, i.e., a wideband precoding method and a subband precoding method.

The wideband precoding method is as follows. According to the wideband precoding method, when precoding is carried out in a frequency domain, the same precoding matrix is applied to all information transmitted to the frequency domain.

Figure 4:
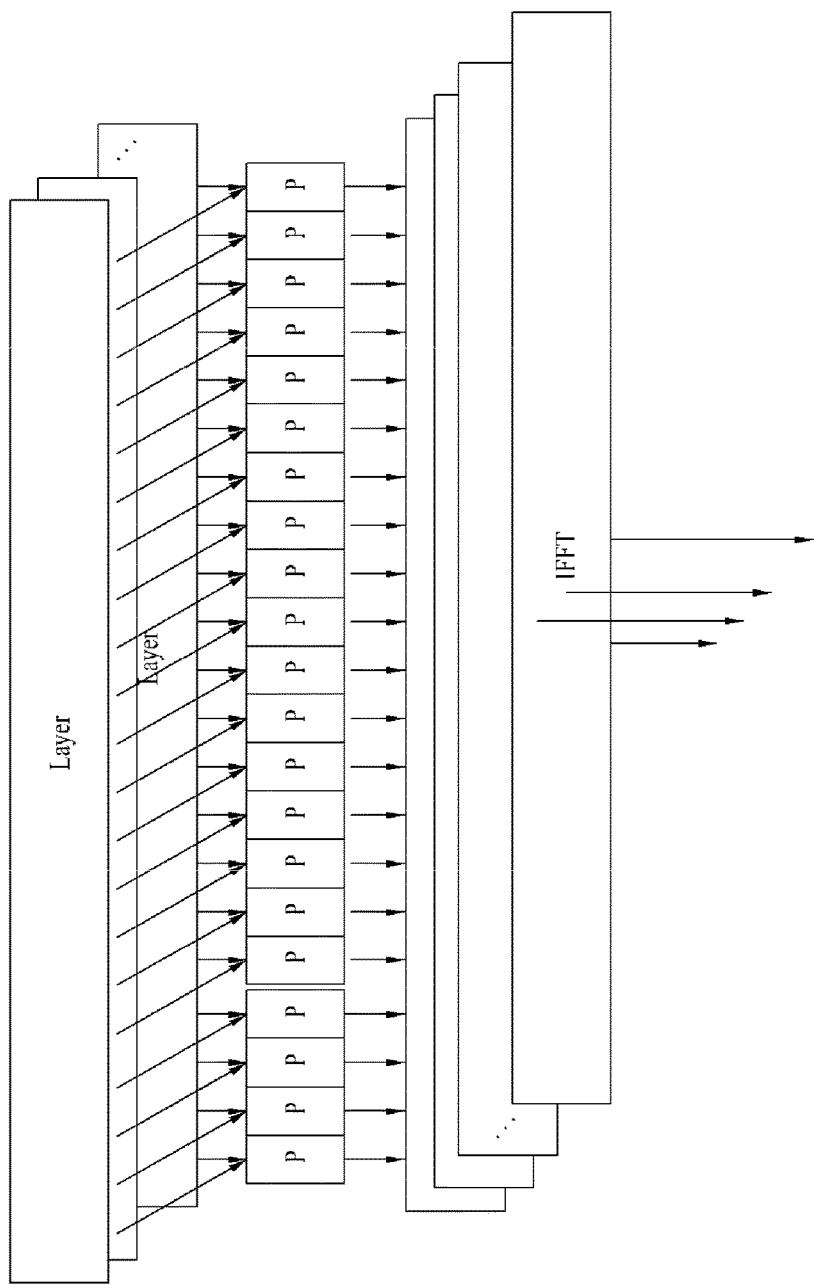
FIG. 4 is a conceptual diagram illustrating a method for precoding information of each layer and transmitting the precoded information via an antenna.

FIG. 4 is a conceptual diagram illustrating a method for precoding information of each layer and transmitting the precoded information via an antenna.

Referring to FIG. 4, it can be recognized that information corresponding to a plurality of layers is precoded while being classified according to subcarriers of each frequency domain, and the precoded information is transmitted via each antenna. All precoding matrices 'P' for use in the wideband precoding method are equal to each other.

The subband precoding method is provided by the extension of the wideband precoding method. The subband precoding method applies a variety of precoding matrices to each subcarrier without applying the same precoding matrix to all subcarriers. In other words, according to the subband precoding method, a precoding matrix 'P' is used in a specific subcarrier, and another precoding matrix 'M' is used in the remaining subcarriers other than the specific subcarrier. Herein, element values of the precoding matrix 'P' are different from those of the other precoding matrix 'M'.

Uplink signal transmission is relatively sensitive to PAPR or CM properties as compared to downlink signal transmission. The increase of filter costs caused by the increase of PAPR or CM properties may generate more serious problems in a user equipment (UE). Thus, the SC-FDMA scheme is used for uplink signal transmission.

Figure 5:
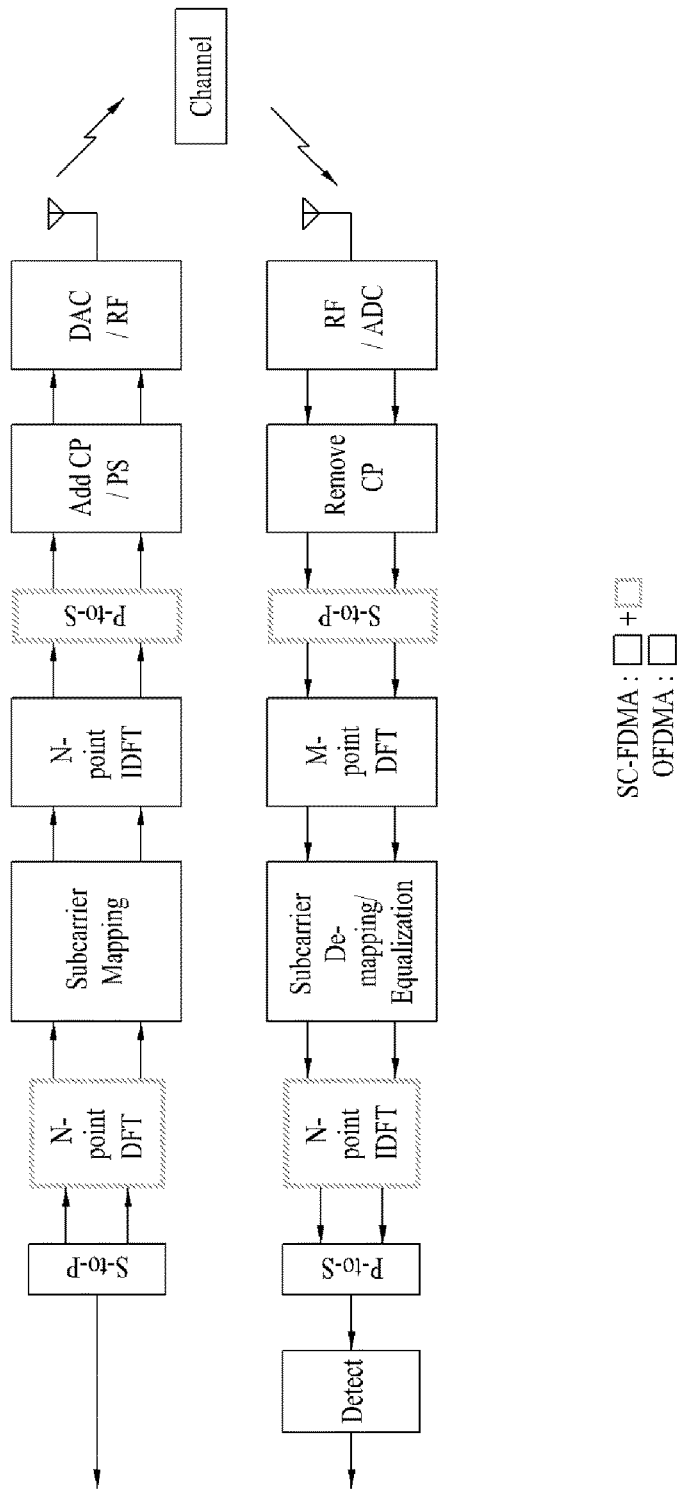
FIG. 5 is a conceptual diagram illustrating a general SC-FDMA scheme.

FIG. 5 is a conceptual diagram illustrating a general SC-FDMA scheme.

As shown in FIG. 5, the OFDM scheme and the SC-FDMA scheme are considered to be identical with each other, because they convert a serial signal into parallel signals, map the parallel signals to subcarriers, perform an IDFT or IFFT process on the mapped signals, convert the IDFT- or IFFT-processed signals into a serial signal, attach a cyclic prefix (CP) to the resultant serial signal, and transmit the CP resultant signal via a radio frequency (RF) module. However, in contrast to the OFDM scheme, the SC-FDMA scheme converts parallel signals into a serial signal, and performs DFT spreading upon the serial signal, so that it reduces the influence of a next IDFT or IFFT process and maintains a single signal characteristic of more than a predetermined level.

In the meantime, the reason why the CM value is degraded when a MIMO scheme is applied to uplink signal transmission is as follows. If a plurality of single-carrier signals each having good CM properties is simultaneously overlapped with each other, the overlapped signals may have poor CM properties. Therefore, if the SC-FDMA system multiplexes output information of several layers using a minimum number of single-carrier signals or one single-carrier signal on a single physical antenna, a transmission signal having a good CM can be generated.

A codeword-layer mapping process may be performed before information to be transmitted is precoded. Since the SC-FDMA scheme is generally used for one transmission mode (1Tx), the number of layers is 1. However, if the SC-FDMA scheme supports a MIMO scheme, the number of layers is plural, and a codeword composed of a single transport block may be mapped to a plurality of layers.

Figure 6:
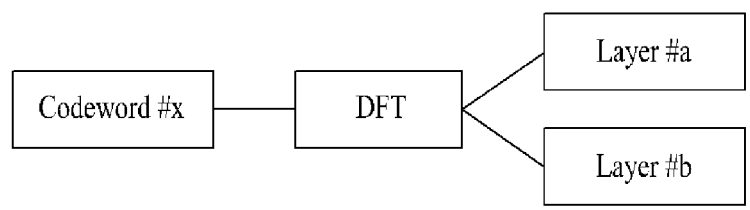
FIG. 6 is a conceptual diagram illustrating a method for mapping a codeword to several layers.

FIG. 6 is a conceptual diagram illustrating a method for mapping a codeword to several layers.

Referring to FIG. 6, if the codeword-layer mapping is carried out after a DFT process for the SC-FDMA scheme is performed, a CM value may be increased. That is, because an output signal of a DFT block undergoes other processes before entering an IFFT module, i.e., because the output signal of the DFT block is divided into two layers, a CM value may be increased.

Figure 7:
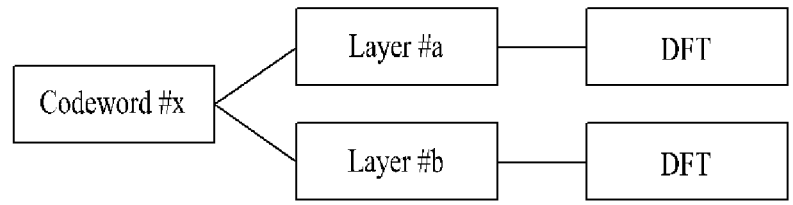
FIG. 7 is a conceptual diagram illustrating a method for performing a DFT upon each layer after performing codeword-to-layer mapping (i.e., codeword-layer mapping) so as to prevent a CM value for each antenna from being increased.

FIG. 7 is a conceptual diagram illustrating a method for performing DFT upon each layer after performing codeword-to-layer mapping (i.e., a codeword-layer mapping) so as to prevent a CM value for each antenna from being increased.

Therefore, if the number of DFT blocks is changed while being classified according to layer numbers based on a rank value, a low CM value can be maintained. That is, the output signal of the DFT block is directly input to the IFFT block without passing through other processes, so that a low CM value can be maintained. In the case of actual implementation, a plurality of layers may share a single DFT block.

If a plurality of layer signals is transmitted via a single antenna by applying the MIMO scheme to uplink signal transmission, a PAPR or a CM property may be deteriorated.

In order to overcome the above-mentioned problem, the following embodiments of the present invention will describe a method for designing a codebook based on a precoding matrix by which only one layer signal is transmitted via a single antenna.

For convenience of description and better understanding of the present invention, in a transmission system, it is assumed that a set of signals transferred to a precoding block is set to 'x', and a set of precoded signals is set to 'y'. In this case, if the precoding matrix is 'P', the following equation 3 is acquired.

$$Y = P \cdot x \quad \text{[Equation 3]}$$

In Equation 3, a dimension of 'P' is $N_T \times N_L$, a dimension of 'x' is $N_L \times 1$, a dimension of 'y' is $N_T \times 1$. In this case, $N_T$ is the number of antennas, and $N_L$ is the number of layers.

In the following description, a principle of designing a codebook that is capable of being applied to uplink signal transmission using a MIMO scheme by a UE will be firstly described in chapter (I), and a detailed format of the codebook will then be described in chapter (II).

I. Principle of Codebook Design

<2Tx Codebook>

A variety of embodiments according to a structure of a precoding matrix contained in a codebook used in a 2Tx mode will hereinafter be described.

The method according to embodiments of the present invention includes: generating a plurality of streams by mapping a codeword to a plurality of layers; and precoding the generated streams, mapping the precoded streams to a plurality of antennas, and transmitting the mapped result via the antennas. In this case, the codebook may be configured as follows. A precoding matrix used in Rank 1 and the other precoding matrix used in Rank 2 will be described in different ways.

2Tx—Rank 1 Precoding Matrix

In case of 2Tx—Rank 1, Equation 3 can be rewritten as the following equation 4 according to embodiments of the present invention.

$$y = \begin{bmatrix} y_1 \\ y_2 \end{bmatrix} = P \cdot x = \begin{bmatrix} a \\ b \end{bmatrix} \cdot [x_1] = \begin{bmatrix} ax_1 \\ bx_1 \end{bmatrix} \quad \text{[Equation 4]}$$

In general, if it is assumed that a wideband precoding scheme is used, a specific constant value is multiplied by a signal of each layer according to a Rank 1 precoding scheme, a PAPR and CM value of a signal transmitted via each antenna in the 2Tx mode are equal to those in a 1Tx mode. Thus, when using wideband precoding, the PAPR and the CM are not affected by values of a 2Tx—Rank 1 precoding matrix.

Precoding is a method for changing a channel so as to acquire a constructive effect between signals transferred via each channel. Thus, transmission performance of each signal is improved. Accordingly, 'a' indicating a first element of the precoding matrix P illustrated in Equation 4 is set to '1', and a second element 'b' of the precoding matrix P may be set to an arbitrary value. Signals transferred via respective antennas have the same power, so that all power amplifiers contained in each antenna can be maximally used. For this purpose, the above-mentioned second element 'b' may be a complex number having an absolute value of 1. In other words, P shown in Equation 4 may be represented by $$P = \begin{bmatrix} 1 \\ e^{j\theta} \end{bmatrix}.$$

There is a limitation in the number of precoding matrices contained in a codebook used for the precoding, because both a transmission end and a reception end must have a codebook and information about a predetermined precoding matrix is communicated between the transmission end and the reception end. As a result, the transmission end and the reception end must use a limited number of precoding matrices. For this operation, a complex number that has an absolute value of 1 and a phase corresponding to any one of +0°, +45°, +90°, +135°, +180°, −135°, −90°, and −45° may be used as each element of the precoding matrix. That is, in the above-mentioned expression $$P = \begin{bmatrix} 1 \\ e^{j\theta} \end{bmatrix},$$

θ may be represented by $$\theta \in \left\{ 0, \frac{\pi}{4}, \frac{\pi}{2}, \frac{3\pi}{4}, \pi, \frac{5\pi}{4}, \frac{6\pi}{4}, \frac{7\pi}{4} \right\}.$$

In other words, P may be represented by $$P \in \left\{ \begin{bmatrix} 1 \\ 1 \end{bmatrix}, \begin{bmatrix} 1 \\ \frac{1+j}{\sqrt{2}} \end{bmatrix}, \begin{bmatrix} 1 \\ j \end{bmatrix}, \begin{bmatrix} 1 \\ \frac{1-j}{\sqrt{2}} \end{bmatrix}, \begin{bmatrix} 1 \\ -1 \end{bmatrix}, \begin{bmatrix} 1 \\ \frac{-1-j}{\sqrt{2}} \end{bmatrix}, \begin{bmatrix} 1 \\ -j \end{bmatrix}, \begin{bmatrix} 1 \\ \frac{-1+j}{\sqrt{2}} \end{bmatrix} \right\}.$$

2Tx—Rank 2 Precoding Matrix

In case of a 2Tx—Rank 2, the equation 3 may be rewritten as the following equation 5.

$$y = \begin{bmatrix} y_1 \\ y_2 \end{bmatrix} = P \cdot x = \begin{bmatrix} p_{11} & p_{12} \\ p_{21} & p_{22} \end{bmatrix} \cdot \begin{bmatrix} x_1 \\ x_2 \end{bmatrix} = \begin{bmatrix} p_{11}x_1 + p_{12}x_2 \\ p_{21}x_1 + p_{22}x_2 \end{bmatrix} \quad \text{[Equation 5]}$$

In Equation 5, the signal $y_k$ transferred via each antenna is composed of a combination of several input signals $x_i$, so that a CM value may be increased.

In this case, if each of $p_{12}$ and $p_{21}$ is set to zero '0' or if each of $p_{11}$ and $p_{22}$ is set to zero '0', only one signal can be transmitted via each antenna. Thus, if it is assumed that a CM value of a signal $x_i$ is considered to be good, a CM value of the precoded signal also becomes good. In association with FIG. 7, in the case where a codeword is mapped to each layer, DFT spreading is applied to the resultant signal mapped to each layer, and a precoding process for allowing each antenna to transmit only one layer signal is carried out, the same effect as in an IDFT or IFFT process that is performed as soon as a DFT process was performed can be acquired, and a PAPR or CM property can be maintained at a good status. A detailed description of this will hereinafter be explained in the following description.

In this case, if each of $p_{12}$ and $p_{21}$ is zero '0', a signal corresponding to each layer is transmitted via each antenna after being multiplied by a constant complex value. As a result, although the above-mentioned constant complex value is set to 1, performance is not affected by this constant complex value of 1.

Therefore, Equation 5 can be represented by the following equation 6.

$$y = \begin{bmatrix} y_1 \\ y_2 \end{bmatrix} = \quad \text{[Equation 6]}$$

$$P \cdot x = \begin{bmatrix} p_{11} & 0 \\ 0 & p_{22} \end{bmatrix} \cdot \begin{bmatrix} x_1 \\ x_2 \end{bmatrix} = \begin{bmatrix} 1 & 0 \\ 0 & 1 \end{bmatrix} \cdot \begin{bmatrix} x_1 \\ x_2 \end{bmatrix} = \begin{bmatrix} x_1 \\ x_2 \end{bmatrix},$$

$$P \in \left\{ \begin{bmatrix} 1 & 0 \\ 0 & 1 \end{bmatrix} \right\}$$

<4Tx Codebook>

A variety of embodiments according to a structure of a precoding matrix contained in a codebook used in a 4Tx mode will hereinafter be described.

The method according to embodiments of the present invention includes: generating a plurality of streams by mapping a codeword to a plurality of layers; and precoding the generated streams, mapping the precoded streams to a plurality of antennas, and transmitting the mapped result via the antennas. In this case, the codebook may be configured as follows. Precoding matrices respectively used in Rank 1, Rank 2, Rank 3, and Rank 4 will be described in different ways.

4Tx—Rank 1 Precoding Matrix

In case of 4Tx—Rank 1, Equation 3 can be rewritten as the following equation 7.

$$y = \begin{bmatrix} y_1 \\ y_2 \\ y_3 \\ y_4 \end{bmatrix} = P \cdot x = \begin{bmatrix} a \\ b \\ c \\ d \end{bmatrix} \cdot [x_1] = \begin{bmatrix} ax_1 \\ bx_1 \\ cx_1 \\ dx_1 \end{bmatrix} \quad \text{[Equation 7]}$$

In case of using the wideband precoding scheme in the same manner as in the 2Tx—Rank 1 codebook, a CM of a signal transmitted via each antenna by a 4Tx—Rank 1 precoding process is equal to a CM of a signal used in the 1Tx mode. Thus, all kinds of precoding matrices can be freely applied to such a CM without any problems.

4Tx—Rank 2 Precoding Matrix

In case of 4Tx—Rank 2, Equation 3 can be rewritten as the following equation 8.

$$y = \begin{bmatrix} y_1 \\ y_2 \\ y_3 \\ y_4 \end{bmatrix} = P \cdot x = \begin{bmatrix} p_{11} & p_{12} \\ p_{21} & p_{22} \\ p_{31} & p_{32} \\ p_{41} & p_{42} \end{bmatrix} \cdot \begin{bmatrix} x_1 \\ x_2 \end{bmatrix} = \begin{bmatrix} p_{11}x_1 + p_{12}x_2 \\ p_{21}x_1 + p_{22}x_2 \\ p_{31}x_1 + p_{32}x_2 \\ p_{41}x_1 + p_{42}x_2 \end{bmatrix} \quad \text{[Equation 8]}$$

In a 4Tx—Rank 2 codebook, in a similar way as in the 2Tx—Rank 2 codebook, a specific element of a precoding matrix is set to zero '0', so that the overlapping of signals transmitted via respective antennas is minimized and thus a CM can be maintained at a low value.

In Equation 8, if it is assumed that $p_{k1}$ or $p_{k2}$ in a signal $(p_{k1}x_1 + p_{k2}x_2)$ transmitted via each antenna is set to zero '0', the signal transmitted via each antenna becomes equal to a signal transmitted from a single layer, and therefore a CM of the signal transmitted via each antenna can be maintained at a low value.

In one embodiment of the present invention, 'P' included in Equation 8 may be represented by $$P = \begin{bmatrix} p_{11} & 0 \\ p_{21} & 0 \\ 0 & p_{32} \\ 0 & p_{42} \end{bmatrix}.$$

Equation 8 may be rewritten as the following equation 9.

$$y = \begin{bmatrix} y_1 \\ y_2 \\ y_3 \\ y_4 \end{bmatrix} = P \cdot x = \begin{bmatrix} p_{11} & 0 \\ p_{21} & 0 \\ 0 & p_{32} \\ 0 & p_{42} \end{bmatrix} \cdot \begin{bmatrix} x_1 \\ x_2 \end{bmatrix} = \begin{bmatrix} p_{11}x_1 \\ p_{21}x_1 \\ p_{31}x_2 \\ p_{41}x_2 \end{bmatrix} \quad \text{[Equation 9]}$$

Referring to Equation 9, only one layer is mapped to a signal transmitted via each antenna. From the viewpoint of a single layer, it is considered that the 2Tx—Rank 1 precoding is applied to information transmitted via this single layer. Thus, the 4Tx—Rank 2 precoding matrix can be configured using a 2Tx—Rank 2 precoding matrix. In other words, the 4Tx—Rank 2 precoding matrix may be a super matrix of the 2Tx—Rank 1 precoding matrix.

For example, 'P' according to one embodiment of the present invention can be represented by Equation 10.

$$P = \begin{bmatrix} \begin{bmatrix} 1 \\ X \end{bmatrix} & 0 \\ 0 & \begin{bmatrix} 1 \\ Y \end{bmatrix} \end{bmatrix} = \begin{bmatrix} 1 & 0 \\ X & 0 \\ 0 & 1 \\ 0 & Y \end{bmatrix}, \quad \text{[Equation 10]}$$

$$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The above-mentioned 2Tx—Rank1 precoding matrix is used for a method for transmitting information by applying two antennas to a single layer signal. However, if it is assumed that there are four physical antennas, communication performance may be changed according to which combination composed of two antennas is used for data transmission. In this case, the selected combination of antennas may be changed according to a value of the precoding matrix P.

For example, according to one embodiment of the present invention, the precoding matrix P may be configured in various formats. Respective formats may indicate different antenna combinations.

$$P \in \left\{ \begin{bmatrix} 1 & 0 \\ X & 0 \\ 0 & 1 \\ 0 & Y \end{bmatrix}, \begin{bmatrix} 1 & 0 \\ 0 & 1 \\ X & 0 \\ 0 & Y \end{bmatrix}, \begin{bmatrix} 1 & 0 \\ 0 & 1 \\ 0 & Y \\ X & 0 \end{bmatrix} \right\} \quad \text{[Equation 11]}$$

In Equation 11, if an appropriate value is selected as a precoding matrix P, performance improvement due to precoding can be enhanced. If the precoding matrix is configured as described above, a signal corresponding to each layer uses two antennas among a total of four antennas, channel estimation performances among respective layers become similar to each other, and a CM value for each antenna can be minimized.

Generally, although a constant value is multiplied by a specific column vector of an arbitrary precoding matrix, characteristics of the precoding matrix are not changed. Therefore, although a constant value is multiplied by a specific column of the above-mentioned precoding matrix, characteristics of the precoding matrix are not changed. As a result, the above-mentioned operation for multiplying a constant value by a specific column vector of the precoding matrix does not depart from the scope of the present invention.

In addition, if a predetermined scaling factor is multiplied by the precoding matrix shown in Equation 11, the multiplied result may be represented by the following equation 12.

$$P \in \left\{ k \cdot \begin{bmatrix} 1 & 0 \\ X & 0 \\ 0 & 1 \\ 0 & Y \end{bmatrix}, k \cdot \begin{bmatrix} 1 & 0 \\ 0 & 1 \\ X & 0 \\ 0 & Y \end{bmatrix}, k \cdot \begin{bmatrix} 1 & 0 \\ 0 & 1 \\ 0 & Y \\ X & 0 \end{bmatrix} \right\} \quad \text{[Equation 12]}$$

$$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

4Tx—Rank 3 Precoding Matrix (1)

In case of 4Tx—Rank 3, Equation 3 can be rewritten as the following equation 13.

$$y = \begin{bmatrix} y_1 \\ y_2 \\ y_3 \\ y_4 \end{bmatrix} = P \cdot x = \begin{bmatrix} p_{11} & p_{12} & p_{13} \\ p_{21} & p_{22} & p_{23} \\ p_{31} & p_{32} & p_{33} \\ p_{41} & p_{42} & p_{43} \end{bmatrix} \cdot \begin{bmatrix} x_1 \\ x_2 \\ x_3 \end{bmatrix} = \quad \text{[Equation 13]}$$

$$\begin{bmatrix} p_{11}x_1 + p_{12}x_2 + p_{13}x_3 \\ p_{21}x_1 + p_{22}x_2 + p_{23}x_3 \\ p_{31}x_1 + p_{32}x_2 + p_{33}x_3 \\ p_{41}x_1 + p_{42}x_2 + p_{43}x_3 \end{bmatrix}$$

In a 4Tx—Rank 3 precoding matrix in a similar way as in the 4Tx—Rank 2 precoding matrix, a specific element of a precoding matrix is set to zero '0', so that the overlapping of signals transmitted via respective antennas is minimized and thus a CM can be maintained at a low value.

In Equation 13, if it is assumed that $p_{k1}$, $p_{k2}$, or $p_{k3}$ in a signal $(p_{k1}x_1 + p_{k2}x_2 + p_{k3}x_3)$ transmitted via each antenna is set to zero '0', a CM of the signal transmitted via each antenna can be maintained at a low value.

In one embodiment of the present invention, 'P' included in Equation 12 may be represented by $$P = \begin{bmatrix} p_{11} & 0 & 0 \\ 0 & p_{22} & 0 \\ 0 & 0 & p_{33} \\ p_{41} & p_{42} & p_{43} \end{bmatrix}.$$

Equation 13 may be rewritten as the following equation 14.

$$y = \begin{bmatrix} y_1 \\ y_2 \\ y_3 \\ y_4 \end{bmatrix} = P \cdot x = \begin{bmatrix} p_{11} & 0 & 0 \\ 0 & p_{22} & 0 \\ 0 & 0 & p_{33} \\ p_{41} & p_{42} & p_{43} \end{bmatrix} \cdot \begin{bmatrix} x_1 \\ x_2 \\ x_3 \end{bmatrix} = \quad \text{[Equation 14]}$$

$$\begin{bmatrix} p_{11}x_1 \\ p_{21}x_1 \\ p_{31}x_1 \\ p_{41}x_1 + p_{42}x_2 + p_{43}x_3 \end{bmatrix}$$

In Rank 3, the number of layers to be transmitted is 3, and the number of physical antennas is 4. In this case, each of the three antennas may be independently mapped to a single layer. Herein, only a signal of a single layer may be mapped to the remaining one antenna, or signals of at least two layers may be mapped to the remaining one antenna. If only a signal of a specific single layer is mapped to the remaining one antenna, a CM of the signal transmitted via this antenna may have good characteristics, but communication performance of the specific single layer may be different from that of another layer. For example, in the case where information of a first layer (Layer 1) is mapped to a first antenna (Antenna 1) and a fourth antenna (Antenna 4), information of a second layer (Layer 2) is mapped to a second antenna (Antenna 2), and information of a third layer (Layer 3) is mapped to a third antenna (Antenna 3), communication performance of the Layer 1 information may be different from that of either the Layer 2 or the Layer 3.

In one embodiment of the present invention, in order to minimize a CM value for each antenna in the precoding process, the precoding matrix P may have any one of the values of $P_1$, $P_2$, and $P_3$ shown in the following equation 15.

$$P_1 = \begin{bmatrix} 1 & 0 & 0 \\ 0 & 1 & 0 \\ 0 & 0 & 1 \\ X & 0 & 0 \end{bmatrix}, P_2 = \begin{bmatrix} 1 & 0 & 0 \\ 0 & 1 & 0 \\ 0 & 0 & 1 \\ 0 & Y & 0 \end{bmatrix}, \quad \text{[Equation 15]}$$

$$P_3 = \begin{bmatrix} 1 & 0 & 0 \\ 0 & 1 & 0 \\ 0 & 0 & 1 \\ 0 & 0 & Z \end{bmatrix} \text{ where,}$$

$$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

In case of using the above-mentioned precoding matrices $P_1$, $P_2$, and $P_3$, numbers of antennas used for individual layers are different from each other. However, if it is assumed that the precoding matrices $P_1$, $P_2$ and $P_3$ are evenly used to transmit certain information, instead of using any one of the precoding matrices $P_1$, $P_2$ and $P_3$, numbers of antennas used for individual layers may be normalized. Although the precoding matrices $P_1$, $P_2$ and $P_3$ can be alternately used in a frequency domain, a single carrier property of a signal composed of a single carrier is damaged, so that a CM value is unavoidably increased. Therefore, if the precoding matrices $P_1$, $P_2$ and $P_3$ are alternately applied to each SC-FDMA symbol, no additional increase in CM is achieved. In case of transmitting data, information may be decoded in units of one subframe. Thus, if the precoding matrices $P_1$, $P_2$ and $P_3$ are alternately applied to each SC-FDMA symbol, each layer information of the whole information transmitted via a single subframe can be transmitted via the same number of antennas on average.

In another embodiment of the present invention, the position of an antenna used by each layer is changed so that performance can be improved. The changing of the antenna position may be carried out with time. In particular, the antenna position can be changed at each SC-FDMA symbol. A detailed method for changing the antenna position will hereinafter be described in detail.

For example, the position of a value other than '0' in the precoding matrix is changed to another position in the range of a row vector, so that the position of an antenna via which each layer signal is transmitted can be changed to another position. As another example, the above-mentioned method may be implemented by a row/column permutation because position permutation is carried out between rows or columns of a given precoding matrix.

Figure 8:
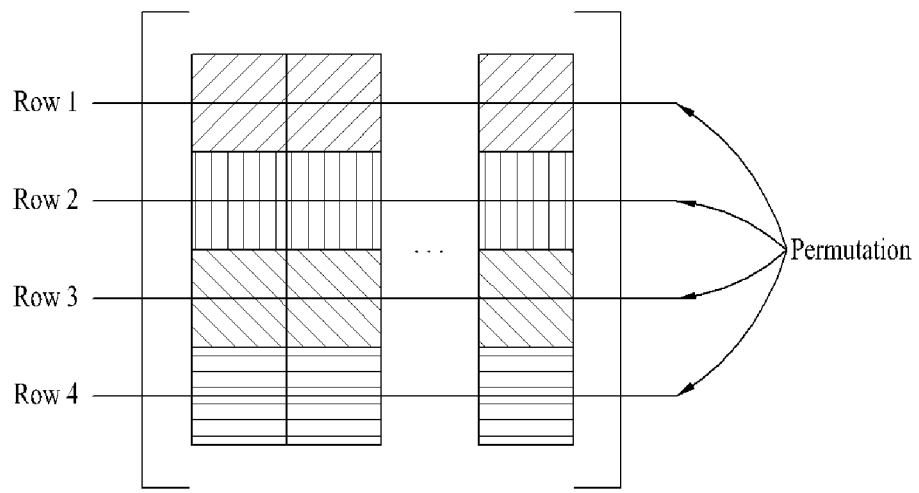
FIG. 8 is a conceptual diagram illustrating a method for performing permutation on the position of a row or column of a precoding matrix.
Figure 8:
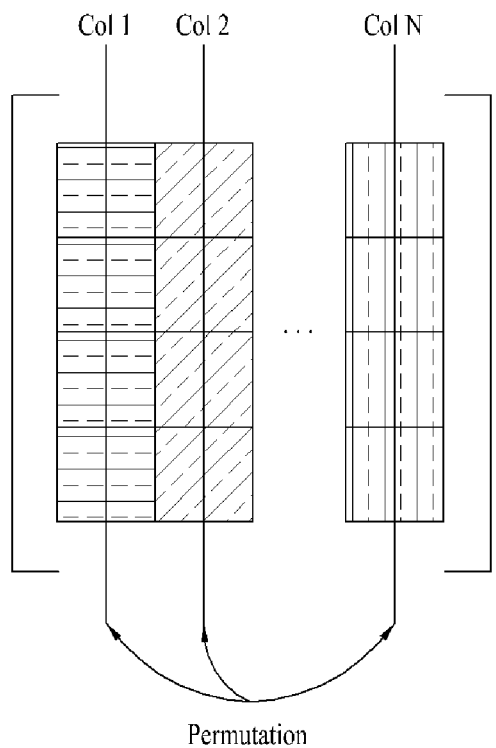

FIG. 8 is a conceptual diagram illustrating a method for performing permutation on the position of a row or column of a precoding matrix.

In more detail, FIG. 8(a) is a conceptual diagram illustrating a method for performing permutation on the position of a row, and FIG. 8(b) is a conceptual diagram illustrating a method for performing permutation on the position of a column.

In the precoding matrix shown in Equation 15, a precoding matrix $P_1$ can be row-permuted and/or column-permuted, so that a precoding matrix $P_2$ or $P_3$ can be generated. Therefore, in the structure such as the precoding matrix $P_1$, $P_2$ or $P_3$, a new unique precoding matrix can be acquired only by row permutation.

The order of rows changed by row permutation available in the 4Tx mode can be represented by the following expression.

{1, 2, 3, 4}, {1, 2, 4, 3}, {1, 3, 2, 4}, {1, 3, 4, 2},

{1, 4, 2, 3}, {1, 4, 3, 2}, {2, 1, 3, 4}, {2, 1, 4, 3},

{2, 3, 1, 4}, {2, 3, 4, 1}, {2, 4, 1, 3}, {2, 4, 3, 1},

{3, 2, 1, 4}, {3, 2, 4, 1}, {3, 1, 2, 4}, {3, 1, 4, 2},

{3, 4, 2, 1}, {3, 4, 1, 2}, {4, 2, 3, 1}, {4, 2, 1, 3},

{4, 3, 2, 1}, {4, 3, 1, 2}, {4, 1, 2, 3}, {4, 1, 3, 2}

In the above-mentioned expression, {w, x, y, z} means that row vectors 1, 2, 3 and 4 of the precoding matrix are rearranged in the order of parenthesized numbers on the condition that a given precoding matrix $P_k$ exists.

By row permutation, signals corresponding to a specific layer are mapped to different antennas. By column permutation, the same effect as in the switching of information of different layers can be acquired. If there is no need to distinguish performance of each layer, and a system for requesting similar performance from each layer need not utilize the column permutation. Thus, the effect corresponding to antenna selection can be acquired using only the row permutation.

In the meantime, in the case where a given scaling factor is multiplied by each precoding matrix shown in Equation 15, the result can be represented by the following equation 16.

$$P_1 = k \cdot \begin{bmatrix} 1 & 0 & 0 \\ 0 & 1 & 0 \\ 0 & 0 & 1 \\ X & 0 & 0 \end{bmatrix}, P_2 = k \cdot \begin{bmatrix} 1 & 0 & 0 \\ 0 & 1 & 0 \\ 0 & 0 & 1 \\ 0 & Y & 0 \end{bmatrix}$$ [Equation 16]

$$P_3 = k \cdot \begin{bmatrix} 1 & 0 & 0 \\ 0 & 1 & 0 \\ 0 & 0 & 1 \\ 0 & 0 & Z \end{bmatrix},$$

$$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

4Tx—Rank 3 Precoding Matrix (2)

In case of 4Tx—Rank 3, if each antenna transmits information corresponding to only one layer, a CM value of a signal transmitted via each antenna can be maintained at a low value, however information of only one layer is transmitted via only one antenna so that communication performance can be deteriorated. Therefore, in case of 4Tx—Rank 3, there is a need for a codebook to be designed in a manner that a maximum of two layers are multiplexed and transmitted via a single antenna, so that the increment of CM can be minimized and at the same time communication performance can be increased.

In accordance with one embodiment of the present invention, when information corresponding to two layers is transmitted via a single antenna, the precoding matrix P shown in Equation 13 can be represented by $P_4$ of Equation 17 or $P_5$ of Equation 18.

$$P_4 = k \cdot \begin{bmatrix} 1 & 0 & 1 \\ X & 0 & Z \\ 0 & 1 & 0 \\ 0 & Y & 0 \end{bmatrix}, X \neq Z,$$ [Equation 17]

$$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

$$P_5 = k \cdot \begin{bmatrix} 1 & 0 & 0 \\ X & 1 & 0 \\ 0 & Y & 1 \\ 0 & 0 & Z \end{bmatrix},$$ [Equation 18]

$$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

In Equation 17, in order to satisfy Rank 3, 'X' must be different from 'Z' in the precoding matrix $P_4$.

A method for using the precoding matrix $P_4$ or $P_5$ has a disadvantage in that only a signal of a single layer is transmitted via the other antenna whereas a signal of two layers is multiplexed and transmitted via a specific antenna.

In one embodiment of the present invention, in order to obviate the above-mentioned problem, the precoding matrix P may have any one of values $P_6$, $P_7$ and $P_8$ shown in the following equation 19.

$$P_6 = \begin{bmatrix} 1 & 0 & Z \\ X & 1 & 0 \\ 0 & Y & 1 \\ A & 0 & C \end{bmatrix}, P_7 = \begin{bmatrix} 1 & 0 & Z \\ X & 1 & 0 \\ 0 & Y & 1 \\ 0 & B & C \end{bmatrix}, P_8 = \begin{bmatrix} 1 & 0 & Z \\ X & 1 & 0 \\ 0 & Y & 1 \\ A & B & 0 \end{bmatrix}$$ [Equation 19]

-continued where, $X, Y, Z, A, B,$ $$C \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$$

In association with the precoding matrix $P_4$, $P_5$, $P_6$, $P_7$ or $P_8$, row permutation and/or column permutation can be carried out on the 4Tx—Rank 3 precoding matrix. Because the row permutation and the column permutation are carried out, an antenna selection function and layer permutation function for enabling a signal of a specific layer to be transmitted via an arbitrary antenna can be implemented by the precoding.

In one embodiment of the present invention, individual column vectors of the precoding matrix may be configured to have orthogonality therebetween.

If individual column vectors of the precoding matrix are configured to have orthogonality therebetween, the precoding matrix is able to satisfy properties of a one side unitary matrix. That is, the precoding matrix P can have a characteristic denoted by the following equation 20.

$$P^H P = \alpha \cdot I \neq P P^H \quad \text{[Equation 20]}$$

In one embodiment of the present invention, the precoding matrix of Rank 3 can be configured in the form of the following equation 21. The precoding matrix P for satisfying the following equation 21 is able to satisfy the relationship illustrated in Equation 20.

$$P = \begin{bmatrix} 1 & 0 & 1 \\ X & 0 & -X \\ 0 & 1 & 0 \\ 0 & Y & 0 \end{bmatrix}, \quad \text{[Equation 21]}$$

$$X, Y \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$$

In Equation 21, since the relationship denoted by $$P^H P = \begin{bmatrix} 1 & X^* & 0 & 0 \\ 0 & 0 & 1 & Y^* \\ 1 & -X^* & 0 & 0 \end{bmatrix} \cdot \begin{bmatrix} 1 & 0 & 1 \\ X & 0 & -X \\ 0 & 1 & 0 \\ 0 & Y & 0 \end{bmatrix} = \begin{bmatrix} 2 & 0 & 0 \\ 0 & 2 & 0 \\ 0 & 0 & 2 \end{bmatrix} = \alpha \cdot I$$

is satisfied, it can be recognized that the matrix P satisfies Equation 20.

4Tx—Rank 4 Precoding Matrix (1)

In case of 4Tx—Rank 4, Equation 3 can be rewritten as the following equation 22.

$$y = \begin{bmatrix} y_1 \\ y_2 \\ y_3 \\ y_4 \end{bmatrix} = P \cdot x = \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix} \cdot \begin{bmatrix} x_1 \\ x_2 \\ x_3 \\ x_4 \end{bmatrix} = \quad \text{[Equation 22]}$$

$$\begin{bmatrix} p_{11}x_1 + p_{12}x_2 + p_{13}x_3 + p_{14}x_4 \\ p_{21}x_1 + p_{22}x_2 + p_{23}x_3 + p_{24}x_4 \\ p_{31}x_1 + p_{32}x_2 + p_{33}x_3 + p_{34}x_4 \\ p_{41}x_1 + p_{42}x_2 + p_{43}x_3 + p_{44}x_4 \end{bmatrix}$$

In case of 4Tx—Rank 4, signals from four layers are multiplexed and transmitted via respective antennas.

In one embodiment of the present invention, if a precoding matrix is configured in the form of an identity matrix, one antenna is able to transmit only a signal corresponding to a single layer. In this case, Equation 22 can be rewritten as the following equation 23.

$$y = \begin{bmatrix} y_1 \\ y_2 \\ y_3 \\ y_4 \end{bmatrix} = P \cdot x = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \cdot \begin{bmatrix} x_1 \\ x_2 \\ x_3 \\ x_4 \end{bmatrix} = \begin{bmatrix} x_1 \\ x_2 \\ x_3 \\ x_4 \end{bmatrix} \quad \text{[Equation 23]}$$

4Tx—Rank 4 Precoding Matrix (2)

In a 4Tx—Rank 4 codebook, if the number of Rank-4 precoding matrices is increased, communication performance can also be increased. As the number of precoding matrices contained in a codebook increases, a precoding matrix closer to an actual channel can be selected. Thus, the greater the number of precoding matrices, the higher the performance. However, the selection of a precoding matrix in a codebook becomes complicated, so that it is preferable that an appropriate number of precoding matrices should be included in such a codebook. However, in case of 4Tx—Rank 4, in order to transmit only a signal corresponding to a single layer via each antenna, the precoding matrix should be an identity matrix, so that a signal corresponding to two or more layers should sometimes be transmitted via a single antenna in case of using several Rank 4 precoding matrices. Therefore, in order to minimize a CM value and increase the number of Rank 4 precoding matrices in a codebook, a specific element of the precoding matrix may be set to zero '0'. In Equation 22, if it is assumed that two values of $p_{k1}$, $p_{k2}$, $p_{k3}$ and $p_{k4}$ in the signal $(p_{k1}x_1 + p_{k2}x_2 + p_{k3}x_3 + p_{k4}x_4)$ transmitted via each antenna are respectively set to zero '0', a CM of the signal transmitted via each antenna can be maintained at a low value.

In one embodiment of the present invention, the precoding matrix can be set to $P_9$ of the following equation 24, $P_{10}$ of the following equation 25, or $P_{11}$ of the following equation 26.

$$P_9 = \begin{bmatrix} 1 & A & 0 & 0 \\ 0 & 1 & B & 0 \\ 0 & 0 & 1 & C \\ D & 0 & 0 & 1 \end{bmatrix}_{1 \neq ABCD}, \quad \text{[Equation 24]}$$

$A, B, C, D \in$ $$\left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$$

$$P_{10} = \begin{bmatrix} 1 & 0 & 1 & 0 \\ A & 0 & C & 0 \\ 0 & 1 & 0 & 1 \\ 0 & B & 0 & D \end{bmatrix} \quad \text{[Equation 25]}$$

where, $A \neq C$, $B \neq D$, $$A, B, C, D \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$$

-continued $$P_{11} = \begin{bmatrix} 1 & 0 & 1 & 0 \\ A & 0 & -A & 0 \\ 0 & 1 & 0 & 1 \\ 0 & B & 0 & -B \end{bmatrix},$$ [Equation 26]

$$A, B \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The precoding matrix $P_9$, $P_{10}$ or $P_{11}$ is an example of a precoding matrix for transmitting a signal corresponding to a maximum of two layers via each antenna. As described above, the row/column permutation is performed on the precoding matrix $P_9$, $P_{10}$ or $P_{11}$, so that signals of different layers can be transmitted via different antennas.

The precoding matrix $P_{11}$ is a unitary matrix, so that the advantages of the unitary precoding matrix can be utilized.

4Tx—Rank 4 Precoding Matrix (3)

In case of 4Tx—Rank 4, only one element among elements of each row of a precoding matrix can be set to zero '0'. In case of using the above method, a signal corresponding to three layers can be multiplexed and transmitted via a single antenna, so that communication performance can be improved. However, in the case of using the above-mentioned method, a CM value further increases, but the increased CM value may be lower than another CM value acquired when all elements of the precoding matrix are each set to any of other values except for zero '0'. Thus, the above-mentioned method can be effectively utilized under a good SNR status in which a transmitter need not transmit data or information at a maximum transmission power.

In one embodiment of the present invention, the precoding matrix P can be represented by $P_{12}$ of the following equation 27, $P_{13}$ of the following equation 28, $P_{14}$ of the following equation 29, or $P_{15}$ of the following equation 30.

$$P_{12} = \begin{bmatrix} 1 & m_{12} & m_{13} & 0 \\ 0 & 1 & m_{23} & m_{24} \\ m_{31} & 0 & 1 & m_{34} \\ m_{41} & m_{42} & 0 & 1 \end{bmatrix},$$ [Equation 27]

$$m_{ik} \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\},$$

$$i, k = 1, 2, 3, 4$$

$$P_{13} = \begin{bmatrix} 1 & 0 & 1 & 1 \\ m_{21} & 0 & m_{23} & m_{24} \\ 0 & 1 & m_{33} & m_{34} \\ 0 & m_{42} & m_{43} & m_{44} \end{bmatrix},$$ [Equation 28]

$$m_{ik} \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

$$i, k = 1, 2, 3, 4$$

$$P_{14} = \begin{bmatrix} 1 & 0 & 1 & 1 \\ m_{21} & 0 & m_{23} & m_{24} \\ m_{31} & 0 & m_{33} & m_{34} \\ 0 & 1 & m_{43} & m_{44} \end{bmatrix},$$ [Equation 29]

$$m_{ik} \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\},$$

$$i, k = 1, 2, 3, 4$$

$$P_{15} = \begin{bmatrix} 1 & 1 & 1 & 0 \\ 0 & c & -c & c \\ a & 0 & -a & -a \\ b & -b & 0 & b \end{bmatrix},$$ [Equation 30]

$$a, b, c \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The precoding matrix $P_{15}$ illustrated in Equation 30 is a unitary matrix, so that the advantages of the unitary precoding matrix can be utilized.

A matrix acquired when a constant is multiplied by a specific column of the precoding matrix or another matrix acquired when row/column permutation is performed on the above-mentioned precoding matrix may be used as a part of a codebook.

Elements of the above-mentioned precoding matrices are selected from a complex number that has an absolute value of 1 and a phase corresponding to any one of +0°, +45°, +90°, +135°, +180°, −135°, −90°, and −45°. That is, elements of the precoding matrix are selected from $$\left\{ e^{j\theta}, \theta \in \left\{ 0, \frac{\pi}{4}, \frac{\pi}{2}, \frac{3\pi}{4}, \pi, \frac{5\pi}{4}, \frac{6\pi}{4}, \frac{7\pi}{4} \right\} \right\}.$$

For example, the above-mentioned selection has been disclosed only for illustrative purposes, and the elements of the precoding matrix may be selected from a set of complex numbers that have an absolute value of 1 and different phases. For example, each element of the precoding matrix may be selected from $$\left\{ e^{j\theta + \alpha}, \theta \in \left\{ 0, \frac{\pi}{4}, \frac{\pi}{2}, \frac{3\pi}{4}, \pi, \frac{5\pi}{4}, \frac{6\pi}{4}, \frac{7\pi}{4} \right\} \right\}$$

(where α is an arbitrary constant).

Power Balancing

In the meantime, transmission power balancing of respective antennas and/or transmission power balancing of respective layers may be considered to be an important matter in codebook design. If transmission powers of individual antennas are not adjusted for maximal uniformity, there arises a difference in performance between respective transmission antennas. Likewise, if transmission powers of individual layers are not adjusted for maximal uniformity, there arises a difference in performance between respective codewords.

Therefore, one embodiment of the present invention proposes a method for designing a precoding matrix in consideration of antenna power balancing using norms of all elements (i.e., all elements of a specific row of the precoding matrix) corresponding to individual antennas of the precoding matrix. In more detail, the precoding matrix shown in the following equation 31 may be utilized in the form of a antenna power balancing shown in the following equation 32.

$$P = k \cdot \begin{bmatrix} p_{11} & \cdots & p_{1N_L} \\ p_{21} & \ddots & p_{2N_L} \\ \vdots & \ddots & \vdots \\ p_{N_T 1} & \cdots & p_{N_T N_L} \end{bmatrix}$$ [Equation 31]

-continued $$P = k \cdot \begin{bmatrix} \frac{p_{11}}{\sqrt{p_{11}^2 + \cdots p_{1N_L}^2}} & \cdots & \frac{p_{1N_L}}{\sqrt{p_{11}^2 + \cdots p_{1N_L}^2}} \\ \frac{p_{21}}{\sqrt{p_{21}^2 + \cdots p_{2N_L}^2}} & \ddots & \frac{p_{2N_L}}{\sqrt{p_{21}^2 + \cdots p_{2N_L}^2}} \\ \vdots & \ddots & \vdots \\ \frac{p_{N_T1}}{\sqrt{p_{N_T1}^2 + \cdots p_{N_TN_L}^2}} & \cdots & \frac{p_{N_TN_L}}{\sqrt{p_{N_T1}^2 + \cdots p_{N_TN_L}^2}} \end{bmatrix}$$ [Equation 32]

On the other hand, one embodiment of the present invention provides a method for designing a precoding matrix in consideration of layer power balancing using norms of all elements (i.e., all elements of a specific column of the precoding matrix) of individual layers. In more detail, the precoding matrix shown in the following equation 33 may be utilized in the form of layer power balancing shown in the following equation 34.

$$P = k \cdot \begin{bmatrix} p_{11} & \cdots & p_{1N_L} \\ p_{21} & \ddots & p_{2N_L} \\ \vdots & \ddots & \vdots \\ p_{N_T1} & \cdots & p_{N_TN_L} \end{bmatrix}$$ [Equation 33]

$$P = k \cdot \begin{bmatrix} \frac{p_{11}}{\sqrt{p_{11}^2 + \cdots p_{N_T1}^2}} & \cdots & \frac{p_{1N_L}}{\sqrt{p_{1N_L}^2 + \cdots p_{N_TN_L}^2}} \\ \frac{p_{21}}{\sqrt{p_{11}^2 + \cdots p_{N_T1}^2}} & \ddots & \frac{p_{2N_L}}{\sqrt{p_{1N_L}^2 + \cdots p_{N_TN_L}^2}} \\ \vdots & \ddots & \vdots \\ \frac{p_{N_T1}}{\sqrt{p_{11}^2 + \cdots p_{N_T1}^2}} & \cdots & \frac{p_{N_TN_L}}{\sqrt{p_{1N_L}^2 + \cdots p_{N_TN_L}^2}} \end{bmatrix}$$ [Equation 34]

In this case, differently from a Rank 2 precoding matrix, it can be inappropriate for the number of rows and the number of columns in a 4Tx—Rank 3 precoding matrix to simultaneously perform the antenna power balancing and the power balancing. However, in a specific situation, for example, in a system of using a layer shift that changes a layer used for transmission to another layer according to a specific pattern in a transmission mode, there occurs an effect in which a difference in performance between layers is dispersed, the layer power balancing may be relatively less important than the antenna power balancing. Therefore, one embodiment of the present invention proposes the use of a precoding matrix acquired when the antenna power balancing is firstly carried out on the condition that it is impossible to simultaneously perform the antenna power balancing and the layer power balancing.

In the meantime, the following precoding matrices among the above-mentioned 4Tx—Rank 3 precoding matrices indicate that the antenna power balancing can be carried out because two symbols are transmitted to each layer, as denoted by the following equation 35.

$$P'_0 = k \cdot \begin{bmatrix} p_{11} & 0 & 0 \\ 0 & p_{22} & 0 \\ 0 & 0 & p_{33} \\ \frac{p_{41}}{\sqrt{3}} & \frac{p_{42}}{\sqrt{3}} & \frac{p_{43}}{\sqrt{3}} \end{bmatrix}$$ [Equation 35]

$$P'_4 = k \cdot \begin{bmatrix} \frac{1}{\sqrt{2}} & 0 & \frac{1}{\sqrt{2}} \\ \frac{X}{\sqrt{2}} & 0 & \frac{Z}{\sqrt{2}} \\ 0 & 1 & 0 \\ 0 & Y & 0 \end{bmatrix}$$

$$P'_5 = k \cdot \begin{bmatrix} 1 & 0 & 0 \\ \frac{X}{\sqrt{2}} & \frac{1}{\sqrt{2}} & 0 \\ 0 & \frac{Y}{\sqrt{2}} & \frac{1}{\sqrt{2}} \\ 0 & 0 & Z \end{bmatrix}$$

Similarly, in case of the following precoding matrices among the 4Tx—Rank 3 precoding matrices, because only one symbol is transmitted to one antenna, only the layer power balancing can be carried out as shown in the following equation 36.

$$P'_1 = k \cdot \begin{bmatrix} \frac{1}{\sqrt{2}} & 0 & 0 \\ 0 & 1 & 0 \\ 0 & 0 & 1 \\ \frac{X}{\sqrt{2}} & 0 & 0 \end{bmatrix} \quad P'_2 = k \cdot \begin{bmatrix} 1 & 0 & 0 \\ 0 & \frac{1}{\sqrt{2}} & 0 \\ 0 & 0 & 1 \\ 0 & \frac{Y}{\sqrt{2}} & 0 \end{bmatrix}$$ [Equation 36]

$$P'_3 = k \cdot \begin{bmatrix} 1 & 0 & 0 \\ 0 & 1 & 0 \\ 0 & 0 & \frac{1}{\sqrt{2}} \\ 0 & 0 & \frac{Z}{\sqrt{2}} \end{bmatrix}$$

$$P'_7 = k \cdot \begin{bmatrix} \frac{1}{\sqrt{3}} & 0 & \frac{Z}{\sqrt{3}} \\ \frac{X}{\sqrt{3}} & \frac{1}{\sqrt{2}} & 0 \\ 0 & \frac{Y}{\sqrt{2}} & \frac{1}{\sqrt{3}} \\ \frac{A}{\sqrt{3}} & 0 & \frac{C}{\sqrt{3}} \end{bmatrix}$$

$$P'_8 = k \cdot \begin{bmatrix} \frac{1}{\sqrt{2}} & 0 & \frac{Z}{\sqrt{3}} \\ \frac{X}{\sqrt{2}} & \frac{1}{\sqrt{3}} & 0 \\ 0 & \frac{Y}{\sqrt{3}} & \frac{1}{\sqrt{3}} \\ 0 & \frac{B}{\sqrt{3}} & \frac{C}{\sqrt{3}} \end{bmatrix}$$

-continued $$P'_9 = k \cdot \begin{bmatrix} \frac{1}{\sqrt{3}} & 0 & \frac{Z}{\sqrt{2}} \\ \frac{X}{\sqrt{3}} & \frac{1}{\sqrt{3}} & 0 \\ 0 & \frac{Y}{\sqrt{3}} & \frac{1}{\sqrt{2}} \\ \frac{A}{\sqrt{3}} & \frac{B}{\sqrt{3}} & 0 \end{bmatrix}$$

In the meantime, in accordance with another embodiment of the present invention, from the viewpoint of simultaneous execution of both the antenna power balancing and the layer power balancing, the present invention proposes the 4Tx—Rank 3 precoding matrix including the following precoding matrices denoted by Equation 37.

$$P_0^{(1)'} = \begin{bmatrix} 1 & 0 & 0 \\ 0 & 1 & 0 \\ 0 & 0 & 1 \\ 0 & 0 & 0 \end{bmatrix} \quad P_0^{(2)'} = \begin{bmatrix} 1 & 0 & 0 \\ 0 & 1 & 0 \\ 0 & 0 & 0 \\ 0 & 0 & 1 \end{bmatrix}$$ [Equation 37]

$$P_0^{(3)'} = \begin{bmatrix} 1 & 0 & 0 \\ 0 & 0 & 0 \\ 0 & 1 & 0 \\ 0 & 0 & 1 \end{bmatrix} \quad P_0^{(4)'} = \begin{bmatrix} 0 & 0 & 0 \\ 1 & 0 & 0 \\ 0 & 1 & 0 \\ 0 & 0 & 1 \end{bmatrix}$$

In other words, Equation 37 shows precoding matrices used as the 4Tx—Rank 3 precoding matrices, and each precoding matrix of Equation 37 is established to transmit no signal to a single specific antenna.

In the meantime, examples of the precoding matrix acquired when the layer power balancing is carried out on the 4Tx—Rank 4 precoding matrix can be represented by the following equation 38.

$$P'_{13} = k \cdot \begin{bmatrix} \frac{1}{\sqrt{2}} & 0 & \frac{1}{2} & \frac{1}{2} \\ \frac{m_{21}}{\sqrt{2}} & 0 & \frac{m_{23}}{2} & \frac{m_{24}}{2} \\ 0 & \frac{1}{\sqrt{2}} & \frac{m_{33}}{2} & \frac{m_{34}}{2} \\ 0 & \frac{m_{42}}{\sqrt{2}} & \frac{m_{43}}{2} & \frac{m_{44}}{2} \end{bmatrix}$$ [Equation 38]

$$P'_{14} = k \cdot \begin{bmatrix} \frac{1}{\sqrt{3}} & 0 & \frac{1}{2} & \frac{1}{2} \\ \frac{m_{21}}{\sqrt{3}} & 0 & \frac{m_{23}}{2} & \frac{m_{24}}{2} \\ \frac{m_{31}}{\sqrt{3}} & 0 & \frac{m_{33}}{2} & \frac{m_{34}}{2} \\ 0 & 1 & \frac{m_{43}}{2} & \frac{m_{44}}{2} \end{bmatrix}$$

<Codebook Pruning>

In a 4Tx system, precoding matrices corresponding to Rank 1, Rank 2, Rank 3, and Rank 4 can be used as elements of a codebook used in transmission and reception ends. However, in the case of using all precoding matrices, the size of a codebook is excessively increased, so that it is necessary to reduce the number of precoding matrices simultaneously while maintaining performance at an appropriate level. Embodiments capable of reducing the number of precoding matrices will hereinafter be described in detail. Methods for restricting the following precoding matrix can be independently or simultaneously utilized.

Codebook Element Alphabet Restriction

Each element of the above-mentioned precoding matrices is selected from a complex number that has an absolute value of 1 and a phase corresponding to any one of +0°, +45°, +90°, +135°, +180°, −135°, −90°, and −45°.

In one embodiment of the present invention, in order to reduce the number of precoding matrices, each element of the precoding matrices may be selected from a complex number that has an absolute value of 1 and a phase corresponding to any one of +0°, +90°, +180°, and −90°. That is, each element of the precoding matrix may be selected from $\{1, j, -1, -j\}$.

Otherwise, each element of the precoding matrix may be extracted from a subset composed of N alphabetical letters among 8 alphabets which are spaced apart from each other by an angle of 45°.

Restriction to Unitary Precoding Matrix

In the case where individual column vectors contained in a precoding matrix have orthogonality therebetween, the precoding matrix may be a unitary matrix or a partially unitary matrix. If the precoding matrix has the above-mentioned characteristics, an additional gain can be obtained.

Thus, in accordance with one embodiment of the present invention, unitary matrices or partially unitary matrices among all the aforementioned precoding matrices are collected so that a codebook can be formed.

For example, the row/column permutation is carried out on the precoding matrices shown in the following equation 39 and the precoding matrices shown in the following equation 40 so as to obtain a few matrices, and the obtained matrices are combined, so that a codebook can be generated.

$$P^{(1)} = \begin{bmatrix} 1 \\ a \\ b \\ c \end{bmatrix}, P^{(2)} = \begin{bmatrix} 1 & 0 \\ a & 0 \\ 0 & 1 \\ 0 & b \end{bmatrix}, P^{(3)} = \begin{bmatrix} 1 & 0 & 1 \\ a & 0 & -a \\ 0 & 1 & 0 \\ 0 & b & 0 \end{bmatrix},$$ [Equation 39]

$$P_1^{(4)} = \begin{bmatrix} 1 & 0 & 1 & 0 \\ a & 0 & -a & 0 \\ 0 & 1 & 0 & 1 \\ 0 & b & 0 & -b \end{bmatrix}, P_2^{(4)} = \begin{bmatrix} 1 & 1 & 1 & 0 \\ 0 & c & -c & c \\ a & 0 & -a & -a \\ b & -b & 0 & b \end{bmatrix},$$

where, $$a, b, c \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

Restriction to Nested Structure

When constructing the precoding matrices of Rank 1, Rank 2, Rank 3 and Rank 4, in the case where the precoding matrix of Rank 2 or Rank 3 can be constructed with column vectors of the Rank 4 precoding matrix, the constructed precoding matrix is called a precoding matrix with a nested structure. If a specific Rank 4 precoding matrix is used as a part of a precoding codebook, the Rank 3 precoding matrix should be configured with column vectors of the specific Rank 4 precoding matrix, such that there occurs a limitation in the construction of the precoding matrix. Thus, the codebook size can be limited according to the aforementioned norm or standard.

In one embodiment of the present invention, the precoding matrix of Rank 1, Rank 2, Rank 3, or Rank 4 may have a nested structure.

For example, a codebook can be constructed with a combination of matrices acquired by performing the row/column permutation on the precoding matrices shown in the following equation 40.

$$P^{(1)} = \begin{bmatrix} 1 \\ a \\ b \\ c \end{bmatrix}, P^{(2)} = \begin{bmatrix} 1 & 0 \\ a & 0 \\ 0 & 1 \\ 0 & b \end{bmatrix}, P^{(3)} = \begin{bmatrix} 1 & 0 & 1 \\ a & 0 & -a \\ 0 & 1 & 0 \\ 0 & b & 0 \end{bmatrix},$$

$$P_1^{(4)} = \begin{bmatrix} 1 & 0 & 1 & 0 \\ a & 0 & -a & 0 \\ 0 & 1 & 0 & 1 \\ 0 & b & 0 & -b \end{bmatrix}$$

[Equation 40]

where, $$a, b, c \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

In addition to the matrices shown in the above-mentioned equations, other applicable matrices may also exist. It can be easily understood that the applicable matrices can be obtained by performing the row permutation and/or the column permutation on the above-mentioned matrices. In the present invention, because the precoding matrix has elements each having a value of 0, a certain antenna may not be mapped to a specific input stream. This operation may be recognized as an antenna selection function.

II. Detailed Format of Codebook

Hereinafter, in the case where a codebook is designed to satisfy the above-mentioned codebook design rule, a method for deciding a precoding matrix for each rank contained in the codebook in consideration of a chordal distance will be described in detail.

Figure 9:
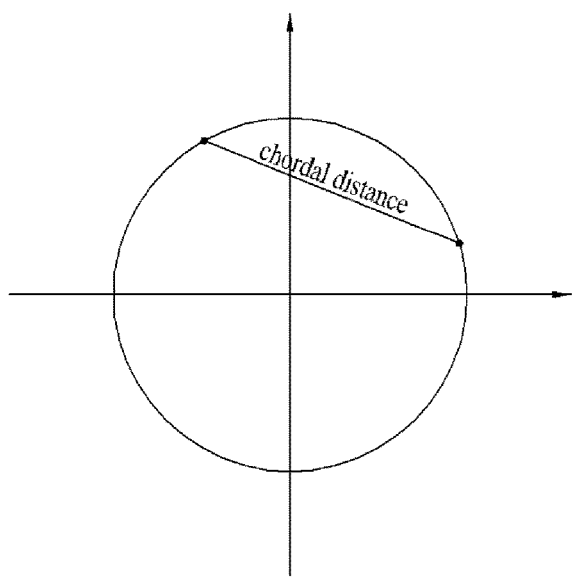
FIG. 9 is a conceptual diagram illustrating a chordal distance.

FIG. 9 is a conceptual diagram illustrating a chordal distance.

A chordal distance is well known as one of norms (or standards) for comparing performances of various codebook sets. Herein, the term "chordal" indicates a straight line between two points located at the circumference. Therefore, given a two-dimensional (2D) case, a chordal distance indicates a distance between two points located at the circumference of a circle (e.g., a unit circle) as shown in FIG. 9.

There is a need for the 4Tx-codebook to consider a four-dimensional chordal distance, so that the following equation 41 can be used as a chordal distance for selecting a codebook set.

$$d_c(P, Q) = \frac{1}{\sqrt{2}} \|PP^H - QQ^H\|_F$$ [Equation 41]

In Equation 41, P is $P=[v_1\ v_2\ \ldots\ v_N]$, and Q is $Q=[u_1\ u_2\ \ldots\ u_N]$, where $v_i$ and $u_i$ ($i=1, 2, \ldots N$, N=4 in the case of 4Tx antennas) are principal vectors of the matrices P and Q, respectively. In addition, $$\|A\|_F = \sqrt{\sum_{i=1}^{m} \sum_{j=1}^{n} |a_{ij}|^2} = \sqrt{\text{trace}(AA^H)}$$

is the Frobenius norm of the matrix. The above-mentioned chordal distance can also be measured by the following equation 42.

$$d_c(P, Q) = \frac{1}{\sqrt{2}} \|PP^H - QQ^H\|_F$$ [Equation 42]

$$= \sqrt{n - \text{trace}(AA^H BB^H)}$$

where A and B are orthonormal generation matrices for P and Q respectively

The above-mentioned codebook design for the 4Tx system based on four transmission antennas will be described using the above-mentioned chordal distance concept. For convenience of description and better understanding of the present invention, a factor related to the power balancing will be omitted from the following expressions.

Rank 2

Firstly, it is assumed that the following codebooks of three groups capable of maintaining good CM performance about the 4Tx—Rank 2 system are used.

$$\text{Group 1} \left( \begin{bmatrix} 1 & 0 \\ X & 0 \\ 0 & 1 \\ 0 & Y \end{bmatrix}, \begin{bmatrix} 1 & 0 \\ X & 0 \\ 0 & 1 \\ 0 & -Y \end{bmatrix}, \begin{bmatrix} 1 & 0 \\ -X & 0 \\ 0 & 1 \\ 0 & Y \end{bmatrix}, \begin{bmatrix} 1 & 0 \\ -X & 0 \\ 0 & 1 \\ 0 & -Y \end{bmatrix} \right)$$ [Equation 43]

$$X, Y \in \left\{ 1, \frac{1+j}{\sqrt{2}}, j, \frac{1-j}{\sqrt{2}}, \right\}$$

$$\text{Group 2} \left( \begin{bmatrix} 1 & 0 \\ 0 & 1 \\ X & 0 \\ 0 & Y \end{bmatrix}, \begin{bmatrix} 1 & 0 \\ 0 & 1 \\ X & 0 \\ 0 & -Y \end{bmatrix}, \begin{bmatrix} 1 & 0 \\ 0 & 1 \\ -X & 0 \\ 0 & Y \end{bmatrix}, \begin{bmatrix} 1 & 0 \\ 0 & 1 \\ -X & 0 \\ 0 & -Y \end{bmatrix} \right)$$

$$X, Y \in \left\{ 1, \frac{1+j}{\sqrt{2}}, j, \frac{1-j}{\sqrt{2}}, \right\}$$

$$\text{Group 3} \left( \begin{bmatrix} 1 & 0 \\ 0 & 1 \\ 0 & Y \\ X & 0 \end{bmatrix}, \begin{bmatrix} 1 & 0 \\ 0 & 1 \\ 0 & -Y \\ X & 0 \end{bmatrix}, \begin{bmatrix} 1 & 0 \\ 0 & 1 \\ 0 & Y \\ -X & 0 \end{bmatrix}, \begin{bmatrix} 1 & 0 \\ 0 & 1 \\ 0 & -Y \\ -X & 0 \end{bmatrix} \right)$$

$$X, Y \in \left\{ 1, \frac{1+j}{\sqrt{2}}, j, \frac{1-j}{\sqrt{2}} \right\}$$

While the number of precoding matrices satisfying the above-mentioned formats may be a considerably high number, it is preferable that a codebook for including a predetermined number of precoding matrices be designed according to a reasonable norm. The following description proposes a method for limiting the number of precoding matrices for each rank to a predetermined number or less using the following norms.

First Norm (Norm 1): Chordal distance

Second Norm (Norm 2): Reference indicating whether the precoding matrices are uniformly selected from individual groups. If the number of precoding matrices/vectors in a codebook is not divided by the number of groups, the precoding matrices are most uniformly selected in consideration of the first norm (Norm 1).

The above-mentioned norm can be equally applied not only to Rank 3 but also to Rank 4 to be described later.

In more detail, one embodiment of the present invention proposes a method for selecting the set of precoding matrices from a codebook about a specific rank using the Norm 1. In a first step, a chordal distance about all precoding matrix pairs contained in a single codebook is calculated using Equation 42. For example, if four codebook sets exist, four minimum chordal distance values can be represented by the following expression.

$$d_{c,min}^1=1, d_{c,min}^2=0.56, d_{c,min}^3=0.71 \text{ and } d_{c,min}^4=1 \quad \text{[Expression]}$$

In the above expression, the higher the value of $d_{c,min}^i$ (where i is a codebook set number), the higher the system performance. Thus, it is preferable that first and fourth codebooks go to a next selection step.

In a second step, in order to support a variety of wireless channel environments, the present invention proposes a method for most uniformly selecting the precoding matrices for each group. For example, in accordance with the proposed method of the present invention, if there are three codebook groups and 16 precoding matrices are needed as the Rank-2 codebook, 5 precoding matrices are selected from two groups, and 6 precoding matrices are selected from the remaining one group. For example, in accordance with the proposed method of the present invention, 5 precoding matrices are selected from first two groups, and 6 precoding matrices are selected from the last one group. One embodiment of the present invention may consider a method for limiting alphabets of each precoding matrix as described above, in which, for example, an alphabet 'X' may be limited to X=1, j, −1, or −j. The following description illustrates exemplary 4Tx Rank-2 codebooks capable of being configured by the above steps.

TABLE 1

Rank-2 codebook set 1-1

$$\begin{bmatrix} 1 & 0 \\ 0 & 1 \\ 0 & j \\ 1 & 0 \end{bmatrix}, \begin{bmatrix} 1 & 0 \\ 1 & 0 \\ 0 & 1 \\ 0 & j \end{bmatrix}, \begin{bmatrix} 1 & 0 \\ -1 & 0 \\ 0 & 1 \\ 0 & -j \end{bmatrix}, \begin{bmatrix} 1 & 0 \\ 0 & 1 \\ -j & 0 \\ 0 & -1 \end{bmatrix}, \begin{bmatrix} 1 & 0 \\ 0 & 1 \\ j & 0 \\ 0 & 1 \end{bmatrix}, \begin{bmatrix} 1 & 0 \\ 0 & 1 \\ -j & 0 \\ 0 & 1 \end{bmatrix}, \begin{bmatrix} 1 & 0 \\ 0 & 1 \\ -1 & 0 \\ 0 & j \end{bmatrix}, \begin{bmatrix} 1 & 0 \\ 0 & 1 \\ 0 & -1 \\ -j & 0 \end{bmatrix},$$

$$\begin{bmatrix} 1 & 0 \\ 0 & 1 \\ j & 0 \\ 0 & -1 \end{bmatrix}, \begin{bmatrix} 1 & 0 \\ 1 & 0 \\ 0 & 1 \\ 0 & -j \end{bmatrix}, \begin{bmatrix} 1 & 0 \\ j & 0 \\ 0 & 1 \\ 0 & 1 \end{bmatrix}, \begin{bmatrix} 1 & 0 \\ -j & 0 \\ 0 & 1 \\ 0 & 1 \end{bmatrix}, \begin{bmatrix} 1 & 0 \\ 0 & 1 \\ 0 & 1 \\ -j & 0 \end{bmatrix}, \begin{bmatrix} 1 & 0 \\ 0 & 1 \\ 0 & -j \\ -1 & 0 \end{bmatrix}, \begin{bmatrix} 1 & 0 \\ 0 & 1 \\ 0 & j \\ -1 & 0 \end{bmatrix}, \begin{bmatrix} 1 & 0 \\ j & 0 \\ 0 & 1 \\ 0 & -1 \end{bmatrix}$$

Rank-2 codebook set 2-1

$$\begin{bmatrix} 1 & 0 \\ -j & 0 \\ 0 & 1 \\ 0 & -1 \end{bmatrix}, \begin{bmatrix} 1 & 0 \\ 0 & 1 \\ 0 & 1 \\ -1 & 0 \end{bmatrix}, \begin{bmatrix} 1 & 0 \\ -1 & 0 \\ 0 & 1 \\ 0 & j \end{bmatrix}, \begin{bmatrix} 1 & 0 \\ 0 & 1 \\ j & 0 \\ 0 & -j \end{bmatrix}, \begin{bmatrix} 1 & 0 \\ -j & 0 \\ 0 & 1 \\ 0 & 1 \end{bmatrix}, \begin{bmatrix} 1 & 0 \\ 0 & 1 \\ 1 & 0 \\ 0 & 1 \end{bmatrix}, \begin{bmatrix} 1 & 0 \\ 0 & 1 \\ -j & 0 \\ 0 & j \end{bmatrix}, \begin{bmatrix} 1 & 0 \\ 1 & 0 \\ 0 & 1 \\ 0 & j \end{bmatrix},$$

$$\begin{bmatrix} 1 & 0 \\ 0 & 1 \\ 0 & -j \\ -j & 0 \end{bmatrix}, \begin{bmatrix} 1 & 0 \\ 0 & 1 \\ 0 & j \\ -j & 0 \end{bmatrix}, \begin{bmatrix} 1 & 0 \\ 0 & 1 \\ 1 & 0 \\ 0 & -1 \end{bmatrix}, \begin{bmatrix} 1 & 0 \\ 1 & 0 \\ 0 & 1 \\ 0 & -j \end{bmatrix}, \begin{bmatrix} 1 & 0 \\ 0 & 1 \\ 0 & -j \\ j & 0 \end{bmatrix}, \begin{bmatrix} 1 & 0 \\ 0 & 1 \\ 0 & -1 \\ -1 & 0 \end{bmatrix}, \begin{bmatrix} 1 & 0 \\ -1 & 0 \\ 0 & 1 \\ 0 & -j \end{bmatrix}, \begin{bmatrix} 1 & 0 \\ 0 & 1 \\ -j & 0 \\ 0 & -j \end{bmatrix}$$

Rank-2 codebook set 3-1

$$\begin{bmatrix} 1 & 0 \\ -j & 0 \\ 0 & 1 \\ 0 & -1 \end{bmatrix}, \begin{bmatrix} 1 & 0 \\ -1 & 0 \\ 0 & 1 \\ 0 & j \end{bmatrix}, \begin{bmatrix} 1 & 0 \\ 0 & 1 \\ 1 & 0 \\ 0 & -1 \end{bmatrix}, \begin{bmatrix} 1 & 0 \\ 0 & 1 \\ -1 & 0 \\ 0 & 1 \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 0 & j \\ 1 & 0 \end{bmatrix}, \begin{bmatrix} 1 & 0 \\ j & 0 \\ 0 & 1 \\ 0 & 1 \end{bmatrix}, \begin{bmatrix} 1 & 0 \\ 0 & 1 \\ 0 & -1 \\ -j & 0 \end{bmatrix},$$

$$\begin{bmatrix} 1 & 0 \\ 0 & 1 \\ -1 & 0 \\ 0 & -1 \end{bmatrix}, \begin{bmatrix} 1 & 0 \\ 0 & 1 \\ 0 & 1 \\ -j & 0 \end{bmatrix}, \begin{bmatrix} 1 & 0 \\ 0 & 1 \\ -j & 0 \\ 0 & -j \end{bmatrix}, \begin{bmatrix} 1 & 0 \\ j & 0 \\ 0 & 1 \\ 0 & -1 \end{bmatrix}, \begin{bmatrix} 1 & 0 \\ 0 & 1 \\ j & 0 \\ 0 & j \end{bmatrix}, \begin{bmatrix} 1 & 0 \\ 1 & 0 \\ 0 & 1 \\ 0 & j \end{bmatrix}, \begin{bmatrix} 1 & 0 \\ 0 & 1 \\ 0 & -j \\ -1 & 0 \end{bmatrix}, \begin{bmatrix} 1 & 0 \\ -j & 0 \\ 0 & 1 \\ 0 & 1 \end{bmatrix}$$

Rank-2 codebook set 4-1

$$\begin{bmatrix} 1 & 0 \\ 0 & 1 \\ -j & 0 \\ 0 & -j \end{bmatrix}, \begin{bmatrix} 1 & 0 \\ 0 & 1 \\ 0 & j \\ -j & 0 \end{bmatrix}, \begin{bmatrix} 1 & 0 \\ 0 & 1 \\ -j & 0 \\ 0 & -j \end{bmatrix}, \begin{bmatrix} 1 & 0 \\ -j & 0 \\ 0 & 1 \\ j & 0 \end{bmatrix}, \begin{bmatrix} 1 & 0 \\ 0 & 1 \\ 0 & 1 \\ 1 & 0 \end{bmatrix}, \begin{bmatrix} 1 & 0 \\ 0 & 1 \\ j & 0 \\ 0 & -j \end{bmatrix}, \begin{bmatrix} 1 & 0 \\ 0 & 1 \\ 0 & 1 \\ -1 & 0 \end{bmatrix}, \begin{bmatrix} 1 & 0 \\ 0 & 1 \\ 1 & 0 \\ 0 & j \end{bmatrix},$$

TABLE 1-continued $$\begin{bmatrix} 1 & 0 \\ 0 & 1 \\ 0 & -j \\ -j & 0 \end{bmatrix}, \begin{bmatrix} 1 & 0 \\ j & 0 \\ 0 & 1 \\ 0 & -j \end{bmatrix}, \begin{bmatrix} 1 & 0 \\ j & 0 \\ 0 & 1 \\ 0 & j \end{bmatrix}, \begin{bmatrix} 1 & 0 \\ 0 & 1 \\ -1 & 0 \\ 0 & -1 \end{bmatrix}, \begin{bmatrix} 1 & 0 \\ 1 & 0 \\ 0 & 1 \\ 0 & 1 \end{bmatrix}, \begin{bmatrix} 1 & 0 \\ 0 & 1 \\ -1 & 0 \\ 0 & 1 \end{bmatrix}, \begin{bmatrix} 1 & 0 \\ -1 & 0 \\ 0 & 1 \\ 0 & -1 \end{bmatrix}, \begin{bmatrix} 1 & 0 \\ -j & 0 \\ 0 & 1 \\ 0 & j \end{bmatrix}$$

Rank-2 codebook set 5-1

$$\begin{bmatrix} 1 & 0 \\ 0 & 1 \\ j & 0 \\ 0 & j \end{bmatrix}, \begin{bmatrix} 1 & 0 \\ 0 & 1 \\ 0 & -1 \\ 1 & 0 \end{bmatrix}, \begin{bmatrix} 1 & 0 \\ 0 & 1 \\ -j & 0 \\ 0 & 1 \end{bmatrix}, \begin{bmatrix} 1 & 0 \\ 1 & 0 \\ 0 & 1 \\ 0 & 1 \end{bmatrix}, \begin{bmatrix} 1 & 0 \\ 0 & 1 \\ 0 & 1 \\ -1 & 0 \end{bmatrix}, \begin{bmatrix} 1 & 0 \\ 0 & 1 \\ 0 & -j \\ j & 0 \end{bmatrix}, \begin{bmatrix} 1 & 0 \\ -j & 0 \\ 0 & 1 \\ 0 & j \end{bmatrix}, \begin{bmatrix} 1 & 0 \\ 0 & 1 \\ 1 & 0 \\ 0 & -1 \end{bmatrix}$$

$$\begin{bmatrix} 1 & 0 \\ 0 & 1 \\ 0 & 1 \\ 1 & 0 \end{bmatrix}, \begin{bmatrix} 1 & 0 \\ -1 & 0 \\ 0 & 1 \\ 0 & -1 \end{bmatrix}, \begin{bmatrix} 1 & 0 \\ 1 & 0 \\ 0 & 1 \\ 0 & -1 \end{bmatrix}, \begin{bmatrix} 1 & 0 \\ j & 0 \\ 0 & 1 \\ 0 & -j \end{bmatrix}, \begin{bmatrix} 1 & 0 \\ j & 0 \\ 0 & 1 \\ 0 & j \end{bmatrix}, \begin{bmatrix} 1 & 0 \\ 0 & 1 \\ 0 & -j \\ -j & 0 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ j & 0 \\ 0 & -j \end{bmatrix}$$

Rank-2 codebook set 6-1

$$\begin{bmatrix} 1 & 0 \\ 0 & 1 \\ 1 & 0 \\ 0 & 1 \end{bmatrix}, \begin{bmatrix} 1 & 0 \\ 1 & 0 \\ 0 & 1 \\ 0 & j \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ -j & 0 \\ 0 & -j \end{bmatrix}, \begin{bmatrix} 1 & 0 \\ 0 & 1 \\ 0 & j \\ -j & 0 \end{bmatrix}, \begin{bmatrix} 1 & 0 \\ -1 & 0 \\ 0 & 1 \\ 0 & 1 \end{bmatrix}, \begin{bmatrix} 1 & 0 \\ 0 & 1 \\ -j & 0 \\ 0 & j \end{bmatrix}, \begin{bmatrix} 1 & 0 \\ -j & 0 \\ 0 & 1 \\ 0 & -j \end{bmatrix}$$

$$\begin{bmatrix} 1 & 0 \\ 0 & 1 \\ j & 0 \\ 0 & j \end{bmatrix}, \begin{bmatrix} 1 & 0 \\ 0 & 1 \\ 0 & 1 \\ -1 & 0 \end{bmatrix}, \begin{bmatrix} 1 & 0 \\ 0 & 1 \\ 1 & 0 \\ 0 & -1 \end{bmatrix}, \begin{bmatrix} 1 & 0 \\ j & 0 \\ 0 & 1 \\ 0 & -j \end{bmatrix}, \begin{bmatrix} 1 & 0 \\ 0 & 1 \\ 0 & j \\ j & 0 \end{bmatrix}, \begin{bmatrix} 1 & 0 \\ -1 & 0 \\ 0 & 1 \\ 0 & -1 \end{bmatrix}, \begin{bmatrix} 1 & 0 \\ 0 & 1 \\ 0 & -1 \\ -1 & 0 \end{bmatrix}, \begin{bmatrix} 1 & 0 \\ 0 & 1 \\ j & 0 \\ 0 & -j \end{bmatrix}$$

Rank-2 codebook set 7-1

$$\begin{bmatrix} 1 & 0 \\ -j & 0 \\ 0 & 1 \\ 0 & -j \end{bmatrix}, \begin{bmatrix} 1 & 0 \\ 0 & 1 \\ 0 & j \\ j & 0 \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 0 & 1 \\ -j & 0 \end{bmatrix}, \begin{bmatrix} 1 & 0 \\ 1 & 0 \\ 0 & 1 \\ 0 & 1 \end{bmatrix}, \begin{bmatrix} 1 & 0 \\ j & 0 \\ 0 & 1 \\ 0 & j \end{bmatrix}, \begin{bmatrix} 1 & 0 \\ 0 & 1 \\ j & 0 \\ 0 & 1 \end{bmatrix}, \begin{bmatrix} 1 & 0 \\ 0 & 1 \\ 1 & 0 \\ 0 & -j \end{bmatrix}$$

$$\begin{bmatrix} 1 & 0 \\ j & 0 \\ 0 & 1 \\ 0 & -j \end{bmatrix}, \begin{bmatrix} 1 & 0 \\ 0 & 1 \\ -1 & 0 \\ 0 & j \end{bmatrix}, \begin{bmatrix} 1 & 0 \\ 0 & 1 \\ 0 & -1 \\ -j & 0 \end{bmatrix}, \begin{bmatrix} 1 & 0 \\ 0 & 1 \\ 0 & 1 \\ 0 & -1 \end{bmatrix}, \begin{bmatrix} 1 & 0 \\ -1 & 0 \\ 0 & 1 \\ 0 & 1 \end{bmatrix}, \begin{bmatrix} 1 & 0 \\ 0 & 1 \\ 1 & 0 \\ 0 & j \end{bmatrix}, \begin{bmatrix} 1 & 0 \\ 0 & 1 \\ j & 0 \\ 0 & -1 \end{bmatrix}, \begin{bmatrix} 1 & 0 \\ 0 & 1 \\ 0 & -j \\ -1 & 0 \end{bmatrix}$$

Rank-2 codebook set 8-1

$$\begin{bmatrix} 1 & 0 \\ j & 0 \\ 0 & 1 \\ 0 & -1 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ j & 0 \\ 0 & j \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 0 & 1 \\ -j & 0 \end{bmatrix}, \begin{bmatrix} 1 & 0 \\ 0 & 1 \\ j & 0 \\ 0 & -j \end{bmatrix}, \begin{bmatrix} 1 & 0 \\ 0 & 1 \\ 1 & 0 \\ 0 & -1 \end{bmatrix}, \begin{bmatrix} 1 & 0 \\ 1 & 0 \\ 0 & 1 \\ 0 & 1 \end{bmatrix}$$

$$\begin{bmatrix} 1 & 0 \\ -j & 0 \\ 0 & 1 \\ 0 & j \end{bmatrix}, \begin{bmatrix} 1 & 0 \\ 0 & 1 \\ -j & 0 \\ 0 & j \end{bmatrix}, \begin{bmatrix} 1 & 0 \\ 0 & 1 \\ 1 & 0 \\ 0 & 1 \end{bmatrix}, \begin{bmatrix} 1 & 0 \\ 0 & 1 \\ 0 & 1 \\ j & 0 \end{bmatrix}, \begin{bmatrix} 1 & 0 \\ -1 & 0 \\ 0 & 1 \\ 0 & 1 \end{bmatrix}, \begin{bmatrix} 1 & 0 \\ -j & 0 \\ 0 & 1 \\ 0 & -j \end{bmatrix}, \begin{bmatrix} 1 & 0 \\ 0 & 1 \\ 0 & j \\ 1 & 0 \end{bmatrix}, \begin{bmatrix} 1 & 0 \\ 0 & 1 \\ 0 & -1 \\ -j & 0 \end{bmatrix}$$

Rank-2 codebook set 9-1

$$\begin{bmatrix} 1 & 0 \\ -1 & 0 \\ 0 & 1 \\ 0 & -1 \end{bmatrix}, \begin{bmatrix} 1 & 0 \\ 0 & 1 \\ 0 & j \\ 1 & 0 \end{bmatrix}, \begin{bmatrix} 1 & 0 \\ 0 & 1 \\ 0 & -1 \\ j & 0 \end{bmatrix}, \begin{bmatrix} 1 & 0 \\ 0 & 1 \\ -1 & 0 \\ 0 & 1 \end{bmatrix}, \begin{bmatrix} 1 & 0 \\ 0 & 1 \\ 0 & 1 \\ 0 & 1 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ j & 0 \\ 0 & j \end{bmatrix}, \begin{bmatrix} 1 & 0 \\ j & 0 \\ 0 & 1 \\ 0 & 1 \end{bmatrix}$$

TABLE 1-continued $\begin{bmatrix} 1 & 0 \\ 1 & 0 \\ 0 & 1 \\ 0 & -j \end{bmatrix}$, $\begin{bmatrix} 1 & 0 \\ 1 & 0 \\ 0 & 1 \\ 0 & j \end{bmatrix}$, $\begin{bmatrix} 1 & 0 \\ -j & 0 \\ 0 & 1 \\ 0 & 1 \end{bmatrix}$, $\begin{bmatrix} 1 & 0 \\ 0 & 1 \\ 0 & -1 \\ -j & 0 \end{bmatrix}$, $\begin{bmatrix} 1 & 0 \\ 0 & 1 \\ j & 0 \\ 0 & -j \end{bmatrix}$, $\begin{bmatrix} 1 & 0 \\ 0 & 1 \\ 1 & 0 \\ 0 & 1 \end{bmatrix}$, $\begin{bmatrix} 1 & 0 \\ 0 & 1 \\ 0 & -j \\ 1 & 0 \end{bmatrix}$, $\begin{bmatrix} 1 & 0 \\ 0 & 1 \\ 1 & 0 \\ 0 & -1 \end{bmatrix}$ Rank-2 codebook set 10-1

$\begin{bmatrix} 1 & 0 \\ 0 & 1 \\ 1 & 0 \\ 0 & -j \end{bmatrix}$, $\begin{bmatrix} 1 & 0 \\ -j & 0 \\ 0 & 1 \\ 0 & -1 \end{bmatrix}$, $\begin{bmatrix} 1 & 0 \\ 0 & 1 \\ 0 & j \\ j & 0 \end{bmatrix}$, $\begin{bmatrix} 1 & 0 \\ -1 & 0 \\ 0 & 1 \\ 0 & -j \end{bmatrix}$, $\begin{bmatrix} 1 & 0 \\ 0 & 1 \\ -1 & 0 \\ 0 & 1 \end{bmatrix}$, $\begin{bmatrix} 1 & 0 \\ 0 & 1 \\ 0 & -j \\ -j & 0 \end{bmatrix}$, $\begin{bmatrix} 1 & 0 \\ 0 & 1 \\ -1 & 0 \\ 0 & -1 \end{bmatrix}$, $\begin{bmatrix} 1 & 0 \\ 0 & 1 \\ 0 & -1 \\ 1 & 0 \end{bmatrix}$, $\begin{bmatrix} 1 & 0 \\ 1 & 0 \\ 0 & 1 \\ 0 & j \end{bmatrix}$, $\begin{bmatrix} 1 & 0 \\ 0 & 1 \\ j & 0 \\ 0 & j \end{bmatrix}$, $\begin{bmatrix} 1 & 0 \\ 1 & 0 \\ 0 & 1 \\ 0 & -j \end{bmatrix}$, $\begin{bmatrix} 1 & 0 \\ j & 0 \\ 0 & 1 \\ 0 & -1 \end{bmatrix}$, $\begin{bmatrix} 1 & 0 \\ 0 & 1 \\ 0 & -j \\ j & 0 \end{bmatrix}$, $\begin{bmatrix} 1 & 0 \\ 0 & 1 \\ 0 & 1 \\ 1 & 0 \end{bmatrix}$, $\begin{bmatrix} 1 & 0 \\ 0 & 1 \\ -j & 0 \\ 0 & j \end{bmatrix}$, $\begin{bmatrix} 1 & 0 \\ 0 & 1 \\ 0 & 1 \\ -1 & 0 \end{bmatrix}$ Rank-2 codebook set 11-1

$\begin{bmatrix} 1 & 0 \\ 0 & 1 \\ 1 & 0 \\ 0 & j \end{bmatrix}$, $\begin{bmatrix} 1 & 0 \\ -j & 0 \\ 0 & 1 \\ 0 & -1 \end{bmatrix}$, $\begin{bmatrix} 1 & 0 \\ 1 & 0 \\ 0 & 1 \\ 0 & 1 \end{bmatrix}$, $\begin{bmatrix} 1 & 0 \\ 0 & 1 \\ j & 0 \\ 0 & 1 \end{bmatrix}$, $\begin{bmatrix} 1 & 0 \\ -1 & 0 \\ 0 & 1 \\ 0 & -j \end{bmatrix}$, $\begin{bmatrix} 1 & 0 \\ 0 & 1 \\ -1 & 0 \\ 0 & j \end{bmatrix}$, $\begin{bmatrix} 1 & 0 \\ 0 & 1 \\ -1 & 0 \\ 0 & -j \end{bmatrix}$, $\begin{bmatrix} 1 & 0 \\ 0 & 1 \\ 0 & -j \\ -1 & 0 \end{bmatrix}$, $\begin{bmatrix} 1 & 0 \\ 0 & 1 \\ 0 & 1 \\ j & 0 \end{bmatrix}$, $\begin{bmatrix} 1 & 0 \\ 0 & 1 \\ 0 & -1 \\ -j & 0 \end{bmatrix}$, $\begin{bmatrix} 1 & 0 \\ 0 & 1 \\ 0 & -j \\ 1 & 0 \end{bmatrix}$, $\begin{bmatrix} 1 & 0 \\ 0 & 1 \\ j & 0 \\ 0 & -1 \end{bmatrix}$, $\begin{bmatrix} 1 & 0 \\ j & 0 \\ 0 & 1 \\ 0 & -1 \end{bmatrix}$, $\begin{bmatrix} 1 & 0 \\ 0 & 1 \\ 0 & -1 \\ j & 0 \end{bmatrix}$, $\begin{bmatrix} 1 & 0 \\ -1 & 0 \\ 0 & 1 \\ 0 & j \end{bmatrix}$, $\begin{bmatrix} 1 & 0 \\ 0 & 1 \\ 0 & 1 \\ -j & 0 \end{bmatrix}$ Rank-2 codebook set 12-1

$\begin{bmatrix} 1 & 0 \\ 0 & 1 \\ -1 & 0 \\ 0 & 1 \end{bmatrix}$, $\begin{bmatrix} 1 & 0 \\ 1 & 0 \\ 0 & 1 \\ 0 & -1 \end{bmatrix}$, $\begin{bmatrix} 1 & 0 \\ j & 0 \\ 0 & 1 \\ 0 & j \end{bmatrix}$, $\begin{bmatrix} 1 & 0 \\ 0 & 1 \\ 0 & -j \\ j & 0 \end{bmatrix}$, $\begin{bmatrix} 1 & 0 \\ 0 & 1 \\ 1 & 0 \\ 0 & -j \end{bmatrix}$, $\begin{bmatrix} 1 & 0 \\ 0 & 1 \\ 0 & -1 \\ -1 & 0 \end{bmatrix}$, $\begin{bmatrix} 1 & 0 \\ -j & 0 \\ 0 & 1 \\ 0 & -j \end{bmatrix}$, $\begin{bmatrix} 1 & 0 \\ 0 & 1 \\ 0 & j \\ j & 0 \end{bmatrix}$, $\begin{bmatrix} 1 & 0 \\ 0 & 1 \\ 0 & 1 \\ 1 & 0 \end{bmatrix}$, $\begin{bmatrix} 1 & 0 \\ 0 & 1 \\ -j & 0 \\ 0 & -1 \end{bmatrix}$, $\begin{bmatrix} 1 & 0 \\ -1 & 0 \\ 0 & 1 \\ 0 & 1 \end{bmatrix}$, $\begin{bmatrix} 1 & 0 \\ 1 & 0 \\ 0 & 1 \\ 0 & 1 \end{bmatrix}$, $\begin{bmatrix} 1 & 0 \\ 0 & 1 \\ j & 0 \\ 0 & -1 \end{bmatrix}$, $\begin{bmatrix} 1 & 0 \\ 0 & 1 \\ 0 & -1 \\ 1 & 0 \end{bmatrix}$, $\begin{bmatrix} 1 & 0 \\ 0 & 1 \\ 1 & 0 \\ 0 & j \end{bmatrix}$, $\begin{bmatrix} 1 & 0 \\ j & 0 \\ 0 & 1 \\ 0 & -j \end{bmatrix}$ The above-mentioned codebooks shown in Table 1 are disclosed only for illustrative purposes, and row permutation and/or column permutation may be applied to all or some of the precoding matrices.

If the 4Tx Rank-2 codebook includes 15 precoding matrices, one precoding matrix may be removed from a group of selecting the largest number of precoding matrices among individual precoding matrix groups. The following description shows exemplary 4Tx Rank-2 codebooks configured by the above-mentioned schemes.

TABLE 2

Rank-2 codebook set 1-2

$\begin{bmatrix} 1 & 0 \\ 0 & 1 \\ 0 & j \\ 1 & 0 \end{bmatrix}$, $\begin{bmatrix} 1 & 0 \\ 1 & 0 \\ 0 & 1 \\ 0 & j \end{bmatrix}$, $\begin{bmatrix} 1 & 0 \\ -1 & 0 \\ 0 & 1 \\ 0 & -j \end{bmatrix}$, $\begin{bmatrix} 1 & 0 \\ 0 & 1 \\ -j & 0 \\ 0 & -1 \end{bmatrix}$, $\begin{bmatrix} 1 & 0 \\ 0 & 1 \\ j & 0 \\ 0 & 1 \end{bmatrix}$, $\begin{bmatrix} 1 & 0 \\ 0 & 1 \\ -j & 0 \\ 0 & 1 \end{bmatrix}$, $\begin{bmatrix} 1 & 0 \\ 0 & 1 \\ -1 & 0 \\ 0 & 1 \end{bmatrix}$, $\begin{bmatrix} 1 & 0 \\ 0 & 1 \\ 0 & -1 \\ -j & 0 \end{bmatrix}$, $\begin{bmatrix} 1 & 0 \\ 0 & 1 \\ j & 0 \\ 0 & -1 \end{bmatrix}$, $\begin{bmatrix} 1 & 0 \\ 0 & 1 \\ 1 & 0 \\ 0 & -j \end{bmatrix}$, $\begin{bmatrix} 1 & 0 \\ 1 & 0 \\ 0 & 1 \\ 0 & 1 \end{bmatrix}$, $\begin{bmatrix} 1 & 0 \\ 0 & 1 \\ 0 & 1 \\ -j & 0 \end{bmatrix}$, $\begin{bmatrix} 1 & 0 \\ 0 & 1 \\ 0 & -j \\ -1 & 0 \end{bmatrix}$, $\begin{bmatrix} 1 & 0 \\ 0 & 1 \\ 0 & j \\ -1 & 0 \end{bmatrix}$, $\begin{bmatrix} 1 & 0 \\ 0 & 1 \\ j & 0 \\ 0 & 1 \end{bmatrix}$ TABLE 2-continued Rank-2 codebook set 2-2

$\begin{bmatrix} 1 & 0 \\ -j & 0 \\ 0 & 1 \\ 0 & -1 \end{bmatrix}$, $\begin{bmatrix} 1 & 0 \\ 0 & 1 \\ 0 & 1 \\ -1 & 0 \end{bmatrix}$, $\begin{bmatrix} 1 & 0 \\ -1 & 0 \\ 0 & 1 \\ 0 & j \end{bmatrix}$, $\begin{bmatrix} 1 & 0 \\ 0 & 1 \\ j & 0 \\ 0 & -j \end{bmatrix}$, $\begin{bmatrix} 1 & 0 \\ 0 & 1 \\ 1 & 0 \\ 0 & 1 \end{bmatrix}$, $\begin{bmatrix} 1 & 0 \\ 0 & 1 \\ -j & 0 \\ 0 & j \end{bmatrix}$, $\begin{bmatrix} 1 & 0 \\ 1 & 0 \\ 0 & 1 \\ 0 & j \end{bmatrix}$, $\begin{bmatrix} 1 & 0 \\ 0 & 1 \\ 0 & -j \\ -j & 0 \end{bmatrix}$, $\begin{bmatrix} 1 & 0 \\ 0 & 1 \\ 0 & j \\ -j & 0 \end{bmatrix}$, $\begin{bmatrix} 1 & 0 \\ 0 & 1 \\ 1 & 0 \\ 0 & -1 \end{bmatrix}$, $\begin{bmatrix} 1 & 0 \\ 1 & 0 \\ 0 & 1 \\ 0 & -j \end{bmatrix}$, $\begin{bmatrix} 1 & 0 \\ 0 & 1 \\ 0 & -j \\ j & 0 \end{bmatrix}$, $\begin{bmatrix} 1 & 0 \\ 0 & 1 \\ 0 & -1 \\ -1 & 0 \end{bmatrix}$, $\begin{bmatrix} 1 & 0 \\ -1 & 0 \\ 0 & 1 \\ 0 & -j \end{bmatrix}$, $\begin{bmatrix} 1 & 0 \\ 0 & 1 \\ -j & 0 \\ 0 & -j \end{bmatrix}$ Rank-2 codebook set 3-2

$\begin{bmatrix} 1 & 0 \\ -j & 0 \\ 0 & 1 \\ 0 & -1 \end{bmatrix}$, $\begin{bmatrix} 1 & 0 \\ -1 & 0 \\ 0 & 1 \\ 0 & j \end{bmatrix}$, $\begin{bmatrix} 1 & 0 \\ 0 & 1 \\ 1 & 0 \\ 0 & -1 \end{bmatrix}$, $\begin{bmatrix} 1 & 0 \\ 0 & 1 \\ -1 & 0 \\ 0 & 1 \end{bmatrix}$, $\begin{bmatrix} 1 & 0 \\ 0 & 1 \\ 0 & -j \\ 1 & 0 \end{bmatrix}$, $\begin{bmatrix} 1 & 0 \\ 0 & 1 \\ 0 & j \\ 0 & 1 \end{bmatrix}$, $\begin{bmatrix} 1 & 0 \\ j & 0 \\ 0 & 1 \\ 0 & 1 \end{bmatrix}$, $\begin{bmatrix} 1 & 0 \\ 0 & 1 \\ 0 & -1 \\ -j & 0 \end{bmatrix}$, $\begin{bmatrix} 1 & 0 \\ 0 & 1 \\ -1 & 0 \\ 0 & -1 \end{bmatrix}$, $\begin{bmatrix} 1 & 0 \\ 0 & 1 \\ 0 & 1 \\ -j & 0 \end{bmatrix}$, $\begin{bmatrix} 1 & 0 \\ 0 & 1 \\ -j & 0 \\ 0 & -j \end{bmatrix}$, $\begin{bmatrix} 1 & 0 \\ j & 0 \\ 0 & 1 \\ 0 & -1 \end{bmatrix}$, $\begin{bmatrix} 1 & 0 \\ 0 & 1 \\ j & 0 \\ 0 & j \end{bmatrix}$, $\begin{bmatrix} 1 & 0 \\ 1 & 0 \\ 0 & 1 \\ 0 & j \end{bmatrix}$, $\begin{bmatrix} 1 & 0 \\ 0 & 1 \\ 0 & -j \\ -1 & 0 \end{bmatrix}$ Rank-2 codebook set 4-2

$\begin{bmatrix} 1 & 0 \\ 0 & 1 \\ -j & 0 \\ 0 & -j \end{bmatrix}$, $\begin{bmatrix} 1 & 0 \\ 0 & 1 \\ 0 & j \\ -j & 0 \end{bmatrix}$, $\begin{bmatrix} 1 & 0 \\ 0 & 1 \\ 0 & -j \\ j & 0 \end{bmatrix}$, $\begin{bmatrix} 1 & 0 \\ 0 & 1 \\ 0 & 1 \\ 1 & 0 \end{bmatrix}$, $\begin{bmatrix} 1 & 0 \\ 0 & 1 \\ j & 0 \\ 0 & -j \end{bmatrix}$, $\begin{bmatrix} 1 & 0 \\ 0 & 1 \\ 0 & 1 \\ -1 & 0 \end{bmatrix}$, $\begin{bmatrix} 1 & 0 \\ 0 & 1 \\ 1 & 0 \\ 0 & j \end{bmatrix}$, $\begin{bmatrix} 1 & 0 \\ 0 & 1 \\ 0 & -j \\ -j & 0 \end{bmatrix}$, $\begin{bmatrix} 1 & 0 \\ j & 0 \\ 0 & 1 \\ 0 & -j \end{bmatrix}$, $\begin{bmatrix} 1 & 0 \\ j & 0 \\ 0 & 1 \\ 0 & j \end{bmatrix}$, $\begin{bmatrix} 1 & 0 \\ 0 & 1 \\ -1 & 0 \\ 0 & -1 \end{bmatrix}$, $\begin{bmatrix} 1 & 0 \\ 1 & 0 \\ 0 & 1 \\ 0 & 1 \end{bmatrix}$, $\begin{bmatrix} 1 & 0 \\ 0 & 1 \\ -1 & 0 \\ 0 & 1 \end{bmatrix}$, $\begin{bmatrix} 1 & 0 \\ -1 & 0 \\ 0 & 1 \\ 0 & -1 \end{bmatrix}$, $\begin{bmatrix} 1 & 0 \\ -j & 0 \\ 0 & 1 \\ 0 & j \end{bmatrix}$ Rank-2 codebook set 5-2

$\begin{bmatrix} 1 & 0 \\ 0 & 1 \\ j & 0 \\ 0 & j \end{bmatrix}$, $\begin{bmatrix} 1 & 0 \\ 0 & 1 \\ 0 & -1 \\ 1 & 0 \end{bmatrix}$, $\begin{bmatrix} 1 & 0 \\ 0 & 1 \\ -j & 0 \\ 0 & 1 \end{bmatrix}$, $\begin{bmatrix} 1 & 0 \\ 1 & 0 \\ 0 & 1 \\ 0 & 1 \end{bmatrix}$, $\begin{bmatrix} 1 & 0 \\ 0 & 1 \\ 0 & 1 \\ -1 & 0 \end{bmatrix}$, $\begin{bmatrix} 1 & 0 \\ -j & 0 \\ 0 & -j \\ j & 0 \end{bmatrix}$, $\begin{bmatrix} 1 & 0 \\ 0 & 1 \\ 0 & 1 \\ 0 & j \end{bmatrix}$, $\begin{bmatrix} 1 & 0 \\ 1 & 0 \\ 0 & 1 \\ 0 & -1 \end{bmatrix}$, $\begin{bmatrix} 1 & 0 \\ 0 & 1 \\ 0 & 1 \\ 1 & 0 \end{bmatrix}$, $\begin{bmatrix} 1 & 0 \\ -1 & 0 \\ 0 & 1 \\ 0 & -1 \end{bmatrix}$, $\begin{bmatrix} 1 & 0 \\ 1 & 0 \\ 0 & 1 \\ 0 & -1 \end{bmatrix}$, $\begin{bmatrix} 1 & 0 \\ j & 0 \\ 0 & 1 \\ 0 & j \end{bmatrix}$, $\begin{bmatrix} 1 & 0 \\ 0 & 1 \\ 0 & -j \\ -j & 0 \end{bmatrix}$, $\begin{bmatrix} 1 & 0 \\ 0 & 1 \\ -1 & 0 \\ 0 & -1 \end{bmatrix}$, $\begin{bmatrix} 1 & 0 \\ 0 & 1 \\ j & 0 \\ 0 & -j \end{bmatrix}$ Rank-2 codebook set 6-2

$\begin{bmatrix} 1 & 0 \\ 0 & 1 \\ 1 & 0 \\ 0 & 1 \end{bmatrix}$, $\begin{bmatrix} 1 & 0 \\ 1 & 0 \\ 0 & 1 \\ 0 & j \end{bmatrix}$, $\begin{bmatrix} 1 & 0 \\ 0 & 1 \\ 0 & -j \\ 1 & 0 \end{bmatrix}$, $\begin{bmatrix} 1 & 0 \\ 0 & 1 \\ -j & 0 \\ 0 & -j \end{bmatrix}$, $\begin{bmatrix} 1 & 0 \\ 0 & 1 \\ 0 & j \\ 0 & -j \end{bmatrix}$, $\begin{bmatrix} 1 & 0 \\ -1 & 0 \\ 0 & 1 \\ 0 & 1 \end{bmatrix}$, $\begin{bmatrix} 1 & 0 \\ 0 & 1 \\ -j & 0 \\ 0 & j \end{bmatrix}$, $\begin{bmatrix} 1 & 0 \\ -j & 0 \\ 0 & 1 \\ 0 & -j \end{bmatrix}$, $\begin{bmatrix} 1 & 0 \\ 0 & 1 \\ 0 & 1 \\ -1 & 0 \end{bmatrix}$, $\begin{bmatrix} 1 & 0 \\ 0 & 1 \\ 1 & 0 \\ 0 & -1 \end{bmatrix}$, $\begin{bmatrix} 1 & 0 \\ j & 0 \\ 0 & 1 \\ 0 & -j \end{bmatrix}$, $\begin{bmatrix} 1 & 0 \\ 0 & 1 \\ 0 & j \\ j & 0 \end{bmatrix}$, $\begin{bmatrix} 1 & 0 \\ -1 & 0 \\ 0 & 1 \\ 0 & -1 \end{bmatrix}$, $\begin{bmatrix} 1 & 0 \\ 0 & 1 \\ 0 & -1 \\ -1 & 0 \end{bmatrix}$, $\begin{bmatrix} 1 & 0 \\ 0 & 1 \\ j & 0 \\ 0 & -j \end{bmatrix}$ TABLE 2-continued

Rank-2 codebook set 7-2

$$\begin{bmatrix} 1 & 0 \\ -j & 0 \\ 0 & 1 \\ 0 & -j \end{bmatrix}, \begin{bmatrix} 1 & 0 \\ 0 & 1 \\ 0 & j \\ j & 0 \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 0 & 1 \\ -j & 0 \end{bmatrix}, \begin{bmatrix} 1 & 0 \\ 1 & 0 \\ 0 & 1 \\ 0 & 1 \end{bmatrix}, \begin{bmatrix} 1 & 0 \\ j & 0 \\ 0 & 1 \\ 0 & j \end{bmatrix}, \begin{bmatrix} 1 & 0 \\ 0 & 1 \\ j & 0 \\ 0 & 1 \end{bmatrix}, \begin{bmatrix} 1 & 0 \\ 0 & 1 \\ 1 & 0 \\ 0 & -j \end{bmatrix},$$

$$\begin{bmatrix} 1 & 0 \\ j & 0 \\ 0 & 1 \\ 0 & -j \end{bmatrix}, \begin{bmatrix} 1 & 0 \\ 0 & 1 \\ -1 & 0 \\ 0 & j \end{bmatrix}, \begin{bmatrix} 1 & 0 \\ 0 & 1 \\ 0 & -1 \\ -j & 0 \end{bmatrix}, \begin{bmatrix} 1 & 0 \\ -1 & 0 \\ 0 & 1 \\ 0 & 1 \end{bmatrix}, \begin{bmatrix} 1 & 0 \\ 0 & 1 \\ 1 & 0 \\ 0 & j \end{bmatrix}, \begin{bmatrix} 1 & 0 \\ 0 & 1 \\ j & 0 \\ 0 & -1 \end{bmatrix}, \begin{bmatrix} 1 & 0 \\ 0 & 1 \\ 0 & -j \\ -1 & 0 \end{bmatrix},$$

Rank-2 codebook set 8-2

$$\begin{bmatrix} 1 & 0 \\ j & 0 \\ 0 & 1 \\ 0 & -1 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ j & 0 \\ 0 & j \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 0 & 1 \\ -j & 0 \end{bmatrix}, \begin{bmatrix} 1 & 0 \\ 0 & 1 \\ 1 & 0 \\ 0 & -1 \end{bmatrix}, \begin{bmatrix} 1 & 0 \\ 1 & 0 \\ 0 & 1 \\ 0 & 1 \end{bmatrix},$$

$$\begin{bmatrix} 1 & 0 \\ -j & 0 \\ 0 & 1 \\ 0 & j \end{bmatrix}, \begin{bmatrix} 1 & 0 \\ 0 & 1 \\ -j & 0 \\ 0 & j \end{bmatrix}, \begin{bmatrix} 1 & 0 \\ 0 & 1 \\ 1 & 0 \\ 0 & 1 \end{bmatrix}, \begin{bmatrix} 1 & 0 \\ 0 & 1 \\ 0 & 1 \\ j & 0 \end{bmatrix}, \begin{bmatrix} 1 & 0 \\ -1 & 0 \\ 0 & 1 \\ 0 & 1 \end{bmatrix}, \begin{bmatrix} 1 & 0 \\ -j & 0 \\ 0 & 1 \\ 0 & -j \end{bmatrix}, \begin{bmatrix} 1 & 0 \\ 0 & 1 \\ 0 & j \\ 1 & 0 \end{bmatrix}, \begin{bmatrix} 1 & 0 \\ 0 & 1 \\ 0 & -1 \\ -j & 0 \end{bmatrix},$$

Rank-2 codebook set 9-2

$$\begin{bmatrix} 1 & 0 \\ -1 & 0 \\ 0 & 1 \\ 0 & -1 \end{bmatrix}, \begin{bmatrix} 1 & 0 \\ 0 & 1 \\ 0 & j \\ 1 & 0 \end{bmatrix}, \begin{bmatrix} 1 & 0 \\ 0 & 1 \\ 0 & -1 \\ j & 0 \end{bmatrix}, \begin{bmatrix} 1 & 0 \\ 0 & 1 \\ -1 & 0 \\ 0 & 1 \end{bmatrix}, \begin{bmatrix} 1 & 0 \\ 0 & 1 \\ 0 & 1 \\ -1 & 0 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ j & 0 \\ 0 & j \end{bmatrix}, \begin{bmatrix} 1 & 0 \\ j & 0 \\ 0 & 1 \\ 0 & 1 \end{bmatrix},$$

$$\begin{bmatrix} 1 & 0 \\ 1 & 0 \\ 0 & 1 \\ 0 & -j \end{bmatrix}, \begin{bmatrix} 1 & 0 \\ 1 & 0 \\ 0 & 1 \\ 0 & j \end{bmatrix}, \begin{bmatrix} 1 & 0 \\ -j & 0 \\ 0 & 1 \\ 0 & 1 \end{bmatrix}, \begin{bmatrix} 1 & 0 \\ 0 & 1 \\ 0 & -1 \\ -j & 0 \end{bmatrix}, \begin{bmatrix} 1 & 0 \\ 0 & 1 \\ j & 0 \\ 0 & -j \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ 1 & 0 \\ 0 & -1 \end{bmatrix},$$

Rank-2 codebook set 10-2

$$\begin{bmatrix} 1 & 0 \\ 0 & 1 \\ 1 & 0 \\ 0 & -j \end{bmatrix}, \begin{bmatrix} 1 & 0 \\ -j & 0 \\ 0 & 1 \\ 0 & -1 \end{bmatrix}, \begin{bmatrix} 1 & 0 \\ -1 & 0 \\ 0 & 1 \\ 0 & -j \end{bmatrix}, \begin{bmatrix} 1 & 0 \\ 0 & 1 \\ -1 & 0 \\ 0 & 1 \end{bmatrix}, \begin{bmatrix} 1 & 0 \\ 0 & 1 \\ 0 & -j \\ -j & 0 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & 1 \\ 0 & -1 \\ 1 & 0 \end{bmatrix},$$

$$\begin{bmatrix} 1 & 0 \\ 1 & 0 \\ 0 & 1 \\ 0 & j \end{bmatrix}, \begin{bmatrix} 1 & 0 \\ 0 & 1 \\ j & 0 \\ 0 & j \end{bmatrix}, \begin{bmatrix} 1 & 0 \\ 1 & 0 \\ 0 & 1 \\ 0 & -j \end{bmatrix}, \begin{bmatrix} 1 & 0 \\ j & 0 \\ 0 & 1 \\ 0 & -1 \end{bmatrix}, \begin{bmatrix} 1 & 0 \\ 0 & 1 \\ 0 & -j \\ j & 0 \end{bmatrix}, \begin{bmatrix} 1 & 0 \\ 0 & 1 \\ 0 & 1 \\ 1 & 0 \end{bmatrix}, \begin{bmatrix} 1 & 0 \\ 0 & 1 \\ -j & 0 \\ 0 & j \end{bmatrix}, \begin{bmatrix} 1 & 0 \\ 0 & 1 \\ 0 & 1 \\ -1 & 0 \end{bmatrix},$$

Rank-2 codebook set 11-2

$$\begin{bmatrix} 1 & 0 \\ 0 & 1 \\ 1 & 0 \\ 0 & j \end{bmatrix}, \begin{bmatrix} 1 & 0 \\ -j & 0 \\ 0 & 1 \\ 0 & -1 \end{bmatrix}, \begin{bmatrix} 1 & 0 \\ 1 & 0 \\ 0 & 1 \\ 0 & 1 \end{bmatrix}, \begin{bmatrix} 1 & 0 \\ 0 & 1 \\ j & 0 \\ 0 & 1 \end{bmatrix}, \begin{bmatrix} 1 & 0 \\ -1 & 0 \\ 0 & 1 \\ 0 & -j \end{bmatrix}, \begin{bmatrix} 1 & 0 \\ 0 & 1 \\ -1 & 0 \\ 0 & j \end{bmatrix}, \begin{bmatrix} 1 & 0 \\ 0 & 1 \\ -1 & 0 \\ 0 & -j \end{bmatrix}, \begin{bmatrix} 1 & 0 \\ 0 & 1 \\ 0 & -j \\ -1 & 0 \end{bmatrix},$$

$$\begin{bmatrix} 1 & 0 \\ 0 & 1 \\ 0 & 1 \\ j & 0 \end{bmatrix}, \begin{bmatrix} 1 & 0 \\ 0 & 1 \\ 0 & -j \\ 1 & 0 \end{bmatrix}, \begin{bmatrix} 1 & 0 \\ 0 & 1 \\ j & 0 \\ 0 & -1 \end{bmatrix}, \begin{bmatrix} 1 & 0 \\ j & 0 \\ 0 & 1 \\ 0 & -1 \end{bmatrix}, \begin{bmatrix} 1 & 0 \\ 0 & 1 \\ 0 & -1 \\ j & 0 \end{bmatrix}, \begin{bmatrix} 1 & 0 \\ -1 & 0 \\ 0 & 1 \\ 0 & j \end{bmatrix}, \begin{bmatrix} 1 & 0 \\ 0 & 1 \\ 0 & 1 \\ -j & 0 \end{bmatrix},$$

TABLE 2-continued

Rank-2 codebook set 12-2

$$\begin{bmatrix} 1 & 0 \\ 0 & 1 \\ -1 & 0 \\ 0 & 1 \end{bmatrix}, \begin{bmatrix} 1 & 0 \\ 1 & 0 \\ 0 & 1 \\ 0 & -1 \end{bmatrix}, \begin{bmatrix} 1 & 0 \\ 0 & 1 \\ 0 & -j \\ j & 0 \end{bmatrix}, \begin{bmatrix} 1 & 0 \\ 0 & 1 \\ 1 & 0 \\ 0 & -j \end{bmatrix}, \begin{bmatrix} 1 & 0 \\ 0 & 1 \\ 0 & -1 \\ -1 & 0 \end{bmatrix}, \begin{bmatrix} 1 & 0 \\ -j & 0 \\ 0 & 1 \\ 0 & -j \end{bmatrix}, \begin{bmatrix} 1 & 0 \\ 0 & 1 \\ 0 & j \\ j & 0 \end{bmatrix},$$

$$\begin{bmatrix} 1 & 0 \\ 0 & 1 \\ 0 & 1 \\ 1 & 0 \end{bmatrix}, \begin{bmatrix} 1 & 0 \\ 0 & 1 \\ -j & 0 \\ 0 & -1 \end{bmatrix}, \begin{bmatrix} 1 & 0 \\ -1 & 0 \\ 0 & 1 \\ 0 & 1 \end{bmatrix}, \begin{bmatrix} 1 & 0 \\ 0 & 1 \\ 0 & 1 \\ 0 & 1 \end{bmatrix}, \begin{bmatrix} 1 & 0 \\ 0 & 1 \\ j & 0 \\ 0 & -1 \end{bmatrix}, \begin{bmatrix} 1 & 0 \\ 0 & 1 \\ 0 & -1 \\ 1 & 0 \end{bmatrix}, \begin{bmatrix} 1 & 0 \\ 0 & 1 \\ 1 & 0 \\ 0 & j \end{bmatrix}, \begin{bmatrix} 1 & 0 \\ j & 0 \\ 0 & 1 \\ 0 & -j \end{bmatrix}$$

The codebooks shown in Table 2 are also disclosed only for illustrative purposes, the row permutation and/or column permutation may be carried out on all or some of precoding matrices of the codebooks.

Rank 3—First Embodiment

In order to design the 4Tx Rank-3 codebook so as to maintain good CM properties, it is assumed that the following three precoding matrix groups are used. For convenience of description, a factor related to power balancing will be omitted herein.

[Equation 44]

Group 1

$$\left( \begin{bmatrix} 1 & 0 & 1 \\ X & 0 & -X \\ 0 & 1 & 0 \\ 0 & Y & 0 \end{bmatrix}, \begin{bmatrix} 1 & 0 & 1 \\ X & 0 & -X \\ 0 & 1 & 0 \\ 0 & -Y & 0 \end{bmatrix}, \begin{bmatrix} 0 & 1 & 0 \\ 0 & X & 0 \\ 1 & 0 & 1 \\ Y & 0 & -Y \end{bmatrix}, \begin{bmatrix} 0 & 1 & 0 \\ 0 & -X & 0 \\ 1 & 0 & 1 \\ Y & 0 & -Y \end{bmatrix} \right)$$

$$X, Y \in \left\{ 1, \frac{1+j}{\sqrt{2}}, j, \frac{1-j}{\sqrt{2}} \right\}$$

Group 2

$$\left( \begin{bmatrix} 1 & 0 & 1 \\ 0 & 1 & 0 \\ X & 0 & -X \\ 0 & Y & 0 \end{bmatrix}, \begin{bmatrix} 1 & 0 & 1 \\ 0 & 1 & 0 \\ X & 0 & -X \\ 0 & -Y & 0 \end{bmatrix}, \begin{bmatrix} 0 & 1 & 0 \\ 1 & 0 & 1 \\ 0 & X & 0 \\ Y & 0 & -Y \end{bmatrix}, \begin{bmatrix} 0 & 1 & 0 \\ 1 & 0 & 1 \\ 0 & -X & 0 \\ Y & 0 & -Y \end{bmatrix} \right)$$

$$X, Y \in \left\{ 1, \frac{1+j}{\sqrt{2}}, j, \frac{1-j}{\sqrt{2}} \right\}$$

Group 3

$$\left( \begin{bmatrix} 1 & 0 & 1 \\ 0 & 1 & 0 \\ 0 & Y & 0 \\ X & 0 & -X \end{bmatrix}, \begin{bmatrix} 1 & 0 & 1 \\ 0 & 1 & 0 \\ 0 & -Y & 0 \\ X & 0 & -X \end{bmatrix}, \begin{bmatrix} 0 & 1 & 0 \\ 1 & 0 & 1 \\ Y & 0 & -Y \\ 0 & X & 0 \end{bmatrix}, \begin{bmatrix} 0 & 1 & 0 \\ 1 & 0 & 1 \\ Y & 0 & -Y \\ 0 & -X & 0 \end{bmatrix} \right)$$

$$X, Y \in \left\{ 1, \frac{1+j}{\sqrt{2}}, j, \frac{1-j}{\sqrt{2}} \right\}$$

In case of Rank 3, the present invention proposes a method for constructing a codebook according to the above-mentioned Norm 1 and Norm 2 in the same manner as in Rank 2. In more detail, a chordal distance about all precoding matrix combinations available in a codebook is calculated using Equation 42, and then a minimum number of sets each having a maximum chordal distance can be selected. In addition, the present invention proposes a method for most uniformly selecting the precoding matrix from each group (Group 1, 2, or 3). If the letter denoted by a precoding matrix component of each group is restricted to (1, j, −1, −j), the following codebook capable of satisfying a minimum chordal distance $d_c = 0.707$ can be obtained.

TABLE 3

Rank-3 codebook set 1-1

$$\begin{bmatrix} 1 & 0 & 1 \\ 0 & 1 & 0 \\ j & 0 & -j \\ 0 & j & 0 \end{bmatrix}, \begin{bmatrix} 1 & 0 & 1 \\ 0 & 1 & 0 \\ 0 & j & 0 \\ j & 0 & -j \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 0 & 1 & 0 \\ 1 & 0 & 1 \\ 0 & 1 & 0 \\ j & 0 & -j \end{bmatrix},$$

$$\begin{bmatrix} 1 & 0 & 1 \\ 0 & 1 & 0 \\ 1 & 0 & -1 \\ 0 & 1 & 0 \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 0 & 1 & 0 \\ 1 & 0 & 1 \\ 0 & -j & 0 \\ 1 & 0 & 1 \end{bmatrix}, \begin{bmatrix} 0 & 1 & 0 \\ 0 & -j & 0 \\ 1 & 0 & 1 \\ 1 & 0 & 1 \end{bmatrix}, \begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 1 & 0 & 1 \\ j & 0 & -j \\ 0 & j & 0 \end{bmatrix}$$

TABLE 3-continued

Rank-3 codebook set 2-1

$$\begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 0 & 1 & 0 \\ 1 & 0 & 1 \\ j & 0 & -j \\ 0 & j & 0 \end{bmatrix}, \begin{bmatrix} 1 & 0 & 1 \\ 0 & 1 & 0 \\ 0 & -1 & 0 \\ j & 0 & -j \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & -j & 0 \end{bmatrix},$$

$$\begin{bmatrix} 0 & 1 & 0 \\ 1 & 0 & 1 \\ 0 & -1 & 0 \\ j & 0 & -j \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 0 & 1 & 0 \\ 1 & 0 & 1 \\ 0 & j & 0 \\ j & 0 & -j \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 0 & 1 & 0 \\ 1 & 0 & 1 \\ 1 & 0 & -1 \\ 0 & -1 & 0 \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ j & 0 & -j \\ 0 & -j & 0 \end{bmatrix}, \begin{bmatrix} 1 & 0 & 1 \\ j & 0 & -j \\ 0 & 1 & 0 \\ 0 & 1 & 0 \end{bmatrix}$$

Rank-3 codebook set 3-1

$$\begin{bmatrix} 1 & 0 & 1 \\ 0 & 1 & 0 \\ j & 0 & -j \\ 0 & 1 & 0 \end{bmatrix}, \begin{bmatrix} 0 & 1 & 0 \\ 1 & 0 & 1 \\ 0 & 1 & 0 \\ j & 0 & -j \end{bmatrix}, \begin{bmatrix} 0 & 1 & 0 \\ 1 & 0 & 1 \\ j & 0 & -j \\ 0 & 1 & 0 \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 0 & 1 & 0 \\ 0 & -1 & 0 \\ 1 & 0 & 1 \\ j & 0 & -j \end{bmatrix}, \begin{bmatrix} 0 & 1 & 0 \\ 1 & 0 & 1 \\ 1 & 0 & -1 \\ 0 & j & 0 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ 0 & 1 & 0 \\ j & 0 & -j \\ 0 & -1 & 0 \end{bmatrix},$$

$$\begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 0 & 1 & 0 \\ 0 & -j & 0 \\ 1 & 0 & 1 \\ 1 & 0 & -1 \end{bmatrix}, \begin{bmatrix} 0 & 1 & 0 \\ 1 & 0 & 1 \\ 0 & -1 & 0 \\ j & 0 & -j \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ j & 0 & -j \\ 0 & 1 & 0 \\ 0 & 1 & 0 \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & -1 & 0 \\ 1 & 0 & -1 \end{bmatrix}$$

Rank-3 codebook set 4-1

$$\begin{bmatrix} 1 & 0 & 1 \\ 1 & 0 & -1 \\ 0 & 1 & 0 \\ 0 & -1 & 0 \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 0 & 1 & 0 \\ 0 & 1 & 0 \\ 1 & 0 & 1 \\ j & 0 & -j \end{bmatrix}, \begin{bmatrix} 0 & 1 & 0 \\ 0 & -1 & 0 \\ 1 & 0 & 1 \\ j & 0 & -j \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 1 & 0 & 1 \\ 0 & 1 & 0 \\ 0 & 1 & 0 \\ j & 0 & -j \end{bmatrix}, \begin{bmatrix} 1 & 0 & 1 \\ 0 & 1 & 0 \\ 1 & 0 & -1 \\ 0 & -j & 0 \end{bmatrix}, \begin{bmatrix} 0 & 1 & 0 \\ 1 & 0 & 1 \\ 0 & -1 & 0 \\ 1 & 0 & -1 \end{bmatrix},$$

$$\begin{bmatrix} 1 & 0 & 1 \\ 1 & 0 & -1 \\ 0 & 1 & 0 \\ 0 & 1 & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 1 & 0 & 1 \\ 0 & 1 & 0 \\ 0 & -1 & 0 \\ 1 & 0 & -1 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & -j & 0 \\ j & 0 & -j \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & -j & 0 \end{bmatrix}$$

Rank-3 codebook set 5-1

$$\begin{bmatrix} 1 & 0 & 1 \\ 0 & 1 & 0 \\ 1 & 0 & -1 \\ 0 & 1 & 0 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ 1 & 0 & -1 \\ 0 & 1 & 0 \\ 0 & -1 & 0 \end{bmatrix}, \begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 1 & 0 & 1 \\ 0 & -j & 0 \\ 1 & 0 & -1 \end{bmatrix}, \begin{bmatrix} 1 & 0 & 1 \\ 1 & 0 & -1 \\ 0 & 1 & 0 \\ 1 & 0 & -1 \end{bmatrix}, \begin{bmatrix} 1 & 0 & 1 \\ 0 & 1 & 0 \\ 0 & j & 0 \\ j & 0 & -j \end{bmatrix},$$

$$\begin{bmatrix} 1 & 0 & 1 \\ 0 & 1 & 0 \\ 0 & -1 & 0 \\ j & 0 & -j \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 0 & 1 & 0 \\ 1 & 0 & 1 \\ 1 & 0 & -1 \\ 0 & j & 0 \end{bmatrix}, \begin{bmatrix} 0 & 1 & 0 \\ 1 & 0 & 1 \\ j & 0 & -j \\ 0 & -1 & 0 \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 0 & 1 & 0 \\ 0 & -j & 0 \\ 1 & 0 & 1 \\ j & 0 & -j \end{bmatrix}, \begin{bmatrix} 1 & 0 & 1 \\ 0 & 1 & 0 \\ 1 & 0 & 1 \\ 0 & -1 & 0 \end{bmatrix}, \begin{bmatrix} 1 & 0 & 1 \\ 0 & 1 & 0 \\ 0 & 1 & 0 \\ 0 & -j & 0 \end{bmatrix}$$

Rank-3 codebook set 6-1

$$\begin{bmatrix} 1 & 0 & 1 \\ 0 & 1 & 0 \\ j & 0 & -j \\ 0 & -1 & 0 \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 0 & -j & 0 \\ 1 & 0 & 1 \\ 1 & 0 & -1 \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 0 & 1 & 0 \\ 1 & 0 & 1 \\ 0 & 1 & 0 \\ 0 & j & 0 \end{bmatrix}, \begin{bmatrix} 1 & 0 & 1 \\ 0 & 1 & 0 \\ j & 0 & -j \\ 0 & j & 0 \end{bmatrix}, \begin{bmatrix} 0 & 1 & 0 \\ 1 & 0 & 1 \\ 0 & -j & 0 \\ j & 0 & -j \end{bmatrix},$$

$$\begin{bmatrix} 1 & 0 & 1 \\ 0 & 1 & 0 \\ j & 0 & -j \\ 0 & -1 & 0 \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ 0 & 1 & 0 \\ 0 & j & 0 \\ 1 & 0 & -1 \end{bmatrix}, \begin{bmatrix} 1 & 0 & 1 \\ j & 0 & -j \\ 0 & 1 & 0 \\ 0 & 1 & 0 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 0 & 1 & 0 \\ 1 & 0 & 1 \\ j & 0 & -j \\ 0 & j & 0 \end{bmatrix}, \begin{bmatrix} 1 & 0 & 1 \\ 1 & 0 & -1 \\ 0 & 1 & 0 \\ 0 & 1 & 0 \end{bmatrix}, \begin{bmatrix} 0 & 1 & 0 \\ 1 & 0 & 1 \\ j & 0 & -j \\ 0 & -1 & 0 \end{bmatrix}$$

TABLE 3-continued

Rank-3 codebook set 7-1

$$\begin{bmatrix} 0 & 1 & 0 \\ 0 & -1 & 0 \\ 1 & 0 & 1 \\ j & 0 & -j \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & 1 & 0 \end{bmatrix}, \begin{bmatrix} 1 & 0 & 1 \\ 0 & 1 & 0 \\ 0 & j & 0 \\ 1 & 0 & -1 \end{bmatrix}, \begin{bmatrix} 1 & 0 & 1 \\ 1 & 0 & -1 \\ 0 & 1 & 0 \\ 0 & j & 0 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 1 & 0 & 1 \\ 1 & 0 & -1 \\ 0 & 1 & 0 \\ 0 & -1 & 0 \end{bmatrix}, \begin{bmatrix} 1 & 0 & 1 \\ 0 & 1 & 0 \\ 0 & 1 & 0 \\ j & 0 & -j \end{bmatrix},$$

$$\begin{bmatrix} 0 & 1 & 0 \\ 1 & 0 & 1 \\ 0 & j & 0 \\ j & 0 & -j \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 0 & 1 & 0 \\ 1 & 0 & 1 \\ 0 & 1 & 0 \\ j & 0 & -j \end{bmatrix}, \begin{bmatrix} 0 & 1 & 0 \\ 0 & -j & 0 \\ 1 & 0 & 1 \\ j & 0 & -j \end{bmatrix}, \begin{bmatrix} 0 & 1 & 0 \\ 1 & 0 & 1 \\ 0 & -1 & 0 \\ 1 & 0 & -1 \end{bmatrix}, \begin{bmatrix} 0 & 1 & 0 \\ 1 & 0 & 1 \\ j & 0 & -j \\ 0 & -1 & 0 \end{bmatrix}, \begin{bmatrix} 1 & 0 & 1 \\ 0 & 1 & 0 \\ j & 0 & -j \\ 0 & -1 & 0 \end{bmatrix}, \begin{bmatrix} 1 & 0 & 1 \\ 0 & 1 & 0 \\ j & 0 & -j \\ 0 & -j & 0 \end{bmatrix},$$

Rank-3 codebook set 8-1

$$\begin{bmatrix} 0 & 1 & 0 \\ 0 & 1 & 0 \\ 1 & 0 & 1 \\ j & 0 & -j \end{bmatrix}, \begin{bmatrix} 0 & 1 & 0 \\ 1 & 0 & 1 \\ j & 0 & -j \\ 0 & -1 & 0 \end{bmatrix}, \begin{bmatrix} 1 & 0 & 1 \\ 1 & 0 & -1 \\ 0 & 1 & 0 \\ 0 & -j & 0 \end{bmatrix}, \begin{bmatrix} 1 & 0 & 1 \\ 0 & 1 & 0 \\ j & 0 & -j \\ 0 & -j & 0 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 1 & 0 & 1 \\ 0 & 1 & 0 \\ 0 & -1 & 0 \\ 1 & 0 & -1 \end{bmatrix}, \begin{bmatrix} 1 & 0 & 1 \\ 0 & 1 & 0 \\ 1 & 0 & -1 \\ 0 & -j & 0 \end{bmatrix}, \begin{bmatrix} 1 & 0 & 1 \\ j & 0 & -j \\ 0 & 1 & 0 \\ 0 & j & 0 \end{bmatrix},$$

$$\begin{bmatrix} 0 & 1 & 0 \\ 1 & 0 & 1 \\ 1 & 0 & -1 \\ 0 & j & 0 \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 0 & 1 & 0 \\ 0 & -1 & 0 \\ 1 & 0 & 1 \\ j & 0 & -j \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 1 & 0 & 1 \\ 0 & 1 & 0 \\ 0 & j & 0 \\ j & 0 & -j \end{bmatrix}$$

It should be noted that the row permutation and/or the column permutation may be carried out on all or some of precoding matrices of the above codebooks shown in Table 3.

If only 15 precoding matrices are included in the Rank-3 codebook, one precoding matrix of a group for selecting the largest number of precoding matrices among individual groups is removed from the codebooks shown in Table 3, so that the removed result may be configured as shown in the following Table 4.

TABLE 4

Rank-3 codebook set 1-2

$$\begin{bmatrix} 1 & 0 & 1 \\ 0 & 1 & 0 \\ j & 0 & -j \\ 0 & j & 0 \end{bmatrix}, \begin{bmatrix} 1 & 0 & 1 \\ 0 & 1 & 0 \\ 0 & j & 0 \\ j & 0 & -j \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ j & 0 & -j \\ 0 & 1 & 0 \\ 0 & 1 & 0 \end{bmatrix}, \begin{bmatrix} 1 & 0 & 1 \\ 0 & 1 & 0 \\ j & 0 & -j \\ 0 & -j & 0 \end{bmatrix},$$

$$\begin{bmatrix} 1 & 0 & 1 \\ 0 & 1 & 0 \\ 1 & 0 & -1 \\ 0 & 1 & 0 \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 0 & 1 & 0 \\ 1 & 0 & 1 \\ 0 & -j & 0 \\ 1 & 0 & -1 \end{bmatrix}, \begin{bmatrix} 0 & 1 & 0 \\ 0 & -j & 0 \\ 1 & 0 & 1 \\ 1 & 0 & -1 \end{bmatrix}, \begin{bmatrix} 0 & 1 & 0 \\ 0 & -1 & 0 \\ 1 & 0 & 1 \\ j & 0 & -j \end{bmatrix}, \begin{bmatrix} 0 & 1 & 0 \\ 1 & 0 & 1 \\ j & 0 & -j \\ 0 & j & 0 \end{bmatrix}$$

Rank-3 codebook set 2-2

$$\begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 0 & 1 & 0 \\ 1 & 0 & 1 \\ j & 0 & -j \\ 0 & j & 0 \end{bmatrix}, \begin{bmatrix} 1 & 0 & 1 \\ 0 & 1 & 0 \\ 0 & -1 & 0 \\ j & 0 & -j \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & -j & 0 \end{bmatrix},$$

$$\begin{bmatrix} 0 & 1 & 0 \\ 1 & 0 & 1 \\ 0 & -1 & 0 \\ j & 0 & -j \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & 1 & 0 \\ j & 0 & -j \end{bmatrix}, \begin{bmatrix} 1 & 0 & 1 \\ j & 0 & -j \\ 0 & 1 & 0 \\ 0 & 1 & 0 \end{bmatrix}$$

TABLE 4-continued

Rank-3 codebook set 3-2

$$\begin{bmatrix} 1 & 0 & 1 \\ 0 & 1 & 0 \\ j & 0 & -j \\ 0 & 1 & 0 \end{bmatrix}, \begin{bmatrix} 0 & 1 & 0 \\ 1 & 0 & 1 \\ j & 0 & -j \\ 0 & 1 & 0 \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 0 & 1 & 0 \\ 0 & -1 & 0 \\ 1 & 0 & 1 \\ j & 0 & -j \end{bmatrix}, \begin{bmatrix} 0 & 1 & 0 \\ 1 & 0 & 1 \\ 1 & 0 & -1 \\ 0 & j & 0 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ 0 & 1 & 0 \\ j & 0 & -j \\ 0 & -1 & 0 \end{bmatrix},$$

$$\begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 0 & 1 & 0 \\ 0 & -j & 0 \\ 1 & 0 & 1 \\ 1 & 0 & -1 \end{bmatrix}, \begin{bmatrix} 0 & 1 & 0 \\ 1 & 0 & 1 \\ 0 & -1 & 0 \\ j & 0 & -j \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ j & 0 & -j \\ 0 & 1 & 0 \\ 0 & 1 & 0 \end{bmatrix}, \begin{bmatrix} 1 & 0 & 1 \\ 1 & 0 & -1 \\ 0 & 1 & 0 \\ 0 & -1 & 0 \end{bmatrix}, \begin{bmatrix} 1 & 0 & 1 \\ 0 & 1 & 0 \\ 0 & -1 & 0 \\ 1 & 0 & -1 \end{bmatrix}$$

Rank-3 codebook set 4-2

$$\begin{bmatrix} 1 & 0 & 1 \\ 1 & 0 & -1 \\ 0 & 1 & 0 \\ 0 & -1 & 0 \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 0 & 1 & 0 \\ 0 & 1 & 0 \\ 1 & 0 & 1 \\ j & 0 & -j \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 1 & 0 & 1 \\ 0 & 1 & 0 \\ 0 & 1 & 0 \\ j & 0 & -j \end{bmatrix}, \begin{bmatrix} 1 & 0 & 1 \\ 1 & 0 & -1 \\ 0 & 1 & 0 \\ 0 & 1 & 0 \end{bmatrix}, \begin{bmatrix} 0 & 1 & 0 \\ 1 & 0 & 1 \\ 0 & -1 & 0 \\ 1 & 0 & -1 \end{bmatrix},$$

$$\begin{bmatrix} 1 & 0 & 1 \\ 1 & 0 & -1 \\ 0 & 1 & 0 \\ 0 & 1 & 0 \end{bmatrix}, \begin{bmatrix} 0 & 1 & 0 \\ 1 & 0 & 1 \\ 1 & 0 & -1 \\ 0 & 1 & 0 \end{bmatrix}, \begin{bmatrix} 1 & 0 & 1 \\ 0 & 1 & 0 \\ 0 & -1 & 0 \\ 1 & 0 & -1 \end{bmatrix}, \begin{bmatrix} 0 & 1 & 0 \\ 0 & j & 0 \\ 1 & 0 & 1 \\ j & 0 & -j \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & -j & 0 \\ j & 0 & -j \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & -j & 0 \end{bmatrix}$$

Rank-3 codebook set 5-2

$$\begin{bmatrix} 1 & 0 & 1 \\ 0 & 1 & 0 \\ 1 & 0 & -1 \\ 0 & 1 & 0 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 1 & 0 & 1 \\ 1 & 0 & -1 \\ 0 & 1 & 0 \\ 0 & -1 & 0 \end{bmatrix}, \begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 1 & 0 & 1 \\ 0 & -j & 0 \\ 1 & 0 & -1 \end{bmatrix}, \begin{bmatrix} 1 & 0 & 1 \\ 1 & 0 & -1 \\ 0 & 1 & 0 \\ 1 & 0 & -1 \end{bmatrix}, \begin{bmatrix} 1 & 0 & 1 \\ 0 & 1 & 0 \\ 0 & j & 0 \\ j & 0 & -j \end{bmatrix},$$

$$\begin{bmatrix} 1 & 0 & 1 \\ 0 & 1 & 0 \\ 0 & -1 & 0 \\ j & 0 & -j \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 0 & 1 & 0 \\ 1 & 0 & 1 \\ 1 & 0 & -1 \\ 0 & j & 0 \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 0 & 1 & 0 \\ 0 & -j & 0 \\ 1 & 0 & 1 \\ j & 0 & -j \end{bmatrix}, \begin{bmatrix} 1 & 0 & 1 \\ 0 & 1 & 0 \\ j & 0 & -j \\ 0 & -1 & 0 \end{bmatrix}, \begin{bmatrix} 1 & 0 & 1 \\ 1 & 0 & -1 \\ 0 & 1 & 0 \\ 0 & -j & 0 \end{bmatrix}$$

Rank-3 codebook set 6-2

$$\begin{bmatrix} 1 & 0 & 1 \\ 0 & 1 & 0 \\ j & 0 & -j \\ 0 & -1 & 0 \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 0 & -1 & 0 \\ 1 & 0 & 1 \\ 1 & 0 & -1 \end{bmatrix}, \begin{bmatrix} 0 & 1 & 0 \\ 0 & -j & 0 \\ 1 & 0 & 1 \\ 1 & 0 & -1 \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 0 & 1 & 0 \\ 1 & 0 & 1 \\ j & 0 & -j \\ 0 & j & 0 \end{bmatrix}, \begin{bmatrix} 1 & 0 & 1 \\ 0 & 1 & 0 \\ j & 0 & -j \\ 0 & j & 0 \end{bmatrix},$$

$$\begin{bmatrix} 0 & 1 & 0 \\ 0 & j & 0 \\ 1 & 0 & 1 \\ 1 & 0 & -1 \end{bmatrix}, \begin{bmatrix} 0 & 1 & 0 \\ 1 & 0 & 1 \\ 0 & j & 0 \\ 1 & 0 & -1 \end{bmatrix}, \begin{bmatrix} 1 & 0 & 1 \\ 0 & 1 & 0 \\ 0 & j & 0 \\ 1 & 0 & -1 \end{bmatrix}, \begin{bmatrix} 1 & 0 & 1 \\ j & 0 & -j \\ 0 & 1 & 0 \\ 0 & 1 & 0 \end{bmatrix}, \begin{bmatrix} 1 & 0 & 1 \\ 0 & 1 & 0 \\ 0 & 1 & 0 \\ 1 & 0 & -1 \end{bmatrix}, \begin{bmatrix} 0 & 1 & 0 \\ 1 & 0 & 1 \\ j & 0 & -j \\ 0 & 1 & 0 \end{bmatrix}, \begin{bmatrix} 1 & 0 & 1 \\ 1 & 0 & -1 \\ 0 & 1 & 0 \\ 0 & j & 0 \end{bmatrix}, \begin{bmatrix} 0 & 1 & 0 \\ 1 & 0 & 1 \\ j & 0 & -j \\ 0 & -1 & 0 \end{bmatrix}$$

Rank-3 codebook set 7-2

$$\begin{bmatrix} 0 & 1 & 0 \\ 0 & -1 & 0 \\ 1 & 0 & 1 \\ j & 0 & -j \end{bmatrix}, \begin{bmatrix} 1 & 0 & 1 \\ 0 & 1 & 0 \\ 1 & 0 & -1 \\ 0 & 1 & 0 \end{bmatrix}, \begin{bmatrix} 0 & 1 & 0 \\ 1 & 0 & 1 \\ j & 0 & -j \\ 0 & 1 & 0 \end{bmatrix}, \begin{bmatrix} 1 & 0 & 1 \\ 0 & 1 & 0 \\ 0 & j & 0 \\ 1 & 0 & -1 \end{bmatrix}, \begin{bmatrix} 1 & 0 & 1 \\ 1 & 0 & -1 \\ 0 & 1 & 0 \\ 0 & j & 0 \end{bmatrix}, \begin{bmatrix} 1 & 0 & 1 \\ j & 0 & -j \\ 0 & 1 & 0 \\ 0 & -j & 0 \end{bmatrix}, \begin{bmatrix} 1 & 0 & 1 \\ 1 & 0 & -1 \\ 0 & 1 & 0 \\ 0 & -1 & 0 \end{bmatrix}, \begin{bmatrix} 1 & 0 & 1 \\ 0 & 1 & 0 \\ 0 & 1 & 0 \\ j & 0 & -j \end{bmatrix},$$

$$\begin{bmatrix} 0 & 1 & 0 \\ 1 & 0 & 1 \\ 0 & j & 0 \\ j & 0 & -j \end{bmatrix}, \begin{bmatrix} 0 & 1 & 0 \\ 1 & 0 & 1 \\ 0 & 1 & 0 \\ j & 0 & -j \end{bmatrix}, \begin{bmatrix} 0 & 1 & 0 \\ 1 & 0 & 1 \\ 0 & -j & 0 \\ 1 & 0 & -1 \end{bmatrix}, \begin{bmatrix} 0 & 1 & 0 \\ 1 & 0 & 1 \\ 0 & -1 & 0 \\ 1 & 0 & -1 \end{bmatrix}, \begin{bmatrix} 0 & 1 & 0 \\ 1 & 0 & 1 \\ j & 0 & -j \\ 0 & -1 & 0 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ j & 0 & -j \\ 0 & -j & 0 \end{bmatrix}$$

TABLE 4-continued

Rank-3 codebook set 8-2

$$\begin{bmatrix} 0 & 1 & 0 \\ 0 & 1 & 0 \\ 1 & 0 & 1 \\ j & 0 & -j \end{bmatrix}, \begin{bmatrix} 0 & 1 & 0 \\ 1 & 0 & 1 \\ j & 0 & -j \\ 0 & -1 & 0 \end{bmatrix}, \begin{bmatrix} 1 & 0 & 1 \\ 1 & 0 & -1 \\ 0 & 1 & 0 \\ 0 & -j & 0 \end{bmatrix}, \begin{bmatrix} 1 & 0 & 1 \\ 0 & 1 & 0 \\ j & 0 & -j \\ 0 & 1 & 0 \end{bmatrix}, \begin{bmatrix} 0 & 1 & 0 \\ 0 & 1 & 0 \\ 1 & 0 & 1 \\ j & 0 & -j \end{bmatrix}, \begin{bmatrix} 1 & 0 & 1 \\ 0 & j & 0 \\ 0 & -1 & 0 \\ 1 & 0 & -1 \end{bmatrix}, \begin{bmatrix} 1 & 0 & 1 \\ 0 & 1 & 0 \\ 1 & 0 & -1 \\ 0 & -j & 0 \end{bmatrix}, \begin{bmatrix} 1 & 0 & 1 \\ j & 0 & -j \\ 0 & 1 & 0 \\ 0 & j & 0 \end{bmatrix},$$

$$\begin{bmatrix} 0 & 1 & 0 \\ 1 & 0 & 1 \\ 1 & 0 & -1 \\ 0 & j & 0 \end{bmatrix}, \begin{bmatrix} 0 & 1 & 0 \\ 1 & 0 & 1 \\ 0 & -j & 0 \\ j & 0 & -j \end{bmatrix}, \begin{bmatrix} 1 & 0 & 1 \\ j & 0 & -j \\ 0 & 1 & 0 \\ 0 & -1 & 0 \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 1 & 0 & 1 \\ 0 & 1 & 0 \\ 0 & -j & 0 \\ 1 & 0 & -1 \end{bmatrix}, \begin{bmatrix} 1 & 0 & 1 \\ 0 & 1 & 0 \\ 1 & 0 & -1 \\ 0 & j & 0 \end{bmatrix}, \begin{bmatrix} 1 & 0 & 1 \\ 0 & 1 & 0 \\ 0 & j & 0 \\ j & 0 & -j \end{bmatrix}$$

It should be noted that the row permutation and/or the column permutation may be carried out on all or some of the above precoding matrices shown in Table 4.

Rank 3—Second Embodiment

In one embodiment of the present invention, a method for constructing a codebook using 6 precoding matrix groups capable of maintaining good CM properties will hereinafter be described. The six 4Tx Rank-3 precoding matrix groups for maintaining good CM properties can be represented by the following equation 45.

[Equation 45]

$$\text{Group 1} \begin{bmatrix} 1 & 0 & 0 \\ 0 & 1 & 0 \\ 0 & 0 & 1 \\ X & 0 & 0 \end{bmatrix}, \text{Group 2} \begin{bmatrix} 0 & 1 & 0 \\ 1 & 0 & 0 \\ 0 & 0 & 1 \\ X & 0 & 0 \end{bmatrix},$$

$$\text{Group 3} \begin{bmatrix} 0 & 0 & 1 \\ 0 & 1 & 0 \\ 1 & 0 & 0 \\ X & 0 & 0 \end{bmatrix}, \text{Group 4} \begin{bmatrix} 1 & 0 & 0 \\ 0 & 0 & 1 \\ 0 & 1 & 0 \\ X & 0 & 0 \end{bmatrix},$$

$$\text{Group 5} \begin{bmatrix} 1 & 0 & 0 \\ X & 0 & 0 \\ 0 & 0 & 1 \\ 0 & 1 & 0 \end{bmatrix}, \text{Group 6} \begin{bmatrix} 1 & 0 & 0 \\ 0 & 1 & 0 \\ X & 0 & 0 \\ 0 & 0 & 1 \end{bmatrix}$$

where $$X \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

An example of the Rank-3 codebook including 24 precoding matrixes from 6 groups shown in Equation 45 is shown in the following table 5. In order to reduce complexity, in the example shown in Table 5, letters denoted by precoding matrix elements are restricted to 1, -j, -1, -j.

TABLE 5

$$\begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 1 & 0 & 0 \\ 0 & 1 & 0 \\ 0 & 0 & 1 \\ j & 0 & 0 \end{bmatrix}, \begin{bmatrix} 1 & 0 & 0 \\ 0 & 1 & 0 \\ 0 & 0 & 1 \\ -j & 0 & 0 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 1 & 0 & 0 \\ 0 & 0 & 1 \\ j & 0 & 0 \end{bmatrix}, \begin{bmatrix} 0 & 1 & 0 \\ 1 & 0 & 0 \\ 0 & 0 & 1 \\ -j & 0 & 0 \end{bmatrix},$$

$$\begin{bmatrix} 0 & 0 & 1 \\ 0 & 1 & 0 \\ 1 & 0 & 0 \\ 1 & 0 & 0 \end{bmatrix}, \begin{bmatrix} 0 & 0 & 1 \\ 0 & 1 & 0 \\ 1 & 0 & 0 \\ -1 & 0 & 0 \end{bmatrix}, \begin{bmatrix} 0 & 0 & 1 \\ 0 & 1 & 0 \\ 1 & 0 & 0 \\ j & 0 & 0 \end{bmatrix}, \begin{bmatrix} 0 & 0 & 1 \\ 0 & 1 & 0 \\ 1 & 0 & 0 \\ -j & 0 & 0 \end{bmatrix}, \begin{bmatrix} 1 & 0 & 0 \\ 0 & 0 & 1 \\ 0 & 1 & 0 \\ 1 & 0 & 0 \end{bmatrix}, \begin{bmatrix} 1 & 0 & 0 \\ 0 & 0 & 1 \\ 0 & 1 & 0 \\ -1 & 0 & 0 \end{bmatrix}, \begin{bmatrix} 1 & 0 & 0 \\ 0 & 0 & 1 \\ 0 & 1 & 0 \\ j & 0 & 0 \end{bmatrix}, \begin{bmatrix} 1 & 0 & 0 \\ 0 & 0 & 1 \\ 0 & 1 & 0 \\ -j & 0 & 0 \end{bmatrix},$$

$$\begin{bmatrix} 1 & 0 & 0 \\ 1 & 0 & 0 \\ 0 & 0 & 1 \\ 0 & 1 & 0 \end{bmatrix}, \begin{bmatrix} 1 & 0 & 0 \\ -1 & 0 & 0 \\ 0 & 0 & 1 \\ 0 & 1 & 0 \end{bmatrix}, \begin{bmatrix} 1 & 0 & 0 \\ j & 0 & 0 \\ 0 & 0 & 1 \\ 0 & 1 & 0 \end{bmatrix}, \begin{bmatrix} 1 & 0 & 0 \\ -j & 0 & 0 \\ 0 & 0 & 1 \\ 0 & 1 & 0 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ j & 0 & 0 \\ 0 & 0 & 1 \end{bmatrix}, \begin{bmatrix} 1 & 0 & 0 \\ 0 & 1 & 0 \\ -j & 0 & 0 \\ 0 & 0 & 1 \end{bmatrix}$$

For another example, the present invention proposes a method for utilizing the remaining groups other than a fourth group (Group 4) generated by applying column permutation to a first group (Group 1) among all groups shown in Equation 45. Generally, if three column vectors are represented by [c1, c2, c3], 5 column permutation matrices such as [c1, c3, c2], [c2, c1, c3], [c2, c3, c1], [c3, c2, c1], and [c3, c1, c2] can be generated, thus 6 matrices can be achieved.

The reason why the specific vector permutation matrix is not used as described above is that an encoded sequence is mapped to a specific column vector (or a specific layer) of the precoding matrix. It is assumed that two independently-encoded codewords in the above-mentioned precoding matrix groups are mapped to different layers as described below.

(1) A first codeword is mapped to a first layer.
(2) A second codeword is evenly distributed and mapped to second and third layers.

On the assumption that the above codeword-layer mapping is used, a specific column permutation does not generate a difference in average SINR between different codewords. For example, permutation from a column vector [c1, c2, c3] to another column vector [c1, c3, c2] may indicate that only a layer of a second codeword is swapped. In this way, the swapping between two layers to which the same second codeword is evenly distributed and mapped does not cause a variation in performance. For systems utilizing SIC receivers, correct decoding of a codeword given transmission of plurality of codewords leads to performance enhancements. This is because once a codeword is correctly decoded. So the correctly decoded codeword information can be used to cancel out spatial layer interference. In the case that transmission power of multiple antennas is uniformly normalized, some column vectors of the precoding matrix may have larger transmission power. In the case there is no layer shifting/permutation between all transmission layers, a specific layer corresponding to the column vector of the precoding matrix which column vectors has larger transmission power may have better performance. In case there is no layer shifting/permutation across all transmitted layers, in order to fully utilized SIC receivers the first layer, which the first codeword is solely mapped to is mapped to the precoding matrix column vector which has larger transmission power, and the second codeword which is mapped to second and third layer is mapped to precoding vector columns which has relatively smaller transmission power compared to the first layer. In the case above codeword-layer mapping is used, Precoding matrices as shown in [Equation 46] can be used to further enhance performance in case Successive Interference Cancellation (SIC) receiver algorithm is used.

$$\text{Group 1} \begin{bmatrix} 1 & 0 & 0 \\ 0 & 1 & 0 \\ 0 & 0 & 1 \\ X & 0 & 0 \end{bmatrix}, \text{Group 2} \begin{bmatrix} 0 & 1 & 0 \\ 1 & 0 & 0 \\ 0 & 0 & 1 \\ X & 0 & 0 \end{bmatrix},$$

$$\text{Group 3} \begin{bmatrix} 0 & 0 & 1 \\ 0 & 1 & 0 \\ 1 & 0 & 0 \\ X & 0 & 0 \end{bmatrix}, \text{Group 4} \begin{bmatrix} 1 & 0 & 0 \\ X & 0 & 0 \\ 0 & 0 & 1 \\ 0 & 1 & 0 \end{bmatrix},$$

$$\text{Group 5} \begin{bmatrix} 1 & 0 & 0 \\ 0 & 1 & 0 \\ X & 0 & 0 \\ 0 & 0 & 1 \end{bmatrix}$$

[Equation 46]

where $$X \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The following codebooks are exemplary 4Tx Rank-3 codebooks, each of which restricts letters contained in each of the above precoding matrices groups to 1, j, −1, and −j, and includes 20 precoding matrices.

TABLE 6

$$\begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 1 & 0 & 0 \\ 0 & 1 & 0 \\ 0 & 0 & 1 \\ j & 0 & 0 \end{bmatrix}, \begin{bmatrix} 1 & 0 & 0 \\ 0 & 1 & 0 \\ 0 & 0 & 1 \\ -j & 0 & 0 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 1 & 0 & 0 \\ 0 & 0 & 1 \\ j & 0 & 0 \end{bmatrix}, \begin{bmatrix} 0 & 1 & 0 \\ 1 & 0 & 0 \\ 0 & 0 & 1 \\ -j & 0 & 0 \end{bmatrix}$$

$$\begin{bmatrix} 0 & 0 & 1 \\ 0 & 1 & 0 \\ 1 & 0 & 0 \\ 1 & 0 & 0 \end{bmatrix}, \begin{bmatrix} 0 & 0 & 1 \\ 0 & 1 & 0 \\ 1 & 0 & 0 \\ -1 & 0 & 0 \end{bmatrix}, \begin{bmatrix} 0 & 0 & 1 \\ 0 & 1 & 0 \\ 1 & 0 & 0 \\ j & 0 & 0 \end{bmatrix}, \begin{bmatrix} 0 & 0 & 1 \\ 0 & 1 & 0 \\ 1 & 0 & 0 \\ -j & 0 & 0 \end{bmatrix}, \begin{bmatrix} 1 & 0 & 0 \\ 1 & 0 & 0 \\ 0 & 0 & 1 \\ 0 & 1 & 0 \end{bmatrix}, \begin{bmatrix} 1 & 0 & 0 \\ -1 & 0 & 0 \\ 0 & 0 & 1 \\ 0 & 1 & 0 \end{bmatrix}, \begin{bmatrix} 1 & 0 & 0 \\ j & 0 & 0 \\ 0 & 0 & 1 \\ 0 & 1 & 0 \end{bmatrix}, \begin{bmatrix} 1 & 0 & 0 \\ -j & 0 & 0 \\ 0 & 0 & 1 \\ 0 & 1 & 0 \end{bmatrix}$$

$$\begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ j & 0 & 0 \\ 0 & 0 & 1 \end{bmatrix}, \begin{bmatrix} 1 & 0 & 0 \\ 0 & 1 & 0 \\ -j & 0 & 0 \\ 0 & 0 & 1 \end{bmatrix}$$

In the meantime, in accordance with another embodiment of the present invention, the number of precoding matrices required for acquiring optimum performance from a high rank is less than the number of precoding matrices required for acquiring optimum performance from a low rank, so that the present invention can restrict the Rank-3 codebook to have below 24 precoding matrices. In this case, the present invention may evenly select the precoding matrices from 6 precoding matrix groups using the Norm 2.

TABLE 7

$$\begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 1 & 0 & 0 \\ 0 & 1 & 0 \\ 0 & 0 & 1 \\ j & 0 & 0 \end{bmatrix}, \begin{bmatrix} 1 & 0 & 0 \\ 0 & 1 & 0 \\ 0 & 0 & 1 \\ -j & 0 & 0 \end{bmatrix}$$

$$\begin{bmatrix} 1 & 0 & 0 \\ 0 & 1 & 0 \\ 0 & 0 & 1 \\ 0 & 1 & 0 \end{bmatrix}, \begin{bmatrix} 1 & 0 & 0 \\ 0 & 1 & 0 \\ 0 & 0 & 1 \\ 0 & -1 & 0 \end{bmatrix}, \begin{bmatrix} 1 & 0 & 0 \\ 0 & 1 & 0 \\ 0 & 0 & 1 \\ 0 & j & 0 \end{bmatrix}, \begin{bmatrix} 1 & 0 & 0 \\ 0 & 1 & 0 \\ 0 & 0 & 1 \\ 0 & -j & 0 \end{bmatrix}$$

$$\begin{bmatrix} 1 & 0 & 0 \\ 0 & 1 & 0 \\ 0 & 0 & 1 \\ 0 & 0 & 1 \end{bmatrix}, \begin{bmatrix} 1 & 0 & 0 \\ 0 & 1 & 0 \\ 0 & 0 & 1 \\ 0 & 0 & -1 \end{bmatrix}, \begin{bmatrix} 1 & 0 & 0 \\ 0 & 1 & 0 \\ 0 & 0 & 1 \\ 0 & 0 & j \end{bmatrix}, \begin{bmatrix} 1 & 0 & 0 \\ 0 & 1 & 0 \\ 0 & 0 & 1 \\ 0 & 0 & -j \end{bmatrix}$$

As can be seen from the example of Table 7, if $e^{-j\Theta}$ is multiplied by a specific column vector, column permutation in a precoding matrix has no influence upon improvement of performance, so that the number of precoding matrices contained in a codebook is limited to 12. Meanwhile, in accordance with one embodiment of the present invention, antenna permutation may be carried out to obtain antenna selection gain. This antenna permutation may also be implemented by row permutation of a precoding matrix contained in the above-mentioned codebook.

Rank 3—Third Embodiment

In the third embodiment of the present invention, it is assumed that the following 6 precoding matrix groups are considered as precoding matrices capable of maintaining good CM performance.

$$\text{Group 1} \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ 0 & 0 & 1 \\ 0 & X & 0 \end{bmatrix}, \begin{bmatrix} 0 & 0 & 1 \\ 0 & 1 & 0 \\ 1 & 0 & 0 \\ 0 & 0 & X \end{bmatrix} \quad \text{[Equation 47]}$$

$$\text{Group 2} \begin{bmatrix} 0 & 1 & 0 \\ 1 & 0 & 0 \\ 0 & 0 & 1 \\ X & 0 & 0 \end{bmatrix}, \begin{bmatrix} 1 & 0 & 0 \\ 0 & 1 & 0 \\ 0 & 0 & 1 \\ 0 & X & 0 \end{bmatrix}, \begin{bmatrix} 0 & 1 & 0 \\ 0 & 0 & 1 \\ 1 & 0 & 0 \\ 0 & 0 & X \end{bmatrix}$$

$$\text{Group 3} \begin{bmatrix} 0 & 0 & 1 \\ 0 & 1 & 0 \\ 1 & 0 & 0 \\ X & 0 & 0 \end{bmatrix}, \begin{bmatrix} 0 & 0 & 1 \\ 1 & 0 & 0 \\ 0 & 1 & 0 \\ 0 & X & 0 \end{bmatrix}, \begin{bmatrix} 1 & 0 & 0 \\ 0 & 1 & 0 \\ 0 & 0 & 1 \\ 0 & 0 & X \end{bmatrix}$$

$$\text{Group 4} \begin{bmatrix} 0 & 1 & 0 \\ 0 & 0 & 1 \\ 1 & 0 & 0 \\ 0 & X & 0 \end{bmatrix}, \begin{bmatrix} 0 & 0 & 1 \\ 1 & 0 & 0 \\ 0 & 1 & 0 \\ 0 & 0 & X \end{bmatrix}$$

$$\text{Group 5} \begin{bmatrix} 1 & 0 & 0 \\ X & 0 & 0 \\ 0 & 0 & 1 \\ 0 & 1 & 0 \end{bmatrix}, \begin{bmatrix} 0 & 1 & 0 \\ 0 & X & 0 \\ 0 & 0 & 1 \\ 1 & 0 & 0 \end{bmatrix}, \begin{bmatrix} 0 & 0 & 1 \\ 0 & 0 & X \\ 1 & 0 & 0 \\ 0 & 1 & 0 \end{bmatrix}$$

$$\text{Group 6} \begin{bmatrix} 1 & 0 & 0 \\ 0 & 1 & 0 \\ X & 0 & 0 \\ 0 & 0 & 1 \end{bmatrix}, \begin{bmatrix} 0 & 1 & 0 \\ 1 & 0 & 0 \\ 0 & X & 0 \\ 0 & 0 & 1 \end{bmatrix}, \begin{bmatrix} 0 & 0 & 1 \\ 0 & 1 & 0 \\ 0 & 0 & X \\ 1 & 0 & 0 \end{bmatrix}$$

where $$X \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

In case of a first group (Group 1) in Equation 47, it can be recognized that three permutation matrices are selected from [c1, c3, c2], [c2, c1, c3], [c2, c3, c1], [c3, c2, c1], and [c3, c1, c2]. In case of a fourth group (Group 4), it can be recognized that one constituent precoding matrix is excluded, because the excluded precoding matrix has already been included in a first group (Group 1). It is preferable that the third embodiment be utilized when a layer shift operation is not carried out. The third embodiment can implement a layer shift using a codebook including a precoding matrix set upon which column permutation is carried out. Thus, an information sequence may be mapped to all layers, so that an SINR difference between layers can be normalized.

The third embodiment can select a precoding matrix using the first norm (Norm 1) and the second norm (Norm 2).

Rank 3—Fourth Embodiment

The fourth embodiment considers the following three groups as precoding matrix groups for maintaining good CM properties.

$$G1 = \begin{bmatrix} 1 & 0 & a \\ X & 0 & b \\ 0 & 1 & c \\ 0 & Y & d \end{bmatrix}, G2 = \begin{bmatrix} 1 & 0 & a' \\ 0 & 1 & b' \\ X & 0 & c' \\ 0 & Y & d' \end{bmatrix}, G3 = \begin{bmatrix} 1 & 0 & a'' \\ 0 & 1 & b'' \\ 0 & Y & c'' \\ X & 0 & d'' \end{bmatrix} \quad \text{[Equation 48]}$$

where $$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The last vectors $$\begin{bmatrix} a \\ b \\ c \\ d \end{bmatrix}, \begin{bmatrix} a' \\ b' \\ c' \\ d' \end{bmatrix}, \begin{bmatrix} a'' \\ b'' \\ c'' \\ d'' \end{bmatrix}$$

among precoding matrix groups shown in Equation 48 may be different precoding matrices such as DFT-based precoding vectors/matrices or household-based precoding vectors/matrices. For example, an example of the last vectors may be a Rank-1 codebook of the 3GPP LTE system (Release 8 system). Preferably, in order to maintain orthogonal/partial unitary characteristics of the matrix $$\begin{bmatrix} 1 & 0 & a \\ X & 0 & b \\ 0 & 1 & c \\ 0 & Y & d \end{bmatrix},$$

the matrices $$\begin{bmatrix} 1 & a \\ X & b \end{bmatrix} \text{ and } \begin{bmatrix} 1 & c \\ Y & d \end{bmatrix}$$

must satisfy unitary characteristics. Similarly, matrices $$\begin{bmatrix} 1 & a' \\ X & c' \end{bmatrix} \text{ and } \begin{bmatrix} 1 & b' \\ Y & d' \end{bmatrix}$$

of the matrix $$\begin{bmatrix} 1 & 0 & a' \\ 0 & 1 & b' \\ X & 0 & c' \\ 0 & Y & d' \end{bmatrix}$$

and matrices $$\begin{bmatrix} 1 & a'' \\ X & d'' \end{bmatrix} \text{ and } \begin{bmatrix} 1 & b'' \\ Y & c'' \end{bmatrix}$$

of the matrix $$\begin{bmatrix} 1 & 0 & a'' \\ 0 & 1 & b'' \\ 0 & Y & c'' \\ X & 0 & d'' \end{bmatrix}$$

must satisfy unitary characteristics. This means that parameters must satisfy the following relationship.

In Group 1: $a=1, b=-X$, and $c=-d\cdot Y^*$

In Group 2: $a'=1, b'=-X$, and $c'=-d'\cdot Y^*$

In Group 3: $a''=1, b''=-X$, and $c''=-d''\cdot Y^*$ [Equation 49]

In this case, although a certain complex constant is multiplied by each column vector of a specific precoding matrix, this means that the multiplied results indicate the same precoding matrix, so that it is assumed that a, a', or a" is set to 1.

Preferably, the fourth embodiment may be applied to a case when layer permutation is executed. The layer permutation operation indicates that a specific information sequence is cyclically mapped and transmitted to all layers so that SINR performance differences of individual layers are normalized. If the same power is used in different layers, a data sequence of the last layer corresponding to the last column having no value of 0 has the highest power from the viewpoint of a precoding output signal.

In case layer permutation is not used and enhanced SIC receiver algorithm is used, layer which the first codeword is mapped to should preferably correspond to the precoding vector column which the transmission power is relatively larger than other precoding vector columns. In case of [Equation 48] the third column may have larger transmission power than others. For cases which the first column is mapped to the first layer, the second column is mapped to the second layer, and the third column is mapped to the third layer, [Equation 48a] may be used instead of [Equation 48]. This precoding matrix structure will allow enhanced performance in case no layer permutation is used and SIC receiver is used, due to the increased correct decoding probability of a entire codeword given a plurality of codeword transmission.

$$G1 = \begin{bmatrix} a & 0 & 1 \\ b & 0 & X \\ c & 1 & 0 \\ d & Y & 0 \end{bmatrix}, G2 = \begin{bmatrix} a' & 0 & 1 \\ b' & 1 & 0 \\ c' & 0 & X \\ d' & Y & 0 \end{bmatrix}, G3 = \begin{bmatrix} a'' & 0 & 1 \\ b'' & 1 & 0 \\ c'' & 0 & X \\ d'' & Y & 0 \end{bmatrix}$$ [Equation 48a]

where $$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

Rank 3—Fifth Embodiment

In the fifth embodiment, it is assumed that the following groups shown in Equation 50 are used as precoding matrix groups for maintaining good CM performance.

[Equation 50]

$$G1 = \left( \begin{bmatrix} 1 & 0 & a \\ X & 0 & b \\ 0 & 1 & c \\ 0 & Y & d \end{bmatrix} \begin{bmatrix} 0 & 1 & a \\ 0 & X & b \\ 1 & 0 & c \\ Y & 0 & d \end{bmatrix} \begin{bmatrix} a & 0 & 1 \\ b & 0 & X \\ c & 1 & 0 \\ d & Y & 0 \end{bmatrix} \right)$$

$$G2 = \left( \begin{bmatrix} 1 & 0 & a' \\ 0 & 1 & b' \\ X & 0 & c' \\ 0 & Y & d' \end{bmatrix} \begin{bmatrix} 0 & 1 & a' \\ 1 & 0 & b' \\ 0 & X & c' \\ Y & 0 & d' \end{bmatrix} \begin{bmatrix} a' & 0 & 1 \\ b' & 1 & 0 \\ c' & 0 & X \\ d' & Y & 0 \end{bmatrix} \right)$$

$$G3 = \left( \begin{bmatrix} 1 & 0 & a'' \\ 0 & 1 & b'' \\ 0 & Y & c'' \\ X & 0 & d'' \end{bmatrix} \begin{bmatrix} 0 & 1 & a'' \\ 1 & 0 & b'' \\ Y & 0 & c'' \\ 0 & X & d'' \end{bmatrix} \begin{bmatrix} a'' & 0 & 1 \\ b'' & 1 & 0 \\ c'' & Y & 0 \\ d'' & 0 & X \end{bmatrix} \right)$$

where $$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The precoding matrix groups shown in Equation 50 are composed of a plurality of precoding matrices acquired when row permutation or column permutation is carried out on the structure of the fourth embodiment. The column vectors $$\begin{bmatrix} a \\ b \\ c \\ d \end{bmatrix}, \begin{bmatrix} a' \\ b' \\ c' \\ d' \end{bmatrix}, \begin{bmatrix} a'' \\ b'' \\ c'' \\ d'' \end{bmatrix}$$

in the precoding matrix groups shown in Equation 50 may be different precoding matrices such as DFT-based precoding vectors/matrices or household-based precoding vectors/matrices. For example, an example of the above column vectors may be a Rank-1 codebook of the 3GPP LTE system (Release 8 system).

Similar to the fourth embodiment, in the fifth embodiment, it is preferable that precoding matrix vectors be orthogonal to each other and elements other than a first value of 0 in all column vectors of each precoding matrix group be set to 1.

A codebook according to the fifth embodiment includes a precoding matrix generated when column permutation is carried out on the precoding matrices of the fourth embodiment. As described above, the precoding matrix having a column vector [c1, c2, c3] may have 6 column permutation precoding matrices such as [c1, c3, c2], [c2, c1, c3], [c2, c3, c1], [c3, c2, c1], [c3, c1, c2] and [c3, c1, c2].

The reason why a specific column permutation is not included is that second and third column permutations of the precoding matrix in a system in which a first codeword is mapped to a first layer and a second codeword is distributed and mapped to second and third layers do not cause a difference in performance.

Rank 3—Sixth Embodiment

A precoding matrix according to the sixth embodiment is configured in a format acquired when row permutation is carried out on a precoding matrix of the codebook shown in the fourth embodiment, because the precoding matrix of the sixth embodiment can be acquired by antenna switching.

The precoding matrix groups according to the sixth embodiment can be represented by the following equation 51.

$$G1 = \left( \begin{bmatrix} 1 & 0 & a \\ X & 0 & b \\ 0 & 1 & c \\ 0 & Y & d \end{bmatrix} \begin{bmatrix} X & 0 & b \\ 1 & 0 & a \\ 0 & 1 & c \\ 0 & Y & d \end{bmatrix} \begin{bmatrix} 0 & 1 & c \\ X & 0 & b \\ 1 & 0 & a \\ 0 & Y & d \end{bmatrix} \begin{bmatrix} 0 & Y & d \\ X & 0 & b \\ 0 & 1 & c \\ 1 & 0 & a \end{bmatrix} \right.$$

$$\left. \begin{bmatrix} 1 & 0 & a \\ 0 & 1 & c \\ X & 0 & b \\ 0 & Y & d \end{bmatrix} \begin{bmatrix} 1 & 0 & a \\ 0 & Y & d \\ 0 & 1 & c \\ X & 0 & b \end{bmatrix} \begin{bmatrix} 1 & 0 & a \\ X & 0 & b \\ 0 & Y & d \\ 0 & 1 & c \end{bmatrix} \right)$$

[Equation 51]

$$G2 = \left( \begin{bmatrix} 1 & 0 & a' \\ 0 & 1 & b' \\ X & 0 & c' \\ 0 & Y & d' \end{bmatrix} \begin{bmatrix} 0 & 1 & b' \\ 1 & 0 & a' \\ X & 0 & c' \\ 0 & Y & d' \end{bmatrix} \begin{bmatrix} X & 0 & c' \\ 0 & 1 & b' \\ 1 & 0 & a' \\ 0 & Y & d' \end{bmatrix} \begin{bmatrix} 0 & Y & d' \\ 0 & 1 & b' \\ X & 0 & c' \\ 1 & 0 & a' \end{bmatrix} \right.$$

$$\left. \begin{bmatrix} 1 & 0 & a' \\ X & 0 & c' \\ 0 & 1 & b' \\ 0 & Y & d' \end{bmatrix} \begin{bmatrix} 1 & 0 & a' \\ 0 & Y & d' \\ X & 0 & c' \\ 0 & 1 & b' \end{bmatrix} \begin{bmatrix} 1 & 0 & a' \\ 0 & 1 & b' \\ 0 & Y & d' \\ X & 0 & c' \end{bmatrix} \right)$$

$$G3 = \left( \begin{bmatrix} 1 & 0 & a'' \\ 0 & 1 & b'' \\ 0 & Y & c'' \\ X & 0 & d'' \end{bmatrix} \begin{bmatrix} 0 & 1 & b'' \\ 1 & 0 & a'' \\ 0 & Y & c'' \\ X & 0 & d'' \end{bmatrix} \begin{bmatrix} 0 & Y & c'' \\ 0 & 1 & b'' \\ 1 & 0 & a'' \\ X & 0 & d'' \end{bmatrix} \begin{bmatrix} X & 0 & d'' \\ 0 & 1 & b'' \\ 0 & Y & c'' \\ 1 & 0 & a'' \end{bmatrix} \right.$$

$$\left. \begin{bmatrix} 1 & 0 & a'' \\ 0 & Y & c'' \\ 0 & 1 & b'' \\ X & 0 & d'' \end{bmatrix} \begin{bmatrix} 1 & 0 & a'' \\ X & 0 & d'' \\ 0 & Y & c'' \\ 0 & 1 & b'' \end{bmatrix} \begin{bmatrix} 1 & 0 & a'' \\ 0 & 1 & b'' \\ X & 0 & d'' \\ 0 & Y & c'' \end{bmatrix} \right)$$

$$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

The column vectors $$\begin{bmatrix} a \\ b \\ c \\ d \end{bmatrix}, \begin{bmatrix} a' \\ b' \\ c' \\ d' \end{bmatrix}, \begin{bmatrix} a'' \\ b'' \\ c'' \\ d'' \end{bmatrix}$$

or their row permutation formats may be different precoding matrices such as DFT-based precoding vectors/matrices or household-based precoding vectors/matrices. For example, an example of the above column vectors may be a Rank-1 codebook of the 3GPP LTE system (Release 8 system).

Similar to the fourth embodiment, in the sixth embodiment, it is preferable that column vectors of the precoding matrix be orthogonal to each other and elements a, a', or a" are set to 1. An example of the codebook according to the sixth embodiment can be represented by the following equation 52.

$$G1' = \begin{bmatrix} 1 & 0 & 1 \\ X & 0 & -X \\ 0 & 1 & c \\ 0 & Y & d \end{bmatrix} \begin{bmatrix} X & 0 & -X \\ 1 & 0 & 1 \\ 0 & 1 & c \\ 0 & Y & d \end{bmatrix} \begin{bmatrix} 0 & 1 & c \\ X & 0 & -X \\ 1 & 0 & 1 \\ 0 & Y & d \end{bmatrix}$$

[Equation 52]

$$\begin{bmatrix} 0 & Y & d \\ X & 0 & -X \\ 0 & 1 & c \\ 1 & 0 & 1 \end{bmatrix} \begin{bmatrix} 1 & 0 & 1 \\ 0 & 1 & c \\ X & 0 & -X \\ 0 & Y & d \end{bmatrix} \begin{bmatrix} 1 & 0 & 1 \\ 0 & Y & d \\ 0 & 1 & c \\ X & 0 & -X \end{bmatrix}$$

$$\begin{bmatrix} 1 & 0 & 1 \\ X & 0 & -X \\ 0 & Y & d \\ 0 & 1 & c \end{bmatrix}$$

$$G2' = \begin{bmatrix} 1 & 0 & 1 \\ 0 & 1 & b' \\ X & 0 & -X \\ 0 & Y & d' \end{bmatrix} \begin{bmatrix} 0 & 1 & b' \\ 1 & 0 & 1 \\ X & 0 & -X \\ 0 & Y & d' \end{bmatrix} \begin{bmatrix} X & 0 & -X \\ 0 & 1 & b' \\ 1 & 0 & 1 \\ 0 & Y & d' \end{bmatrix}$$

$$\begin{bmatrix} 0 & Y & d' \\ 0 & 1 & b' \\ X & 0 & -X \\ 1 & 0 & 1 \end{bmatrix} \begin{bmatrix} 1 & 0 & 1 \\ X & 0 & -X \\ 0 & 1 & b' \\ 0 & Y & d' \end{bmatrix} \begin{bmatrix} 1 & 0 & 1 \\ 0 & Y & d' \\ X & 0 & -X \\ 0 & 1 & b' \end{bmatrix}$$

$$\begin{bmatrix} 1 & 0 & 1 \\ 0 & 1 & b' \\ 0 & Y & d' \\ X & 0 & -X \end{bmatrix}$$

$$G3' = \begin{bmatrix} 1 & 0 & 1 \\ 0 & 1 & b'' \\ 0 & Y & c'' \\ X & 0 & -X \end{bmatrix} \begin{bmatrix} 0 & 1 & b'' \\ 1 & 0 & 1 \\ 0 & Y & c'' \\ X & 0 & -X \end{bmatrix} \begin{bmatrix} 0 & Y & c'' \\ 0 & 1 & b'' \\ 1 & 0 & 1 \\ X & 0 & -X \end{bmatrix}$$

$$\begin{bmatrix} X & 0 & -X \\ 0 & 1 & b'' \\ 0 & Y & c'' \\ 1 & 0 & 1 \end{bmatrix} \begin{bmatrix} 1 & 0 & 1 \\ 0 & Y & c'' \\ 0 & 1 & b'' \\ X & 0 & -X \end{bmatrix} \begin{bmatrix} 1 & 0 & 1 \\ 0 & 1 & b'' \\ X & 0 & -X \\ 0 & Y & c'' \end{bmatrix}$$

$$\begin{bmatrix} 1 & 0 & 1 \\ 0 & 1 & b'' \\ X & 0 & -X \\ 0 & Y & c'' \end{bmatrix}$$

where $$X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

Rank 3—Seventh Embodiment

A codebook according to the seventh embodiment is configured in a format of row permutation of the codebook shown in the fifth embodiment. An example of the codebook according to the seventh embodiment can be represented by the following equation 53.

[Equation 53]

$$G1 = \left( \begin{bmatrix} 1 & 0 & a \\ X & 0 & b \\ 0 & 1 & c \\ 0 & Y & d \end{bmatrix}, \begin{bmatrix} X & 0 & b \\ 1 & 0 & a \\ 0 & 1 & c \\ 0 & Y & d \end{bmatrix}, \begin{bmatrix} 0 & 1 & c \\ X & 0 & b \\ 1 & 0 & a \\ 0 & Y & d \end{bmatrix}, \begin{bmatrix} 0 & Y & d \\ X & 0 & b \\ 0 & 1 & c \\ 1 & 0 & a \end{bmatrix}, \begin{bmatrix} 1 & 0 & a \\ 0 & 1 & c \\ X & 0 & b \\ 0 & Y & d \end{bmatrix}, \begin{bmatrix} 1 & 0 & a \\ 0 & Y & d \\ 0 & 1 & c \\ X & 0 & b \end{bmatrix}, \begin{bmatrix} 1 & 0 & a \\ X & 0 & b \\ 0 & Y & d \\ 0 & 1 & c \end{bmatrix}, \right.$$
$$\begin{bmatrix} 0 & 1 & a \\ 0 & X & b \\ 1 & 0 & c \\ Y & 0 & d \end{bmatrix}, \begin{bmatrix} 0 & X & b \\ 0 & 1 & a \\ 1 & 0 & c \\ Y & 0 & d \end{bmatrix}, \begin{bmatrix} 1 & 0 & c \\ 0 & X & b \\ 0 & 1 & a \\ Y & 0 & d \end{bmatrix}, \begin{bmatrix} Y & 0 & d \\ 0 & X & b \\ 1 & 0 & c \\ 0 & 1 & a \end{bmatrix}, \begin{bmatrix} 0 & 1 & a \\ 1 & 0 & c \\ 0 & X & b \\ Y & 0 & d \end{bmatrix}, \begin{bmatrix} 0 & 1 & a \\ Y & 0 & d \\ 1 & 0 & c \\ 0 & X & b \end{bmatrix}, \begin{bmatrix} 0 & 1 & a \\ 0 & X & b \\ Y & 0 & d \\ 1 & 0 & c \end{bmatrix},$$
$$\left. \begin{bmatrix} a & 0 & 1 \\ b & 0 & X \\ c & 1 & 0 \\ d & Y & 0 \end{bmatrix}, \begin{bmatrix} b & 0 & X \\ a & 0 & 1 \\ c & 1 & 0 \\ d & Y & 0 \end{bmatrix}, \begin{bmatrix} c & 1 & 0 \\ b & 0 & X \\ a & 0 & 1 \\ d & Y & 0 \end{bmatrix}, \begin{bmatrix} d & Y & 0 \\ b & 0 & X \\ c & 1 & 0 \\ a & 0 & 1 \end{bmatrix}, \begin{bmatrix} a & 0 & 1 \\ c & 1 & 0 \\ b & 0 & X \\ d & Y & 0 \end{bmatrix}, \begin{bmatrix} a & 0 & 1 \\ d & Y & 0 \\ c & 1 & 0 \\ b & 0 & X \end{bmatrix}, \begin{bmatrix} a & 0 & 1 \\ b & 0 & X \\ d & Y & 0 \\ c & 1 & 0 \end{bmatrix} \right)$$

$$G2 = \left( \begin{bmatrix} 1 & 0 & a' \\ 0 & 1 & b' \\ X & 0 & c' \\ 0 & Y & d' \end{bmatrix}, \begin{bmatrix} 0 & 1 & b' \\ 1 & 0 & a' \\ X & 0 & c' \\ 0 & Y & d' \end{bmatrix}, \begin{bmatrix} X & 0 & c' \\ 0 & 1 & b' \\ 1 & 0 & a' \\ 0 & Y & d' \end{bmatrix}, \begin{bmatrix} 0 & Y & d' \\ 0 & 1 & b' \\ X & 0 & c' \\ 1 & 0 & a' \end{bmatrix}, \begin{bmatrix} 1 & 0 & a' \\ X & 0 & c' \\ 0 & 1 & b' \\ 0 & Y & d' \end{bmatrix}, \begin{bmatrix} 1 & 0 & a' \\ 0 & Y & d' \\ X & 0 & c' \\ 0 & 1 & b' \end{bmatrix}, \begin{bmatrix} 1 & 0 & a' \\ 0 & 1 & b' \\ 0 & Y & d' \\ X & 0 & c' \end{bmatrix}, \right.$$
$$\begin{bmatrix} 0 & 1 & a' \\ 1 & 0 & b' \\ 0 & X & c' \\ Y & 0 & d' \end{bmatrix}, \begin{bmatrix} 1 & 0 & b' \\ 0 & 1 & a' \\ 0 & X & c' \\ Y & 0 & d' \end{bmatrix}, \begin{bmatrix} 0 & X & c' \\ 1 & 0 & b' \\ 0 & 1 & a' \\ Y & 0 & d' \end{bmatrix}, \begin{bmatrix} Y & 0 & d' \\ 1 & 0 & b' \\ 0 & X & c' \\ 0 & 1 & a' \end{bmatrix}, \begin{bmatrix} 0 & 1 & a' \\ 0 & X & c' \\ 1 & 0 & b' \\ Y & 0 & d' \end{bmatrix}, \begin{bmatrix} 0 & 1 & a' \\ Y & 0 & d' \\ 0 & X & c' \\ 1 & 0 & b' \end{bmatrix}, \begin{bmatrix} 0 & 1 & a' \\ 1 & 0 & b' \\ Y & 0 & d' \\ 0 & X & c' \end{bmatrix},$$
$$\left. \begin{bmatrix} a' & 0 & 1 \\ b' & 1 & 0 \\ c' & 0 & X \\ d' & Y & 0 \end{bmatrix}, \begin{bmatrix} b' & 1 & 0 \\ a' & 0 & 1 \\ c' & 0 & X \\ d' & Y & 0 \end{bmatrix}, \begin{bmatrix} c' & 0 & X \\ b' & 1 & 0 \\ a' & 0 & 1 \\ d' & Y & 0 \end{bmatrix}, \begin{bmatrix} d' & Y & 0 \\ b' & 1 & 0 \\ c' & 0 & X \\ a' & 0 & 1 \end{bmatrix}, \begin{bmatrix} a' & 0 & 1 \\ c' & 0 & X \\ b' & 1 & 0 \\ d' & Y & 0 \end{bmatrix}, \begin{bmatrix} a' & 0 & 1 \\ d' & Y & 0 \\ c' & 0 & X \\ b' & 1 & 0 \end{bmatrix}, \begin{bmatrix} a' & 0 & 1 \\ b' & 1 & 0 \\ d' & Y & 0 \\ c' & 0 & X \end{bmatrix} \right)$$

$$G3 = \left( \begin{bmatrix} 1 & 0 & a'' \\ 0 & 1 & b'' \\ 0 & Y & c'' \\ X & 0 & d'' \end{bmatrix}, \begin{bmatrix} 0 & 1 & b'' \\ 1 & 0 & a'' \\ 0 & Y & c'' \\ X & 0 & d'' \end{bmatrix}, \begin{bmatrix} 0 & X & c'' \\ 0 & 1 & b'' \\ 1 & 0 & a'' \\ X & 0 & d'' \end{bmatrix}, \begin{bmatrix} X & 0 & d'' \\ 0 & 1 & b'' \\ 0 & Y & c'' \\ 1 & 0 & a'' \end{bmatrix}, \begin{bmatrix} 1 & 0 & a'' \\ 0 & Y & c'' \\ 0 & 1 & b'' \\ X & 0 & d'' \end{bmatrix}, \begin{bmatrix} 1 & 0 & a'' \\ X & 0 & d'' \\ 0 & Y & c'' \\ 0 & 1 & b'' \end{bmatrix}, \begin{bmatrix} 1 & 0 & a'' \\ 0 & 1 & b'' \\ X & 0 & d'' \\ 0 & Y & c'' \end{bmatrix}, \right.$$
$$\begin{bmatrix} 0 & 1 & a'' \\ 1 & 0 & b'' \\ Y & 0 & c'' \\ 0 & X & d'' \end{bmatrix}, \begin{bmatrix} 1 & 0 & b'' \\ 0 & 1 & a'' \\ Y & 0 & c'' \\ 0 & X & d'' \end{bmatrix}, \begin{bmatrix} Y & 0 & c'' \\ 1 & 0 & b'' \\ 0 & 1 & a'' \\ 0 & X & d'' \end{bmatrix}, \begin{bmatrix} 0 & X & d'' \\ 1 & 0 & b'' \\ Y & 0 & c'' \\ 0 & 1 & a'' \end{bmatrix}, \begin{bmatrix} 0 & 1 & a'' \\ Y & 0 & c'' \\ 1 & 0 & b'' \\ 0 & X & d'' \end{bmatrix}, \begin{bmatrix} 0 & 1 & a'' \\ 0 & X & d'' \\ Y & 0 & c'' \\ 1 & 0 & b'' \end{bmatrix}, \begin{bmatrix} 0 & 1 & a'' \\ 1 & 0 & b'' \\ 0 & X & d'' \\ Y & 0 & c'' \end{bmatrix},$$
$$\left. \begin{bmatrix} a'' & 0 & 1 \\ b'' & 1 & 0 \\ c'' & Y & 0 \\ d'' & 0 & X \end{bmatrix}, \begin{bmatrix} b'' & 1 & 0 \\ a'' & 0 & 1 \\ c'' & Y & 0 \\ d'' & 0 & X \end{bmatrix}, \begin{bmatrix} c'' & Y & 0 \\ b'' & 1 & 0 \\ a'' & 0 & 1 \\ d'' & 0 & X \end{bmatrix}, \begin{bmatrix} d'' & 0 & X \\ b'' & 1 & 0 \\ c'' & Y & 0 \\ a'' & 0 & 1 \end{bmatrix}, \begin{bmatrix} a'' & 0 & 1 \\ c'' & Y & 0 \\ b'' & 1 & 0 \\ d'' & 0 & X \end{bmatrix}, \begin{bmatrix} a'' & 0 & 1 \\ d'' & 0 & X \\ c'' & Y & 0 \\ b'' & 1 & 0 \end{bmatrix}, \begin{bmatrix} a'' & 0 & 1 \\ b'' & 1 & 0 \\ d'' & 0 & X \\ c'' & Y & 0 \end{bmatrix} \right)$$

where $X, Y \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$ The column vectors $$\begin{bmatrix} a \\ b \\ c \\ d \end{bmatrix}, \begin{bmatrix} a' \\ b' \\ c' \\ d' \end{bmatrix}, \begin{bmatrix} a'' \\ b'' \\ c'' \\ d'' \end{bmatrix}$$

or their row permutation formats may be different precoding matrices such as DFT-based precoding vectors/matrices or household-based precoding vectors/matrices. For example, an example of the above column vectors may be a Rank-1 codebook of the 3GPP LTE system (Release 8 system).

Similar to the fourth embodiment, in the seventh embodiment, it is preferable that column vectors of the precoding matrix be orthogonal to each other and elements a, a', or a" are set to 1. It is preferable that the codebook according to this embodiment be used when antenna permutation is not carried out, because the antenna permutation effect can be achieved by the precoding matrix to which row permutation is carried out when using the codebook of the seventh embodiment.

An example of the codebook according to the seventh embodiment can be represented by the following equation 54.

$$G1 = \left(\begin{bmatrix} 1 & 0 & 1 \\ X & 0 & -X \\ 0 & 1 & c \\ 0 & Y & d \end{bmatrix}\begin{bmatrix} X & 0 & -X \\ 1 & 0 & 1 \\ 0 & 1 & c \\ 0 & Y & d \end{bmatrix}\begin{bmatrix} 0 & 1 & c \\ X & 0 & -X \\ 1 & 0 & 1 \\ 0 & Y & d \end{bmatrix}\begin{bmatrix} 0 & Y & d \\ X & 0 & -X \\ 0 & 1 & c \\ 1 & 0 & 1 \end{bmatrix}\begin{bmatrix} 1 & 0 & 1 \\ 0 & 1 & c \\ X & 0 & -X \\ 0 & Y & d \end{bmatrix}\begin{bmatrix} 1 & 0 & 1 \\ 0 & Y & d \\ 0 & 1 & c \\ X & 0 & -X \end{bmatrix}\begin{bmatrix} 1 & 0 & 1 \\ X & 0 & -X \\ 0 & Y & d \\ 0 & 1 & c \end{bmatrix}\right.$$
$$\begin{bmatrix} 0 & 1 & 1 \\ 0 & X & -X \\ 1 & 0 & c \\ Y & 0 & d \end{bmatrix}\begin{bmatrix} 0 & X & -X \\ 0 & 1 & 1 \\ 1 & 0 & c \\ Y & 0 & d \end{bmatrix}\begin{bmatrix} 1 & 0 & c \\ 0 & X & -X \\ 0 & 1 & 1 \\ Y & 0 & d \end{bmatrix}\begin{bmatrix} Y & 0 & d \\ 0 & X & -X \\ 1 & 0 & c \\ 0 & 1 & 1 \end{bmatrix}\begin{bmatrix} 0 & 1 & 1 \\ 1 & 0 & c \\ 0 & X & -X \\ Y & 0 & d \end{bmatrix}\begin{bmatrix} 0 & 1 & 1 \\ Y & 0 & d \\ 1 & 0 & c \\ 0 & X & -X \end{bmatrix}\begin{bmatrix} 0 & 1 & 1 \\ 0 & X & -X \\ Y & 0 & d \\ 1 & 0 & c \end{bmatrix}$$
$$\begin{bmatrix} 1 & 0 & 1 \\ -X & 0 & X \\ c & 1 & 0 \\ d & Y & 0 \end{bmatrix}\begin{bmatrix} -X & 0 & X \\ 1 & 0 & 1 \\ c & 1 & 0 \\ d & Y & 0 \end{bmatrix}\begin{bmatrix} c & 1 & 0 \\ -X & 0 & X \\ 1 & 0 & 1 \\ d & Y & 0 \end{bmatrix}\begin{bmatrix} d & Y & 0 \\ -X & 0 & X \\ c & 1 & 0 \\ 1 & 0 & 1 \end{bmatrix}\begin{bmatrix} 1 & 0 & 1 \\ c & 1 & 0 \\ -X & 0 & X \\ d & Y & 0 \end{bmatrix}\begin{bmatrix} 1 & 0 & 1 \\ d & Y & 0 \\ c & 1 & 0 \\ -X & 0 & X \end{bmatrix}\left.\begin{bmatrix} 1 & 0 & 1 \\ -X & 0 & X \\ d & Y & 0 \\ c & 1 & 0 \end{bmatrix}\right)$$

[Equation 54]

$$G2 = \left(\begin{bmatrix} 1 & 0 & 1 \\ 0 & 1 & b' \\ X & 0 & -X \\ 0 & Y & d' \end{bmatrix}\begin{bmatrix} 0 & 1 & b' \\ 1 & 0 & 1 \\ X & 0 & -X \\ 0 & Y & d' \end{bmatrix}\begin{bmatrix} X & 0 & -X \\ 0 & 1 & b' \\ 1 & 0 & 1 \\ 0 & Y & d' \end{bmatrix}\begin{bmatrix} 0 & Y & d' \\ 0 & 1 & b' \\ X & 0 & -X \\ 1 & 0 & 1 \end{bmatrix}\begin{bmatrix} 1 & 0 & 1 \\ X & 0 & -X \\ 0 & 1 & b' \\ 0 & Y & d' \end{bmatrix}\begin{bmatrix} 1 & 0 & 1 \\ 0 & Y & d' \\ X & 0 & -X \\ 0 & 1 & b' \end{bmatrix}\begin{bmatrix} 1 & 0 & 1 \\ 0 & 1 & b' \\ 0 & Y & d' \\ X & 0 & -X \end{bmatrix}\right.$$
$$\begin{bmatrix} 0 & 1 & 1 \\ 1 & 0 & b' \\ 0 & X & -X \\ Y & 0 & d' \end{bmatrix}\begin{bmatrix} 1 & 0 & b' \\ 0 & 1 & 1 \\ 0 & X & -X \\ Y & 0 & d' \end{bmatrix}\begin{bmatrix} 0 & X & -X \\ 1 & 0 & b' \\ 0 & 1 & 1 \\ Y & 0 & d' \end{bmatrix}\begin{bmatrix} Y & 0 & d' \\ 1 & 0 & b' \\ 0 & X & -X \\ 0 & 1 & 1 \end{bmatrix}\begin{bmatrix} 0 & 1 & 1 \\ 0 & X & -X \\ 1 & 0 & b' \\ Y & 0 & d' \end{bmatrix}\begin{bmatrix} 0 & 1 & 1 \\ Y & 0 & d' \\ 0 & X & -X \\ 1 & 0 & b' \end{bmatrix}\begin{bmatrix} 0 & 1 & 1 \\ 1 & 0 & b' \\ Y & 0 & d' \\ 0 & X & -X \end{bmatrix}$$
$$\begin{bmatrix} 1 & 0 & 1 \\ b' & 1 & 0 \\ -X & 0 & X \\ d' & Y & 0 \end{bmatrix}\begin{bmatrix} b' & 1 & 0 \\ 1 & 0 & 1 \\ -X & 0 & X \\ d' & Y & 0 \end{bmatrix}\begin{bmatrix} -X & 0 & X \\ b' & 1 & 0 \\ 1 & 0 & 1 \\ d' & Y & 0 \end{bmatrix}\begin{bmatrix} d' & Y & 0 \\ b' & 1 & 0 \\ -X & 0 & X \\ 1 & 0 & 1 \end{bmatrix}\begin{bmatrix} 1 & 0 & 1 \\ -X & 0 & X \\ b' & 1 & 0 \\ d' & Y & 0 \end{bmatrix}\begin{bmatrix} 1 & 0 & 1 \\ d' & Y & 0 \\ -X & 0 & X \\ b' & 1 & 0 \end{bmatrix}\left.\begin{bmatrix} 1 & 0 & 1 \\ b' & 1 & 0 \\ d' & Y & 0 \\ -X & 0 & X \end{bmatrix}\right)$$

$$G3 = \left(\begin{bmatrix} 1 & 0 & 1 \\ 0 & 1 & b'' \\ 0 & Y & c'' \\ X & 0 & -X \end{bmatrix}\begin{bmatrix} 0 & 1 & b'' \\ 1 & 0 & 1 \\ 0 & Y & c'' \\ X & 0 & -X \end{bmatrix}\begin{bmatrix} 0 & Y & c'' \\ 0 & 1 & b'' \\ 1 & 0 & 1 \\ X & 0 & -X \end{bmatrix}\begin{bmatrix} X & 0 & -X \\ 0 & 1 & b'' \\ 0 & Y & c'' \\ 1 & 0 & 1 \end{bmatrix}\begin{bmatrix} 1 & 0 & 1 \\ 0 & Y & c'' \\ 0 & 1 & b'' \\ X & 0 & -X \end{bmatrix}\begin{bmatrix} 1 & 0 & 1 \\ X & 0 & -X \\ 0 & Y & c'' \\ 0 & 1 & b'' \end{bmatrix}\begin{bmatrix} 1 & 0 & 1 \\ 0 & 1 & b'' \\ X & 0 & -X \\ 0 & Y & c'' \end{bmatrix}\right.$$
$$\begin{bmatrix} 0 & 1 & 1 \\ 1 & 0 & b'' \\ Y & 0 & c'' \\ 0 & X & -X \end{bmatrix}\begin{bmatrix} 1 & 0 & b'' \\ 0 & 1 & 1 \\ Y & 0 & c'' \\ 0 & X & -X \end{bmatrix}\begin{bmatrix} Y & 0 & c'' \\ 1 & 0 & b'' \\ 0 & 1 & 1 \\ 0 & X & -X \end{bmatrix}\begin{bmatrix} 0 & X & d'' \\ 1 & 0 & b'' \\ Y & 0 & c'' \\ 0 & 1 & 1 \end{bmatrix}\begin{bmatrix} 0 & 1 & 1 \\ Y & 0 & c'' \\ 1 & 0 & b'' \\ 0 & X & -X \end{bmatrix}\begin{bmatrix} 0 & 1 & 1 \\ 0 & X & -X \\ Y & 0 & c'' \\ 1 & 0 & b'' \end{bmatrix}\begin{bmatrix} 0 & 1 & 1 \\ 1 & 0 & b'' \\ 0 & X & -X \\ Y & 0 & c'' \end{bmatrix}$$
$$\begin{bmatrix} 1 & 0 & 1 \\ b'' & 1 & 0 \\ c'' & Y & 0 \\ -X & 0 & X \end{bmatrix}\begin{bmatrix} b'' & 1 & 0 \\ 1 & 0 & 1 \\ c'' & Y & 0 \\ -X & 0 & X \end{bmatrix}\begin{bmatrix} c'' & Y & 0 \\ b'' & 1 & 0 \\ 1 & 0 & 1 \\ -X & 0 & X \end{bmatrix}\begin{bmatrix} -X & 0 & X \\ b'' & 1 & 0 \\ c'' & Y & 0 \\ 1 & 0 & 1 \end{bmatrix}\begin{bmatrix} 1 & 0 & 1 \\ c'' & Y & 0 \\ b'' & 1 & 0 \\ -X & 0 & X \end{bmatrix}\begin{bmatrix} 1 & 0 & 1 \\ -X & 0 & X \\ c'' & Y & 0 \\ b'' & 1 & 0 \end{bmatrix}\left.\begin{bmatrix} 1 & 0 & 1 \\ b'' & 1 & 0 \\ -X & 0 & X \\ c'' & Y & 0 \end{bmatrix}\right)$$

where $X, Y \in \left\{1, \frac{1+j}{\sqrt{2}}, j, \frac{1-j}{\sqrt{2}}, -1, \frac{-1-j}{\sqrt{2}}, -j, \frac{-1+j}{\sqrt{2}}\right\}$ Reference for Selecting Additional Precoding Matrix In addition to the Norm 1 and the Norm 2, this embodiment is designed to consider another norm. In this norm, elements denoted by letters contained in each precoding matrix group are not selected from among eight values, but are limited to 1, j, −1 and −j, thus reducing the number of precoding matrices contained in a codebook.

In accordance with this embodiment, a codebook set including 16 precoding matrices is considered. For example, Rank 1 DFT vectors about 4Tx antennas can be represented as follows.

N×N DFT matrix (or Fourier Matrix) $F_N$ based on a given component, such as $F_N = e^{-j \cdot 2\pi/N}$ normalized to $1/\sqrt{N}$ can be represented by the following equation 55.

$$F_N = \begin{bmatrix} 1 & 1 & 1 & \cdots & 1 \\ 1 & F_N^1 & F_N^2 & \cdots & F_N^{N-1} \\ \vdots & \vdots & \vdots & \cdots & \vdots \\ 1 & F_N^{(N-1)} & F_N^{2 \cdot (N-1)} & \cdots & F_N^{(N-1) \cdot (N-1)} \end{bmatrix}$$

[Equation 55]

Rank 1 DFT vectors about the 4Tx antennas composed of 16 column vectors located at the first four rows of Equation 55.

TABLE 8

$$\begin{bmatrix}1\\1\\1\\1\end{bmatrix} \begin{bmatrix}1\\e^{-j\frac{1}{8}\pi}\\e^{-j\frac{1}{4}\pi}\\e^{-j\frac{3}{8}\pi}\end{bmatrix} \begin{bmatrix}1\\e^{-j\frac{1}{4}\pi}\\e^{-j\frac{1}{2}\pi}\\e^{-j\frac{3}{4}\pi}\end{bmatrix} \begin{bmatrix}1\\e^{-j\frac{3}{8}\pi}\\e^{-j\frac{3}{4}\pi}\\e^{-j\frac{9}{8}\pi}\end{bmatrix} \begin{bmatrix}1\\e^{-j\frac{1}{2}\pi}\\e^{-j\pi}\\e^{-j\frac{3}{2}\pi}\end{bmatrix} \begin{bmatrix}1\\e^{-j\frac{5}{8}\pi}\\e^{-j\frac{5}{4}\pi}\\e^{-j\frac{15}{8}\pi}\end{bmatrix} \begin{bmatrix}1\\e^{-j\frac{3}{4}\pi}\\e^{-j\frac{3}{2}\pi}\\e^{-j\frac{9}{4}\pi}\end{bmatrix} \begin{bmatrix}1\\e^{-j\frac{7}{8}\pi}\\e^{-j\frac{7}{4}\pi}\\e^{-j\frac{5}{8}\pi}\end{bmatrix} \begin{bmatrix}1\\e^{-j\pi}\\1\\e^{-j\pi}\end{bmatrix} \begin{bmatrix}1\\e^{-j\frac{9}{8}\pi}\\e^{-j\frac{1}{4}\pi}\\e^{-j\frac{11}{8}\pi}\end{bmatrix} \begin{bmatrix}1\\e^{-j\frac{5}{4}\pi}\\e^{-j\frac{5}{2}\pi}\\e^{-j\frac{7}{4}\pi}\end{bmatrix} \begin{bmatrix}1\\e^{-j\frac{11}{8}\pi}\\e^{-j\frac{11}{4}\pi}\\e^{-j\frac{1}{8}\pi}\end{bmatrix}$$

$$\begin{bmatrix}1\\e^{-j\frac{3}{2}\pi}\\e^{-j\pi}\\e^{-j\frac{1}{2}\pi}\end{bmatrix} \begin{bmatrix}1\\e^{-j\frac{13}{8}\pi}\\e^{-j\frac{5}{4}\pi}\\e^{-j\frac{7}{8}\pi}\end{bmatrix} \begin{bmatrix}1\\e^{-j\frac{7}{4}\pi}\\e^{-j\frac{3}{2}\pi}\\e^{-j\frac{5}{4}\pi}\end{bmatrix} \begin{bmatrix}1\\e^{-j\frac{15}{8}\pi}\\e^{-j\frac{7}{4}\pi}\\e^{-j\frac{13}{8}\pi}\end{bmatrix}$$

Next, 4Tx Rank 1 house hold vector (HH vector) may be represented by the following Table 9.

TABLE 9

$$\begin{bmatrix}1\\1\\1\\1\end{bmatrix} \begin{bmatrix}1\\-j\\-1\\j\end{bmatrix} \begin{bmatrix}1\\-1\\1\\-1\end{bmatrix} \begin{bmatrix}1\\j\\-1\\-j\end{bmatrix} \begin{bmatrix}1\\\frac{1-j}{\sqrt{2}}\\-j\\\frac{-1-j}{\sqrt{2}}\end{bmatrix} \begin{bmatrix}1\\\frac{-1-j}{\sqrt{2}}\\j\\\frac{1-j}{\sqrt{2}}\end{bmatrix} \begin{bmatrix}1\\\frac{-1+j}{\sqrt{2}}\\-j\\\frac{1+j}{\sqrt{2}}\end{bmatrix} \begin{bmatrix}1\\\frac{1+j}{\sqrt{2}}\\j\\\frac{-1+j}{\sqrt{2}}\end{bmatrix} \begin{bmatrix}1\\1\\-1\\-1\end{bmatrix} \begin{bmatrix}1\\-j\\1\\-j\end{bmatrix} \begin{bmatrix}1\\-1\\-1\\1\end{bmatrix} \begin{bmatrix}1\\j\\1\\j\end{bmatrix} \begin{bmatrix}1\\1\\1\\-1\end{bmatrix} \begin{bmatrix}1\\1\\-1\\1\end{bmatrix} \begin{bmatrix}1\\-1\\1\\1\end{bmatrix} \begin{bmatrix}1\\-1\\-1\\-1\end{bmatrix}$$

Codebook Size Restriction

At least one of the first to third norms (Norm 1, Norm 2 and Norm 3) may be used to limit the number of precoding matrices contained in a codebook. In this embodiment, codebook size restriction for each rank, especially, size restriction in a Rank 1 codebook, will be described in detail.

Presently, a downlink 4Tx codebook for the 3GPP LTE system has prescribed that respective ranks have the same number of vectors/matrices (i.e., 16 vectors/matrices). However, it is well known in the art that the number of precoding matrices required to acquire optimum performance from a high rank is less than the number of precoding matrices required to acquire optimum performance from a low rank. For this purpose, this embodiment of the present invention proposes a new codebook format in which the number of precoding matrices of a low rank is higher than that of a high rank so that individual ranks have different numbers of precoding matrices.

In the meantime, a mobile communication system can support a variety of transmission modes. It is assumed that an X-th transmission mode is effectively used for a UE located at a cell edge so that the UE can support a closed loop operation using a Rank 1 Precoding Matrix Indicator (PMI). In this case, a Rank 1 PMI vector may be selected from the Rank 1 precoding matrices contained in an overall codebook composed of a plurality of precoding matrices of all ranks supporting a Y-th transmission mode such as an open loop MIMO or closed loop MIMO. In this case, it is assumed that the X-th transmission mode is different from the Y-th transmission mode. For the Y-th transmission mode, the size of the Rank 1 codebook need not be configured as a power of 2. In addition, although the Rank 1 codebook size is configured as a power of 2, only the codebook size can be increased without higher performance improvement. Thus, this embodiment proposes a method for rationally restricting the codebook size simultaneously while having appropriate performance so that the codebook can be expressed with a smaller amount of feedback information.

Firstly, it is assumed that numbers of precoding matrices of individual ranks supporting the Y-th transmission mode are set to A—Rank 1, B—Rank 2, C—Rank 3, and D—Rank 4 (where D≤C≤B≤A). In this case, the size of an overall codebook is equal to the sum of A, B, C, and D. In order to support the above codebook size, m-bit signaling for satisfying the following condition shown in Equation 56 may be needed.

$$A+B+C+D \leq 2^m \quad \text{[Equation 56]}$$

If a UE is configured to use the X-th transmission mode, a UE is able to use Rank 1 PMI information. It is preferable that $2^n$ Rank 1 PMIs (where n<m) be newly defined to reduce the number of bits required for signaling. A variety of methods (1), (2), (3), (4), (5) and (6) may be used to reduce the number of signaling bits.

(1) Method 1
If possible, an even-th index is selected.
(2) Method 2
If possible, an odd-th index is selected.
(3) Method 3
Initial $2^n$ indexes are selected.
(4) Method 4
Last $2^n$ indexes are selected.
(5) Method 5
Indexes are arbitrarily selected.
(6) Method 6
Construction is achieved by signaling.

For example, for the Y-th transmission mode, 33 precoding matrices may be given for Rank 1, 15 precoding matrices may be given for Rank 2, 15 precoding matrices may be given for Rank 3, and 4 precoding matrices may be given for Rank 4.

In this case, a variety of methods (1), (2), (3), (4), (5) and (6) for constructing the Rank 1 codebook used for indicating only 16 precoding matrices can be used.

(1) Method 1
If possible, an even-th index is selected.
(2) Method 2
If possible, an odd-th index is selected.
(3) Method 3
Initial 16 indexes are selected.
(4) Method 4
Last 16 indexes are selected.
(5) Method 5
Indexes are arbitrarily selected.
(6) Method 6
Construction is achieved by signaling.

In the meantime, a variety of methods (1), (2), (3) and (4) for constructing the Rank 1 codebook used for indicating only 32 precoding matrices can be used.
(1) Method 1
Initial 32 indexes are selected.
(2) Method 2
Last 32 indexes are selected.
(3) Method 3
Indexes are arbitrarily selected.
(4) Method 4
Construction is achieved by signaling.

If 16 downlink Rank 1 vectors are contained in the Rank 1 codebook including 32 precoding matrices, the following restriction methods (I) and (II) can be used.

The restriction method (I) corresponds to a case for constructing the 16-sized Rank 1 codebook, and a detailed description thereof will hereinafter be described in detail.
A) 16 downlink Rank 1 vectors are selected.
B) The 16-sized Rank 1 codebook is selected regardless of downlink Rank 1 vectors.
(1) Initial 16 indexes are selected.
(2) Last 16 indexes are selected.
(3) Indexes are arbitrarily selected.
(4) Construction is achieved by signaling.

The other restriction method (II) corresponds to another case for constructing the 32-sized Rank 1 codebook, and a detailed description thereof will hereinafter be described in detail.
A) Selection of 16 downlink Rank 1 vectors+additional vectors.
(1) Initial 16 indexes are selected.
(2) Last 16 indexes are selected.
(3) Indexes are arbitrarily selected.
(4) Construction is achieved by signaling.
B) Selection of 32-sized Rank 1 codebook regardless of downlink Rank 1 vectors.
(1) Initial 32 indexes are selected.
(2) Last 32 indexes are selected.
(3) Indexes are arbitrarily selected.
(4) Construction is achieved by signaling.

The number of codebooks for each rank can be effectively constructed according to the above-mentioned schemes.

III. Apparatus Configuration

Chapter III will hereinafter disclose an improved structure to be contained in a UE, wherein the improved structure can maintain good PAPR or CM properties simultaneously while applying the MIMO scheme to uplink signal transmission.

Figure 10:
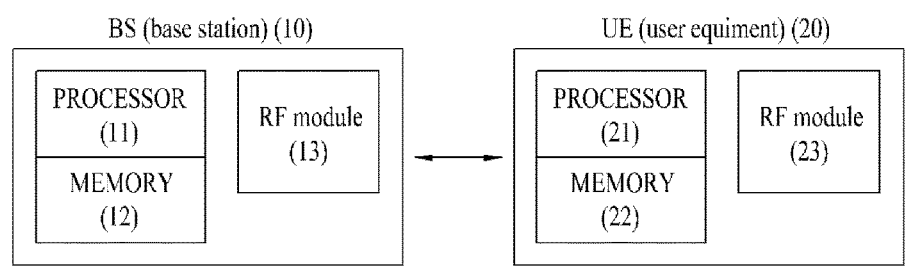
FIG. 10 is a block diagram illustrating a general base station (BS) and a general user equipment (UE).

FIG. 10 is a block diagram illustrating a general base station (BS) and a general user equipment (UE).

Referring to FIG. 10, a base station (BS) 10 includes a processor 11, a memory 12, and a Radio Frequency (RF) module 13. The RF module 13 is used as a transmission/reception module for receiving an uplink signal and transmitting a downlink signal. The processor 11 may control downlink signal transmission using downlink signal transmission information (for example, a specific precoding matrix contained in a codebook for downlink signal transmission) stored in the memory 12. Otherwise, as an inverse process of the precoding process, the processor 11 may control a signal reception process by multiplying uplink signal reception information (e.g., an uplink signal) stored in the memory 12 by a Hermitian matrix of the same precoding matrix as a precoding matrix used in the UE 20.

The UE 20 may include a processor 21, a memory 22, and an RF module 23 used as a transmission/reception module for transmitting an uplink signal and receiving a downlink signal. The processor 21 may control uplink signal transmission using uplink signal transmission information (for example, a specific precoding matrix contained in the above-mentioned codebook for uplink signal transmission) stored in the memory 22. Otherwise, as an inverse process of the precoding process, the processor 21 may control a signal reception process by multiplying downlink signal reception information (e.g., a downlink signal) stored in the memory 22 by a Hermitian matrix of the same precoding matrix as a precoding matrix used in the UE 20.

In the meantime, a detailed description about a processor of the UE 20 (or the BS 10), particularly, a structure for transmitting a signal using the SC-FDMA scheme, will hereinafter be described. A processor for transmitting a signal based on the SC-FDMA scheme in the 3GPP LTE system and a processor for transmitting a signal based on an OFDM scheme in the 3GPP LTE system will hereinafter be described, and a processor for enabling a UE to transmit an uplink signal using the SC-FDMA scheme as well as the MIMO scheme will then be described below.

Figure 11:
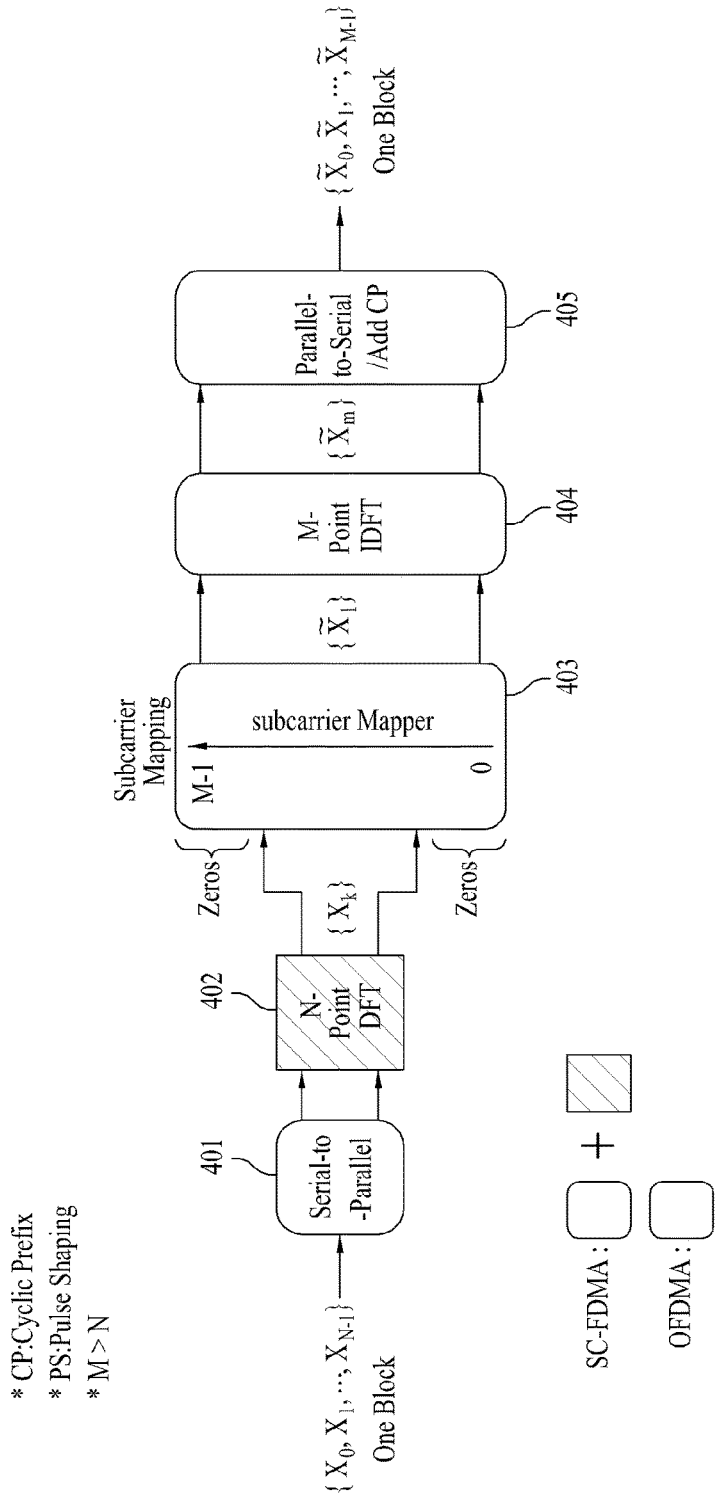
FIGS. 11 and 12 illustrate an SC-FDMA scheme for transmitting an uplink signal in a 3GPP LTE system and an OFDMA scheme for transmitting a downlink signal in the 3GPP LTE system.
Figure 12:
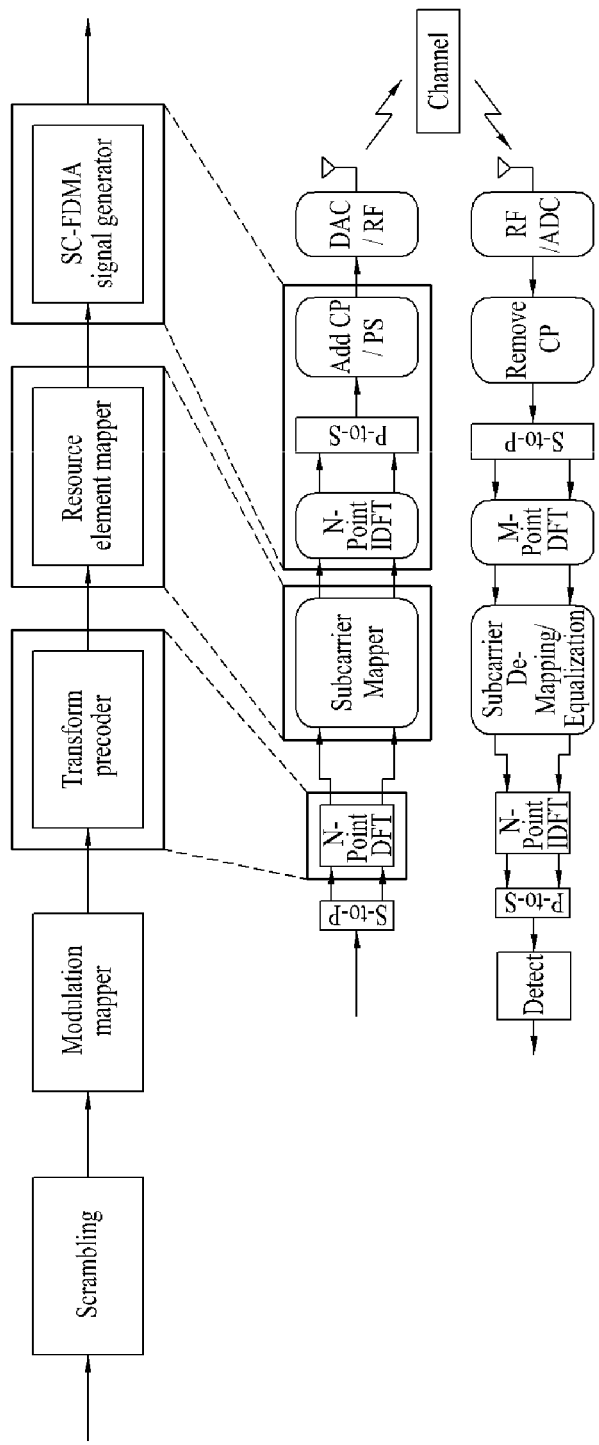

FIGS. 11 and 12 illustrate an SC-FDMA scheme for transmitting an uplink signal in the 3GPP LTE system and an OFDMA scheme for transmitting a downlink signal in the 3GPP LTE system.

Referring to FIG. 11, not only a UE for transmitting an uplink signal but also a base station (BS) for transmitting a downlink signal includes a Serial-to-Parallel converter 401, a subcarrier mapper 403, an M-point IDFT module 404, a Parallel-to-Serial converter 405, and the like. However, a UE for transmitting a signal using the SC-FDMA scheme further includes an N-point DFT module 402, and compensates for a predetermined part of the IDFT processing influence of the M-point IDFT module 404 so that a transmission signal can have single carrier characteristics.

FIG. 12 shows the relationship between a block diagram for an uplink signal process prescribed in TS 36.211 including the 3GPP LTE system specification and a processor for transmitting a signal using the SC-FDMA scheme. In accordance with the TS 36.211, each UE scrambles a transmission signal using a specific scrambling sequence so as to transmit an uplink signal, and the scrambled signal is modulated so that complex symbols are generated. After that, transform precoding for performing a DFT spreading process on complex symbols is carried out. That is, a transform precoder prescribed in TS 36.211 may correspond to an N-point DFT module. Thereafter, the DFT-spread signal may be mapped to a specific resource element according to a resource block (RB)-based mapping rule by a resource element mapper, and it can be recognized that this operation corresponds to the subcarrier mapper shown in FIG. 11. The signal mapped to the resource element is M-point IDFT or IFFT-processed by the SC-FDMA signal generator, parallel-to-serial conversion is performed on the IDFT or IFFT processed result, and then a cyclic prefix (CP) is added to the P/S conversion result.

In the meantime, FIG. 12 further shows a processor of a base station (BS) that is used to receive a signal which has been received in the base station through the above-mentioned processes.

In this way, the processor for SC-FDMA transmission in the 3GPP LTE system does not include a structure for utilizing the MIMO scheme. Therefore, the BS processor for MIMO transmission in the 3GPP LTE system will be described first, and a processor for transmitting an uplink signal by combining the SC-FDMA scheme with the MIMO scheme using the above BS processor will then be described.

Figure 13:
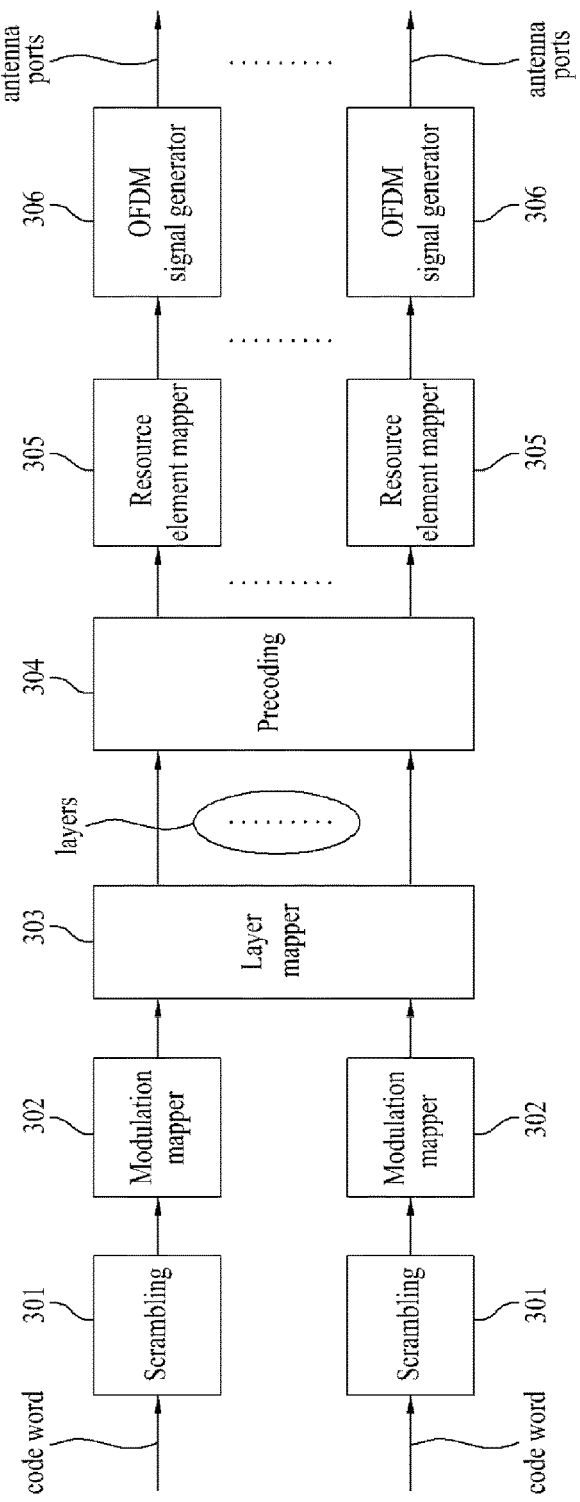
FIG. 13 is a block diagram illustrating a processor for enabling a base station (BS) to transmit a downlink signal using a MIMO scheme in a 3GPP LTE system.

FIG. 13 is a block diagram illustrating a processor for enabling the base station (BS) to transmit a downlink signal using the MIMO scheme in the 3GPP LTE system.

A base station (BS) in the 3GPP LTE system can transmit one or more codewords via a downlink. Therefore, one or more codewords may be processed as complex symbols by the scrambling module 301 and the modulation mapper 302 in the same manner as in the uplink operation shown in FIG. 12. Thereafter, the complex symbols are mapped to a plurality of layers by the layer mapper 303, and each layer is multiplied by a predetermined precoding matrix selected according to the channel status and is then allocated to each transmission antenna by the precoding module 304. The processed transmission signals of individual antennas are mapped to time-frequency resource elements to be used for data transmission by the resource element mapper 305. Thereafter, the mapped result may be transmitted via each antenna after passing through the OFDMA signal generator 306.

However, if a downlink signal scheme shown in FIG. 13 is used in the 3GPP LTE system, PAPR or CM properties may be degraded. Thus, it is necessary for a UE to effectively combine the SC-FDMA scheme for maintaining good PAPR and CM properties described in FIGS. 11 and 12 with the MIMO scheme shown in FIG. 13, and a UE for performing precoding using the precoding matrix capable of maintaining good PAPR and CM properties described in the above embodiment must be constructed.

In accordance with one embodiment of the present invention, it is assumed that a UE for transmitting an uplink signal via multiple antennas (multi-antenna) includes multiple antennas (not shown) for transmitting and receiving signals. Referring to FIG. 10, the UE 20 includes a memory 22 for storing a codebook, and a processor 21 that are connected to multiple antennas (not shown) and the memory 22 so as to process uplink signal transmission. In this case, the codebook stored in the memory 22 includes precoding matrices established in a manner that a single layer signal is transmitted to each of the multiple antennas. The processor 21 of the UE configured as described above will hereinafter be described in detail.

Figure 14:
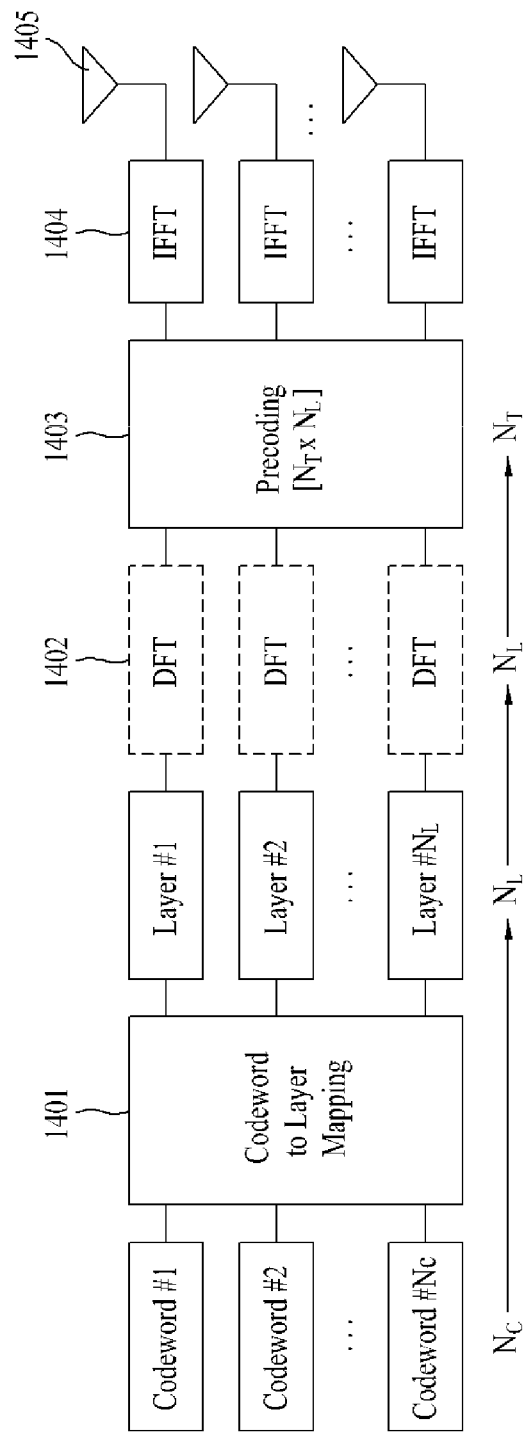
FIG. 14 illustrates a processor of a UE according to one embodiment of the present invention.

FIG. 14 illustrates a processor of the UE according to one embodiment of the present invention.

Referring to FIG. 14, the processor of the UE 20 according to one embodiment of the present invention includes a codeword to layer mapper 1401 for mapping uplink signals to a predetermined number of layers corresponding to a specific rank, a predetermined number of DFT modules 1402 for performing Discrete Fourier Transform (DFT) spreading on each of the predetermined number of layer signals, and a precoder 1403. The precoder 1403 selects a specific precoding matrix established in a manner that one layer signal is transmitted to each antenna 1405 so as to precode a DFT-spread resultant layer signal received from the DFT module 1402. Particularly, in this embodiment of the present invention, each DFT module 1402 performs spreading of each layer signal, this DFT module 1402 for spreading each layer signal is located just before the precoder 1403. When the precoder 1403 performs precoding, the precoder 1403 is configured such that each layer signal is mapped to one antenna and then transmitted via the mapped antenna, so that single carrier characteristics of each layer signal are maintained and good PAPR and CM properties are also maintained. In the meantime, the UE 20 further includes a transmission module. The transmission module performs a process constructing an SC-FDMA symbol upon the precoded signal, and transmits the resultant precoded signal to the base station (BS) via multiple antennas 1405.

In the meantime, the precoder 1403 selects a precoding matrix to be used for signal transmission from among the codebook stored in the memory 22, and performs precoding on the selected precoding matrix. Preferably, these precoding matrices may be precoding matrices established for equalizing transmission powers of multiple antennas and/or transmission powers of respective layers.

The number of multiple antennas 1405 may be 2 or 4. The processor of the UE according to one embodiment of the present invention may further perform not only a layer shift function for periodically or aperiodically changing a layer mapped to a specific codeword but also an antenna shift function for periodically or aperiodically changing an antenna via which a specific layer signal is transmitted. The layer shift function may be performed by the layer mapper 1401 separately from the precoding of the precoder 1403, or may also be performed through column permutation of the precoding matrix when the precoder 1403 performs precoding. In addition, the antenna shift function may also be carried out separately from the precoding of the precoder 1403, or may also be performed through row permutation of the precoding matrix.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

As apparent from the above description, the present invention can maintain PAPR or CM properties while transmitting uplink signals using a MIMO scheme.

In addition, the present invention uniformly controls or adjusts antenna/layer transmission power, minimizes an amount of signaling overhead required for precoding matrix information, and acquires a maximum diversity gain.

The present invention is applicable to a wideband wireless mobile communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for a user equipment (UE) to transmit uplink signals, the method comprising:

precoding signals of 2 layers by using a specific precoding matrix P multiplied by a predetermined constant value, wherein the specific precoding matrix P is selected from a Rank 2 codebook consisting of a first type of $$\begin{bmatrix} 1 & 0 \\ X & 0 \\ 0 & 1 \\ 0 & Y \end{bmatrix},$$

a second type of $$\begin{bmatrix} 1 & 0 \\ 0 & 1 \\ X & 0 \\ 0 & Y \end{bmatrix},$$

and a third type of $$\begin{bmatrix} 1 & 0 \\ 0 & 1 \\ 0 & Y \\ X & 0 \end{bmatrix},$$

wherein 'X' and 'Y' are selected from among {1, j, −1, −j}; and transmitting the precoded signals to a base station via 4 transmission antennas.

2. The method of claim 1, wherein the specific precoding matrix P multiplied by the predetermined constant value is represented as P', $$P' \in \left\{ k \cdot \begin{bmatrix} 1 & 0 \\ X & 0 \\ 0 & 1 \\ 0 & Y \end{bmatrix}, k \cdot \begin{bmatrix} 1 & 0 \\ 0 & 1 \\ X & 0 \\ 0 & Y \end{bmatrix}, k \cdot \begin{bmatrix} 1 & 0 \\ 0 & 1 \\ 0 & Y \\ X & 0 \end{bmatrix} \right\},$$

wherein 'k' represents the predetermined constant value.

3. The method of claim 1, wherein a number of precoding matrixes of the Rank 2 codebook is 16.

4. A user equipment (UE) for transmitting uplink signals, the UE comprising:

multiple transmission antennas for transmitting uplink signals;

a memory for storing codebooks of all ranks; and a processor connected to the multiple transmission antennas and the memory so as to process transmission of the uplink signals, wherein a Rank 2 codebook among the codebooks stored in the memory consists of a first type of $$\begin{bmatrix} 1 & 0 \\ X & 0 \\ 0 & 1 \\ 0 & Y \end{bmatrix},$$

a second type of $$\begin{bmatrix} 1 & 0 \\ 0 & 1 \\ X & 0 \\ 0 & Y \end{bmatrix},$$

and a third type of $$\begin{bmatrix} 1 & 0 \\ 0 & 1 \\ 0 & Y \\ X & 0 \end{bmatrix},$$

wherein 'X' and 'Y' are selected from among {1, j, −1, −j}.

5. The UE of claim 4, wherein the processor is configured to use the precoding matrix P multiplied by a predetermined constant value for precoding the signals.

6. The UE of claim 4, wherein a number of precoding matrixes of the Rank 2 codebook is 16.

* * * * *